US005436899A

United States Patent [19]

Fujino et al.

[11] Patent Number: 5,436,899

[45] Date of Patent: Jul. 25, 1995

[54] HIGH PERFORMANCE DIGITALLY MULTIPLEXED TRANSMISSION SYSTEM

[75] Inventors: Naoji Fujino, Sagamihara; Mitsuru Tsuboi, Kawasaki; Shoji Tominaga; Takao Matsuda, both of Yokohama; Naomi Nishiyama, Fujisawa; Takahiro Aramaki, Inagi; Ken-ichi Abiru; Toshiaki Nobumoto, both of Yokohama, all of Japan

[73] Assignee: Fujitsu Limited, Kawasaki, Japan

[21] Appl. No.: 134,859

[22] Filed: Oct. 12, 1993

Related U.S. Application Data

[63] Continuation of Ser. No. 726,230, Jul. 5, 1991, abandoned.

[30] Foreign Application Priority Data

Jul. 5, 1990 [JP] Japan .................................. 2-176212
Mar. 13, 1991 [JP] Japan .................................. 3-048442

[51] Int. Cl.[6] .............................................. H04D 3/16
[52] U.S. Cl. .......................................... 370/79; 370/60; 370/80; 370/81; 370/94.1; 370/111; 395/2.1
[58] Field of Search ....................... 370/60, 79, 80, 81, 370/111, 94.1; 381/31

[56] References Cited

U.S. PATENT DOCUMENTS

| | | | |
|---|---|---|---|
| 4,320,505 | 3/1982 | Baun, Jr. et al. | 370/110 |
| 4,408,324 | 11/1983 | Black et al. | 370/81 |
| 4,589,130 | 5/1986 | Galand | 370/81 X |
| 4,703,480 | 11/1987 | Westall et al. | 370/111 |
| 4,754,455 | 6/1988 | Yasunaga | 370/110.1 |
| 4,914,650 | 4/1990 | Sriram | 370/60 |
| 4,993,022 | 2/1991 | Kondo et al. | 370/79 |
| 5,121,385 | 6/1992 | Tominaga et al. | 370/80 |

FOREIGN PATENT DOCUMENTS

| | | | |
|---|---|---|---|
| 0259553 | 3/1988 | European Pat. Off. | H01B 1/56 |
| 0271866 | 6/1988 | European Pat. Off. | H04J 3/16 |
| 2218596 | 11/1989 | United Kingdom | H04J 3/12 |

OTHER PUBLICATIONS

Goodman, "Embedded DPCM for Variable Bit Rate Transmission," *IEEE Transactions on Communications*, vol. COM-28, No. 7, Jul. 1980, pp. 1040-1046.

Kou et al., "Digital Speech Interpolation for Variable Rate Coders with Aplication to Subband Coding," *IEEE Transactions on Communications*, vol. COM-33, No. 10, Oct. 1985, pp. 1100-1108.

Derby et al., "Multirate Subband Coding Applied to Digital Speech Interpolation," *IEEE Transactions on Acoustics, Speech and Signal Processing*, vol. ASSP-35, No. 12, Dec. 1987, pp. 1684-1698.

Cox et al., "Application and Implementation of an Embedded Subband Coder," *IEEE International Conference on Communications*, Phila. Pa., Jun. 12-15, 1988, Conference Record, vol. 1 of 3, pp. 0090-0095.

Nakada et al., "Variable Rate Speech Coding for Asynchronous Transfer Mode," *IEEE Transactions on Communications*, vol. 38, No. 3, Mar. 1990, pp. 277-284.

Sherif et al., "Overview of CCITT Embedded ADPCM Algorithms," *IEEE International Conference*

(List continued on next page.)

*Primary Examiner*—Douglas W. Olms
*Assistant Examiner*—Russell W. Blum
*Attorney, Agent, or Firm*—Staas & Halsey

[57] ABSTRACT

The high performance multiplexed transmission system of this invention is configured by a sound coding unit for coding voice input information by separating it into a core information part for assuring the minimum acceptable sound quality and a supplementary information part discardable in stages per the transmission priorities. There is a silent section detecting unit for detecting silent sections of voice input information. In addition, there is a multiplexing unit for multiplexing only the information synchronizing with the correspondent's coder for the voice channels from which no sound is detected, or first the core information part and second the supplementary information part from the ones with the highest priorities in stages in fixed length frames, for discarding the supplementary information parts, which cannot be multiplexed because of a band deficiency.

38 Claims, 96 Drawing Sheets

OTHER PUBLICATIONS

*on Communications,* Atlanta, Ga., Apr. 15-19, 1990, Conference Record, vol. 3 of 4, pp. 1014-1018.

C. Stacey, "Build Your Own ISDN Terminal/Terminal Adapter," *Wescon/87 Conference Record,* vol. 31, Los Angeles, Calif. pp. 20-5-1-20-5-7.

M. Yoshikawa, "A Highly Efficient Video Codec And Its Application", *Japan Telecommunications Review,* vol. 30, No. 4, Oct. 1988, Tokyo, Japan, pp. 25-29.

Fumio Kishino et al., "Variable Bit-Rate Coding of Video Signals for ATM Networks", *IEEE Journal on Selected Areas in Communication,* vol. 7, No. 5, Jun. 1989, New York, N.Y., pp. 801-806.

K. Sriram, "Dynamic Bandwidth Allocation and Congestion Control Schemes For Voice And Data Multiplexing In Wideband Packet Technology", *ICC 90,* vol. 3, Apr. 15, 1990, Atlanta, Ga., pp. 1003-1009.

Patents Abstracts of Japan, vol. 14, No. 252, (E-0934) May 30, 1990 & JP-A-20 72 760 (Fuji Electric et al.) Abstract.

STANDARD OF SPECIFIED TIME: τ 1 ; 1 SEC
τ 2 ; 1 SEC (1) ~ (20) : PATH OF VOICE FROM AND TO A STATION (a) ~ (l) : PATH OF DATA FROM AND TO A STATION

FIG. 22

| | | b3 | b2 | b1 | b0 |
|---|---|---|---|---|---|
| VOICE CHANNEL | | SIGNALING TRANSMISSION FLAG | TRANSMISSION BAND INFORMATION ( RI2 ~ RI0 ) | | |
| DATA CHANNEL | WITH Rs | RS SIGNAL TRANSMISSION FLAG | – (PKT - DATA) | – (PKT - DATA) | IDLE FLAG |

*FIG. 23*

| ITEM | OPERATING MODE | | | BETWEEN MUX AND DMUX |
|---|---|---|---|---|
| | MODE | | | RI2 ~ 0 |
| 0 | NOT IN USE / CALL DISCONNECTED | | 0 | 000 |
| 1 | SILENT MODE | LEVEL 1 | 2.0kbps | 001 |
| 2 | SPEECH MODE | LEVEL 2 | 6.2kbps | 010 |
| 3 | | LEVEL 3 | 8.0kbps | 011 |
| 4 | | LEVEL 4 | 10.0kbps | 100 |
| 5 | | LEVEL 5 | 12.0kbps | 101 |
| 6 | | LEVEL 6 | 14.0kbps | 110 |
| 7 | | LEVEL 7 | 16.0kbps | 111 |

(64 kbps LINE MULTIPLEXED)

HEADER PART : LEADING 11 BITS OF EACH OF 0 ~ 3 PHASE (TOTAL 44 BITS)

DATA MULTIPLEXING PART : BITS FOLLOWING AND INCLUDING 12 TH BITS OF EACH OF 0 ~ 3 PHASE (TOTAL 596 BITS)

| | b0 | 1 2 3 4 | 5 6 7 8 | 9 | 10 |
|---|---|---|---|---|---|
| 0 PHASE | F1 | Ri(#0)/PKT | Ri(#1)/PKT | ECC | ECC |
| 1 PHASE | F2 | Ri(#2)/PKT | Ri(#3)/PKT | ECC | ECC |
| 2 PHASE | F3 | Ri(#4)/PKT | Ri(#5)/PKT | ECC | ECC |
| 3 PHASE | SEND | Ri(#6)/PKT | Ri(#7)/PKT | ECC | PKT |

(64kbps, 8ch LINE MULTIPLEXED)

| | CH - 1 | CH - 2 | CH - 3 | CH - 4 | CH - 5 | CH - 6 | CH - 7 | CH - 8 | | BW | REQUEST / ALLOCATION |
|---|---|---|---|---|---|---|---|---|---|---|---|
| T= 1 | 10 / 10 | 10 / 10 | 10 / 10 | 10 / 10 | 10 / 10 | 10 / 10 | 10 / 10 | 10 / 10 | : | 260 ; | 80/ 80 |
| T= 2 | 50 / 30 | 50 / 30 | 50 / 30 | 50 / 30 | 50 / 30 | 50 / 30 | 50 / 40 | 50 / 40 | : | 260 ; | 400/ 260 |
| T= 3 | 70 / 30 | 70 / 30 | 70 / 30 | 70 / 30 | 70 / 40 | 70 / 40 | 70 / 30 | 70 / 30 | : | 260 ; | 560/ 260 |
| T= 4 | 80 / 30 | 80 / 30 | 80 / 40 | 80 / 40 | 80 / 30 | 80 / 30 | 80 / 30 | 80 / 30 | : | 260 ; | 640/ 260 |
| T= 5 | 80 / 40 | 80 / 40 | 80 / 30 | 80 / 30 | 80 / 30 | 80 / 30 | 80 / 30 | 80 / 30 | : | 260 ; | 640/ 260 |
| T= 6 | 70 / 30 | 70 / 30 | 70 / 30 | 70 / 30 | 70 / 30 | 70 / 40 | 70 / 40 | 60 / 30 | : | 260 ; | 550/ 260 |
| T= 7 | 80 / 30 | 80 / 30 | 80 / 30 | 80 / 40 | 80 / 40 | 80 / 30 | 80 / 30 | 40 / 30 | : | 260 ; | 600/ 260 |
| T= 8 | 60 / 30 | 60 / 40 | 60 / 40 | 60 / 30 | 60 / 30 | 60 / 30 | 60 / 30 | 30 / 30 | : | 260 ; | 450/ 260 |
| T= 9 | 50 / 40 | 50 / 30 | 50 / 30 | 50 / 30 | 50 / 40 | 50 / 40 | 50 / 40 | 10 / 10 | : | 260 ; | 360/ 260 |
| T=10 | 30 / 30 | 30 / 30 | 30 / 30 | 30 / 30 | 30 / 30 | 30 / 30 | 30 / 30 | 10 / 10 | : | 260 ; | 220/ 220 |
| T=11 | 40 / 40 | 40 / 40 | 10 / 10 | 40 / 40 | 10 / 10 | 10 / 10 | 10 / 10 | 30 / 30 | : | 260 ; | 190/ 190 |
| T=12 | 50 / 50 | 50 / 50 | 10 / 10 | 50 / 50 | 10 / 10 | 10 / 10 | 10 / 10 | 30 / 30 | : | 260 ; | 220/ 220 |
| T=13 | 80 / 70 | 80 / 70 | 10 / 10 | 60 / 50 | 10 / 10 | 10 / 10 | 10 / 10 | 30 / 30 | : | 260 ; | 290/ 260 |
| T=14 | 60 / 40 | 60 / 40 | 10 / 10 | 80 / 70 | 30 / 30 | 50 / 30 | 10 / 10 | 50 / 30 | : | 260 ; | 350/ 260 |
| T=15 | 50 / 40 | 50 / 40 | 0 / 0 | 70 / 50 | 40 / 30 | 80 / 60 | 10 / 10 | 50 / 30 | : | 260 ; | 350/ 260 |

FIG. 33A

| | CH - 1 | CH - 2 | CH - 3 | CH - 4 | CH - 5 | CH - 6 | CH - 7 | CH - 8 | BW | REQUEST / ALLOCATION |
|---|---|---|---|---|---|---|---|---|---|---|
| T= 1 | 10 / 10 | 10 / 10 | 10 / 10 | 10 / 10 | 10 / 10 | 10 / 10 | 10 / 10 | 10 / 10 | : 80 | ; 80/ 80 |
| | 1 /5/9 | 1 /5/9 | 1 /5/9 | 1 /5/9 | 1 /5/9 | 1 /5/9 | 1 /5/9 | 1 /5/9 | | |
| T= 2 | 50 / 30 | 50 / 30 | 50 / 30 | 50 / 30 | 50 / 30 | 50 / 30 | 50 / 30 | 50 / 30 | : 240 | ; 400/ 240 |
| | 1 /1/2 | 1 /1/2 | 1 /1/2 | 1 /1/2 | 1 /1/2 | 1 /1/2 | 1 /1/2 | 1 /1/2 | | |
| T= 3 | 70 / 30 | 70 / 30 | 70 / 30 | 70 / 30 | 70 / 30 | 70 / 30 | 70 / 40 | 70 / 40 | : 480 | ; 560/ 260 |
| | 1 /3/4 | 1 /3/4 | 1 /3/4 | 1 /3/4 | 1 /3/4 | 1 /3/4 | 1 /2/4 | 1 /2/4 | | |
| T= 4 | 80 / 30 | 80 / 30 | 80 / 30 | 80 / 30 | 80 / 30 | 80 / 30 | 80 / 40 | 80 / 40 | : 420 | ; 640/ 260 |
| | 1 /4/5 | 1 /4/5 | 1 /4/5 | 1 /4/5 | 1 /4/5 | 1 /4/5 | 1 /3/5 | 1 /3/5 | | |
| T= 5 | 80 / 30 | 80 / 30 | 80 / 30 | 80 / 30 | 80 / 30 | 80 / 30 | 80 / 40 | 80 / 40 | : 340 | ; 640/ 260 |
| | 1 /4/5 | 1 /4/5 | 1 /4/5 | 1 /4/5 | 1 /4/5 | 1 /4/5 | 1 /3/5 | 1 /3/5 | | |
| T= 6 | 70 / 30 | 70 / 30 | 70 / 30 | 70 / 30 | 70 / 30 | 70 / 30 | 70 / 40 | 60 / 30 | : 250 | ; 550/ 250 |
| | 1 /3/4 | 1 /3/4 | 1 /3/4 | 1 /3/4 | 1 /3/4 | 1 /3/4 | 1 /2/4 | 1 /2/3 | | |
| T= 7 | 80 / 30 | 80 / 30 | 80 / 30 | 80 / 30 | 80 / 30 | 80 / 40 | 80 / 40 | 40 / 30 | : 390 | ; 600/ 260 |
| | 1 /4/5 | 1 /4/5 | 1 /4/5 | 1 /4/5 | 1 /4/5 | 1 /3/5 | 1 /3/5 | 0 /0/1 | | |
| T= 8 | 60 / 30 | 60 / 30 | 60 / 30 | 60 / 30 | 60 / 30 | 60 / 30 | 60 / 30 | 30 / 30 | : 240 | ; 450/ 240 |
| | 1 /2/3 | 1 /2/3 | 1 /2/3 | 1 /2/3 | 1 /2/3 | 1 /2/3 | 1 /2/3 | 0 /0/0 | | |
| T= 9 | 50 / 30 | 50 / 30 | 50 / 30 | 50 / 30 | 50 / 30 | 50 / 30 | 50 / 30 | 10 / 10 | : 220 | ; 360/ 220 |
| | 1 /1/2 | 1 /1/2 | 1 /1/2 | 1 /1/2 | 1 /1/2 | 1 /1/2 | 1 /1/2 | 1 /5/9 | | |
| T=10 | 30 / 30 | 30 / 30 | 30 / 30 | 30 / 30 | 30 / 30 | 30 / 30 | 30 / 30 | 10 / 10 | : 220 | ; 220/ 220 |
| | 0 /0/0 | 0 /0/0 | 0 /0/0 | 0 /0/0 | 0 /0/0 | 0 /0/0 | 0 /0/0 | 1 /5/9 | | |
| T=11 | 40 / 40 | 40 / 40 | 10 / 10 | 40 / 40 | 10 / 10 | 10 / 10 | 10 / 10 | 30 / 30 | : 190 | ; 190/ 190 |
| | 0 /0/1 | 0 /0/1 | 1 /5/9 | 0 /0/1 | 1 /5/9 | 1 /5/9 | 1 /5/9 | 0 /0/0 | | |
| T=12 | 50 / 50 | 50 / 50 | 10 / 10 | 50 / 50 | 10 / 10 | 10 / 10 | 10 / 10 | 30 / 30 | : 220 | ; 220/ 220 |
| | 0 /0/2 | 0 /0/2 | 1 /5/9 | 0 /0/2 | 1 /5/9 | 1 /5/9 | 1 /5/9 | 0 /0/0 | | |
| T=13 | 80 / 70 | 80 / 70 | 10 / 10 | 60 / 50 | 10 / 10 | 10 / 10 | 10 / 10 | 30 / 30 | : 290 | ; 290/ 260 |
| | 0 /0/5 | 0 /0/5 | 1 /5/9 | 0 /0/3 | 1 /5/9 | 1 /5/9 | 1 /5/9 | 0 /0/0 | | |
| T=14 | 60 / 40 | 60 / 40 | 10 / 10 | 80 / 70 | 30 / 30 | 50 / 30 | 10 / 10 | 50 / 30 | : 330 | ; 350/ 260 |
| | 1 /1/3 | 1 /1/3 | 1 /5/9 | 0 /0/5 | 0 /0/0 | 1 /1/2 | 1 /5/9 | 1 /1/2 | | |
| T=15 | 50 / 30 | 50 / 40 | 0 / 0 | 70 / 60 | 40 / 30 | 80 / 60 | 10 / 10 | 50 / 30 | : 310 | ; 350/ 260 |
| | 1 /1/2 | 0 /0/2 | 1 /5/9 | 0 /0/4 | 0 /0/1 | 1 /1/5 | 1 /5/9 | 1 /1/2 | | |

FIG. 33B

| | | T = | 1 | 2 | 3 | 4 | 5 | 6 | 7 | 8 | 9 | 10 | 11 |
|---|---|---|---|---|---|---|---|---|---|---|---|---|---|
| REQUESTED BITS | Vi | = | 80 | 10 | 10 | 80 | 80 | 80 | 80 | 80 | 80 | 80 | 80 |
| PRECEDING TIME | GAPi | = | 5 | -2 | -2 | 5 | 5 | 5 | 5 | 5 | 5 | 5 | 5 |
| FOLLOWING TIME | DMGi | = | - | 0 | 5 | 5 | 5 | 5 | 5 | 5 | 0 | 0 | 0 |
| | DMGi | = | 0 | 5 | 5 | 4 | 3 | 2 | 1 | 0 | 0 | 0 | 0 |
| ALLOCATED BITS | Vi' | = | 80 | 10 | 10 | 30 | 40 | 50 | 60 | 70 | 80 | 80 | 80 |
| DISCARDING FLAG | DF' | = | 0 | 1 | 1 | 1 | 1 | 1 | 1 | 0 | 0 | 0 | 0 |

SILENT MODE SECTION | DRAGGING | DISCARDING HISTORY

FIG. 33C

| | | | | | | | | |
|---|---|---|---|---|---|---|---|---|
| TIME | T | = 1 | 2 | 3 | 4 | 5 | 6 |
| REQUESTED BITS | Vi | =80 | 80 | 80 | 80 | 80 | 80 |
| | GAPi | = 5 | 5 | 5 | 5 | 5 | 5 |
| PRECEDING TIME | DMGi | = - | 0 | 3 | 2 | 1 | 0 |
| ALLOCATED BITS | Vi' | =80 | 40 | 50 | 60 | 70 | 80 |
| LAST TIME | DMGi | = 0 | 4 | 3 | 2 | 1 | 0 |
| FOLLOWING TIME | DMGi | = 0 | 3 | 2 | 1 | 0 | 0 |
| DISCARDING FLAG | DF' | = 0 | 1 | 1 | 1 | 1 | 0 |

DRAGGING
DISCARDING HISTORY

FIG. 34

| | | | | | | | | | |
|---|---|---|---|---|---|---|---|---|---|
| REQUEST Vi | 40 | 40 | 50 | 60 | 70 | 80 | 40 | 50 | 30 |
| PRECEDING TIME DMGi | 0 | 2 | 2 | 2 | 2 | 2 | 1 | 1 | 1 |
| GAPi | 1 | 1 | 2 | 3 | 4 | 5 | 1 | 2 | 0 |
| DMGi | 0 | 1 | 2 | 2 | 2 | 2 | 1 | 1 | 0 |
| NEW Vi | 40 | 30 | 30 | 40 | 50 | 60 | 30 | 40 | 30 |
| ACTUAL Vi | 40 | 40 | 40 | 40 | 40 | 40 | 40 | 40 | 40 |
| LAST TIME Vi | 40 | 30 | 30 | 40 | 40 (-10) | 40 (-20) | 30 | 40 | 30 |
| LAST TIME DMGi | 0 | 1 | 2 | 2 | 3 (+1) | 4 (+2) | 1 | 1 | 0 |
| FOLLOWING TIME DMGi | 0 | 0 | 1 | 1 | 2 | 3 | 0 | 0 | 0 |
| DFi | 0 | 0 | 1 | 1 | 1 | 1 | 0 | 0 | 0 |

COD : VOICE CODER (CODEC)
MUX : MULTIPLEXER
PAD : PKT INTERFACE PART (PACKET ASSEMBLER / DISSEMBLER)

FIG. 40

| | OPERATING MODE | | | | BETWEEN MUX AND DMXU R12 ~ 0 |
|---|---|---|---|---|---|
| | | | (S,B1,B2,B3,B4) | | |
| (1) | NOT IN USE | | : (0, 0, 0, 0, 0) | 0kbps | 000 |
| (2) | SILENT TIME | | : (0, 0, 0, 0, 0) | 0kbps | 001 |
| (3) | SPEECH TIME | DISCARDING LEVEL 5 | : (0, 2, 2, 2, 0) | 12kbps | 010 |
| (4) | | DISCARDING LEVEL 4 | : (0, 2, 2, 2, 2) | 16kbps | 011 |
| (5) | | DISCARDING LEVEL 3 | : (0, 4, 3, 3, 3) | 26kbps | 100 |
| (6) | | DISCARDING LEVEL 2 | : (0, 5, 5, 4, 4) | 36kbps | 101 |
| (7) | | DISCARDING LEVEL 1 | : (0, 5, 5, 5, 5) | 40kbps | 110 |

S = SIDE INFORMATION

FIG. 43

| ITEM | OPERATING MODE | | MODE 1 (MALE) (S,B1,B2,B3,B4) | MODE 2 (FEMALE) (S,B1,B2,B3,B4) | | BETWEEN MUX AND DMXU RI2 ~ 0 |
|---|---|---|---|---|---|---|
| (1) | NOT IN USE | | (0, 0, 0, 0, 0) | (0, 0, 0, 0, 0) | 0kbps | 000 |
| (2) | SILENT TIME | | (0, 0, 0, 0, 0) | (0, 0, 0, 0, 0) | 0kbps | 001 |
| (3) | SPEECH TIME | DISCARDING LEVEL 5 | (1, 2, 2, 2, 0) | (1, 2, 2, 2, 0) | 13kbps | 010 |
| (4) | | DISCARDING LEVEL 4 | (1, 4, 2, 2, 0) | (1, 2, 2, 2, 2) | 17kbps | 011 |
| (5) | | DISCARDING LEVEL 3 | (1, 4, 4, 3, 2) | (1, 4, 4, 3, 2) | 27kbps | 100 |
| (6) | | DISCARDING LEVEL 2 | (1, 5, 5, 5, 3) | (1, 5, 5, 4, 4) | 37kbps | 101 |
| (7) | | DISCARDING LEVEL 1 | (1, 5, 5, 5, 5) | (1, 5, 5, 5, 5) | 41kbps | 110 |

SIDE INFORMATION IS USED FOR IDENTIFYING MODES AND 1 kbps IS USED

FIG. 50

| | |
|---|---|
| [ PHASE A ] | |
| CALLING SIDE | SENDING CNG 1100 Hz (FAX IDENTIFICATION SIGNALS) |
| CALLED SIDE | SENDING CED 2100 Hz (RESPONSE SIGNALS) |
| [ PHASE B ] | |
| CALLED SIDE | RECEIVING SIDE EQUIPPED FUNCTION NOTIFIED |
| CALLING SIDE | FUNCTIONS TO BE USED NOTIFIED |
| CALLING SIDE | TRAINING SIGNALS |
| CALLED SIDE | TRAINING RESULT NOTIFIED (OK / NG) |
| [ PHASE C ] | |
| CALLING SIDE | TRANSMISSION OF IMAGE INFORMATION FOR ONE PAGE |
| [ PHASE D ] | |
| CALLING SIDE | NOTIFYING COMPLETE TRANSMISSION OF ONE PAGE |
| CALLED SIDE | RESPONDING RESULT OF RECEIPT |

THEREAFTER [ PHASE C AND D ] REPEATED FOR NUMBER OF PAGES

| | |
|---|---|
| [ PHASE E ] | |
| CALLING SIDE | DECLARING TERMINATION |

*FIG. 54B*

| | SUB - BAND ALLOCATED FOR ONE MULTIPLEXING UNIT | SUB - BAND ALLOCATED TO EQUIVALENCE OF ONE SPLIT | EXAMPLES OF INFORMATION ON EXISTENCE OF DATA TRANSMISSION |
|---|---|---|---|
| CH #1 | 0 BIT | 0 BIT | 10→00(BECAUSE OF DISCARDING) |
| CH #2 | 40 BIT | 20 BIT | 10→10(AS IS) |

AN EXAMPLE FOR BAND DETERMINING

HIGH PERFORMANCE DIGITALLY MULTIPLEXED TRANSMISSION SYSTEM

This application is a continuation of application Ser. No. 07/726,230, filed Jul. 5, 1991, now abandoned.

BACKGROUND OF THE INVENTION

This invention relates to a multiplexing device for sending multiplexed signals through a digital line, and to a high performance digitally multiplexed transmission system in a switching system.

FIG. 1 shows an example of a voice multiplexing device or a switching system, and FIG. 2 shows an example of a multi-media multiplexing device or a switching system. In FIG. 1, voice data from a phone terminal 1 are applied to a relay transmission network 3 through a voice multiplexing device/switching system 2. The voice data are transmitted to a receiving phone terminal 5 through a voice multiplexing device/switching system 4. The relay transmission network 3 comprises a digital relay line and a voice multiplexing device/switching system for a relay.

In FIG. 2, transmission information inputted to a multi-media multiplexing device/switching system 9 from the phone terminal 1 through PBX 6, from a data terminal through a packet switching system 7, and from a TV conference terminal through an image switching system 8 are applied to a relay transmission network 10. Data are outputted to a PBX 12, a packet switching system 13, or an image switching system 14 through a multi-media multiplexing device/switching system 11.

In such voice multiplexing devices, multi-media multiplexing devices, etc., a time-divisional multiplexing (TDM) method is usually adopted. However, another method such as a digital speech interpolation (DSI) multiplexing method or a digital data interpolation (DDI) multiplexing method may also be adopted as a statistical multiplexing method for efficient transmission. A DSI method detects a silent section in voice data and transmits only speech sections. A DDI method supplements information from queuing data communication media such as a packet switch system before performing a multiplexing operation.

FIGS. 3A and 3B show examples of band allocations. FIG. 3A is for a conventional TDM multiplexing method and FIG. 3B is for a statistical multiplexing method. In FIG. 3A, a band is allocated to each voice channel and the object is to get a higher performance voice coder with a view to improving sound quality within the allocated band. By contrast, in FIG. 3B, bands are flexibly utilized by a plurality of voice channels, thus extending the equivalent band per channel and improving transmission quality.

FIG. 4 shows a band allocation using a DSI method. In this method, a band is flexibly allocated depending on whether data comprise speech or silence by detecting silent sections. Where there are a greater number of voice calls more bands are allocated and sound quality is improved.

As described above, in a conventional TDM multiplexing method, for example, the same number of bonds allocated to the maximum number of calls are also allocated to a small number of calls. The problem with this method is that sound quality is kept constant as for the maximum number of calls, and the average band cannot be extended by the flexible allocation of bands according to the voice level.

In the DSI method, silent sections are detected and no information of those sections is transmitted. That is, the band for those sections is considered to be zero, thus improving the transmission efficiency. However, when a line is congested, the whole coded information for one voice channel is either transmitted "as is"0 or discarded completely. This causes the problem that sound quality greatly deteriorates for a channel where the whole coded information is discarded completely.

SUMMARY OF THE INVENTION

This invention pertains to a multiplexed transmission system for use in a voice multiplexing unit, a multi-media multiplexing unit, a PBX, a public voice switching network, and a multi-media public network, using a public or private digital communication line. It aims at statistically realizing both highly efficient multiplexing and high quality communication.

The system of this invention is configured by a sound coding unit, a silent section detecting unit and a multiplexing unit. The sound coding unit codes voice input information by separating it into a core information part for assuring the minimum acceptable sound quality and a supplementary information part discardable in stages according to transmission priorities. The silent section detecting unit detects silent sections of voice input information. The multiplexing unit multiplexes only the information synchronized with the correspondent's coder for the voice channels from which silence is detected, or first the core information part and second the supplementary information part from the ones with the highest priorities in stages in fixed length frames, for discarding the supplementary information parts that cannot be multiplexed because of a band deficiency.

BRIEF DESCRIPTION OF THE DRAWINGS

FIG. 22 shows an embodiment of a transmission band allocation code;

FIG. 23 shows an embodiment of a code table of transmission band information;

FIGS. 25A and 25B show an embodiment of a frame configuration;

FIG. 30 shows an embodiment of arbitration based on the flowchart shown in FIG. 29;

FIGS. 33A, 33B and 33C show an embodiment of the arbitration according to the flowchart shown in FIG. 31;

FIG. 34 shows the relations among values of various functions in the band arbitration processors according to the flowchart shown in FIG. 31;

FIGS. 39A and 29B illustrate embodiments of a packet formatting;

FIG. 40 illustrates an embodiment of the code table of the transmission band information during sub-band coding;

FIG. 43 shows an embodiment of the code table of the transmission band information for respective discarding modes;

FIG. 50 shows an outline of G3-FAX transmission procedures;

FIGS. 54A, 54B and 54C illustrate an embodiment of a pipeline multiplexing method;

DESCRIPTION OF THE PREFERRED EMBODIMENTS

Considering the above described problems of the prior art technology, this invention is established to multiplex a core information part to ensure the minimum sound quality of a voice channel, to perform a multiplexing operation on supplementary information parts in the order of higher priority to obtain desirable sound quality, and to minimize the communication quality even during the congestion, thereby improving the communication quality in statistical multiplexing and multiplexing efficiency.

FIG. 5 is a block diagram of this invention. FIGS. 5A to 5D show block diagrams for explaining the principle of a high performance digitally multiplexed transmission system in a multiplexing device or a switching system for transmitting a multiplexing signal through a digital line.

Figure 5A:
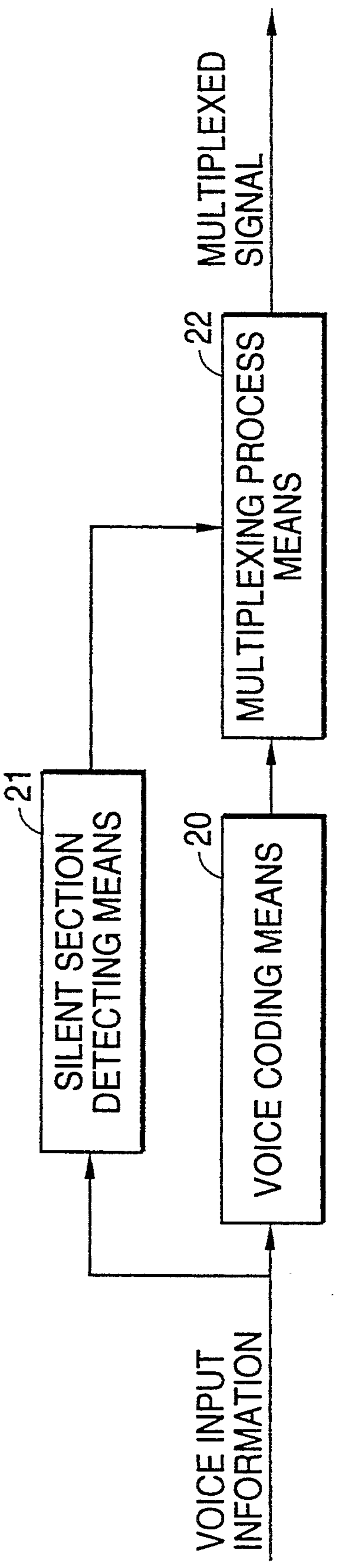
FIGS. 5A through 5G are block diagrams of this invention.

In FIG. 5A, a voice coding means 20 is an ADPCM embedded voice coder for coding voice input information after dividing it into a core information part and a supplementary information part. In the core information part, the minimum sound quality is ensured when the information is transmitted, where the information is compressed and coded by differential information, etc.

The supplementary information part must be transmitted with the core information part to obtain desirable sound quality, and can be discarded sequentially, for example, every 10 bits, in the order of transmission priority of discard. An example of this information is supplementary information of the difference between a value predicted from core information and an input signal after being coded by a simple PCM quantizing unit.

A silent section detecting means 21 detects silent sections for using the result for transmitting information, as in a conventional statistical multiplexing method.

A multiplexing processing means 22 multiplexes, for fixed length digital slots repeated at a certain interval, only subordinate information (side information) necessary for synchronizing the modus operation to a correspondent's coder for a voice channel where the silent section detecting means 21 detects any silent sections among a plurality of voice channels to be multiplexed on a digital line, while it multiplexes the core information for a voice channel where the silent section detecting means 21 detects no silent sections.

Then, the multiplexing processing means 22 multiplexes the supplementary information part of the voice channel where no silent sections are detected for the remaining fixed digital slots. In this case, every 10 bits, for example, of the information is multiplexed in the order of higher transmission priority , that is, starting with the heaviest weighted part, and any supplementary information part that cannot be multiplexed due to a lack of bands is discarded.

Figure 5B:
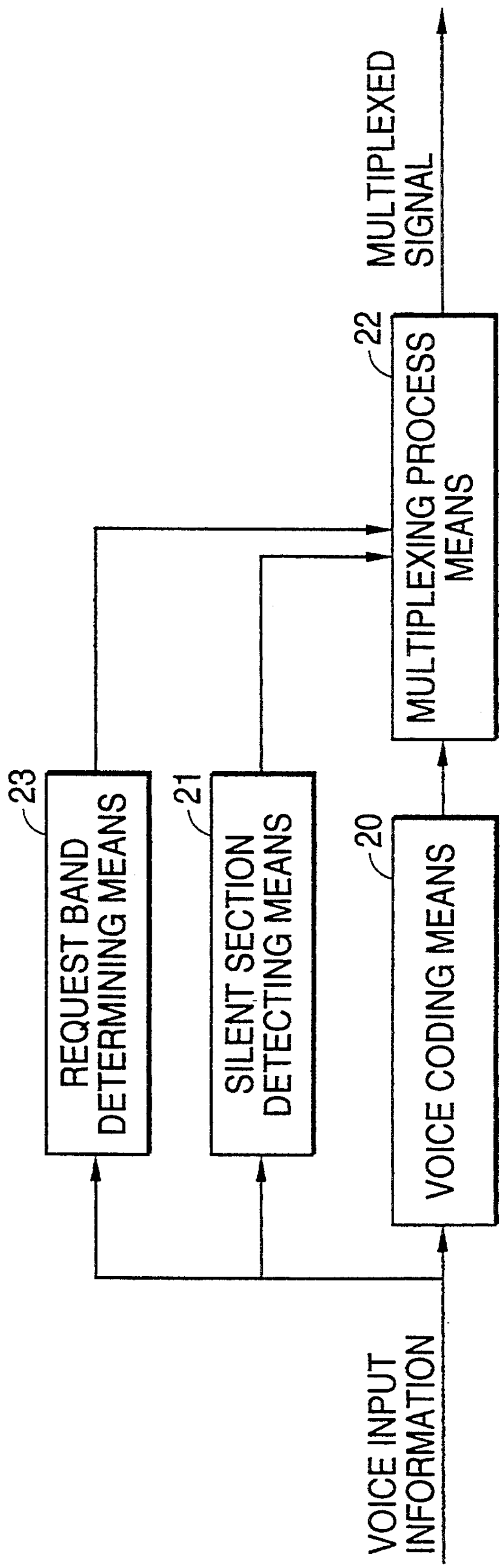

FIG. 5B shows a block diagram for explaining the principle of a multiplexing method based on a transmission request band for each voice channel. A request band determining means 23 determines the transmission request band of voice input information for each of a plurality of voice channels to be multiplexed on a digital line.

The multiplexing processing means 22, when discarding supplementary information of each voice channel where the silent section detecting means 21 detects no silent sections, performs a multiplexing operation for each voice channel by discarding every 10 bits, for example, of supplementary information parts within a request band determined by the request band determining means 23 in the order of lower transmission priority, that is, starting with order lightest weighted part.

Figure 5C:
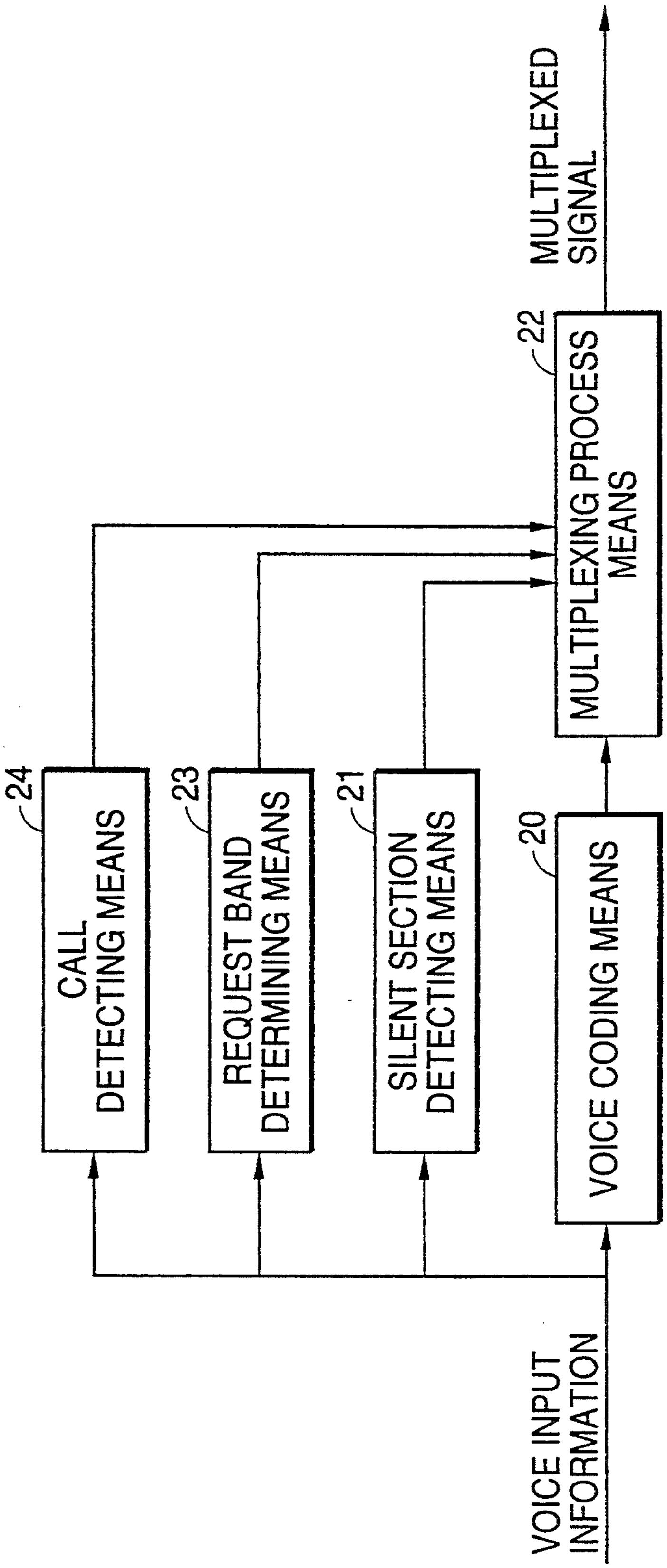

FIG. 5C is a block diagram for explaining the principle of a multiplexing method based on the call detection result. In FIG. 5C, a call detecting means 24 detects whether or not a call is being made, that is, a calling mode or non-calling-mode, in each of a plurality of voice channels. The multiplexing processing means 22 performs a multiplexing operation on a voice channel in the calling mode without transmitting any coded information including side information, which is necessary for synchronizing to a correspondent's coder, for a voice channel where the call detecting means 24 detects the non-calling-mode.

Figure 5D:
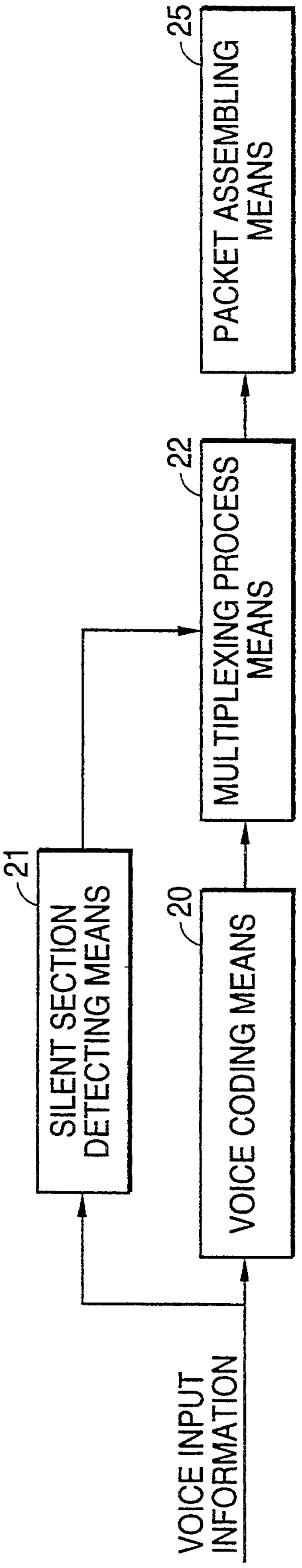
Figure 5E:
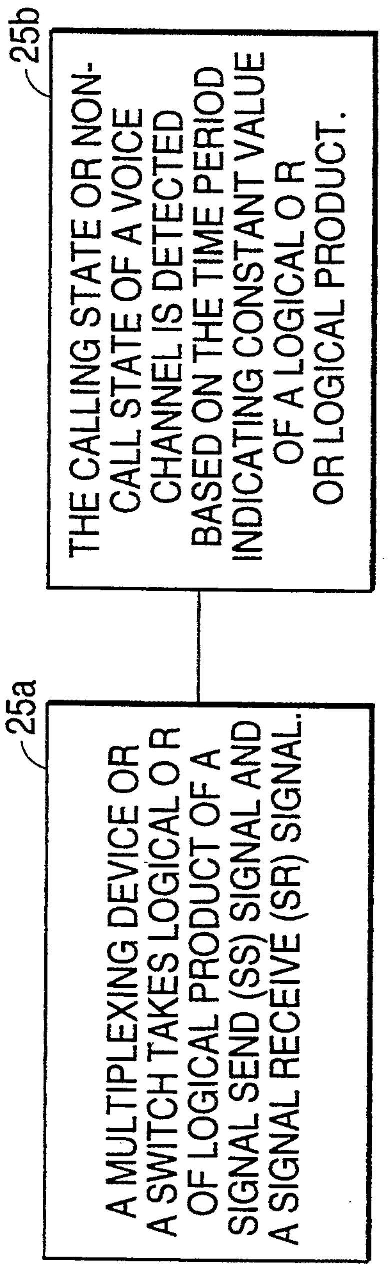
Figure 5F:
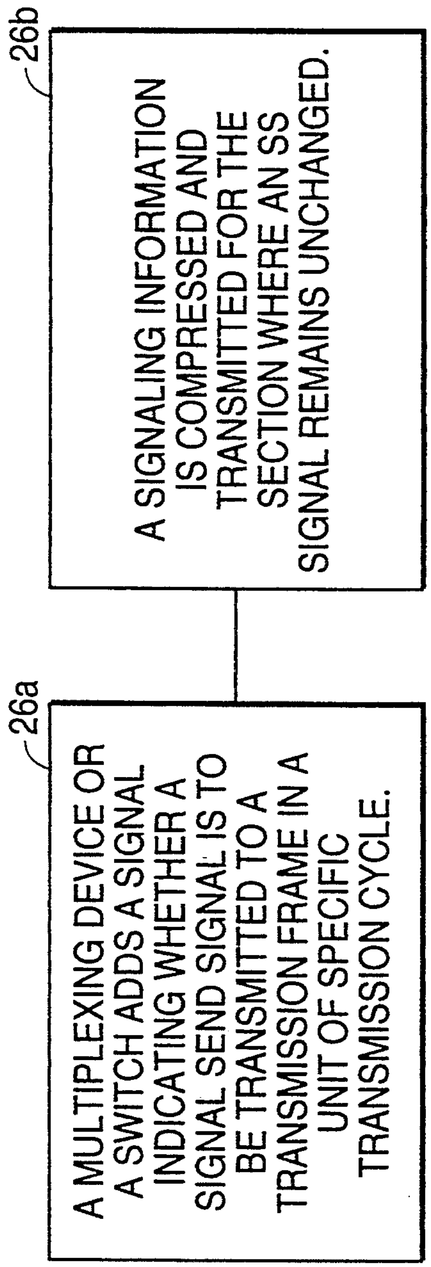

When a multiplexing device or a switching system transmits signaling information for a voice channel with a signal-send (SS) signal and a signal-receive (SR) signal in a call detecting method, the calling mode or non-calling-mode in a voice channel is detected at 25*a* as shown in the operational block diagram in FIG. 5E, according to the time period where the value of a logical OR or logical product of said two signals is kept constant while these SS and SR signals are monitored.

FIG. 5D is a block diagram for explaining the principle of a multiplexing method when a multiplexing device or a switching system is connected to a label multiplexing network such as a packet network, an ATM network, etc. In FIG. 5D, a multiplexing frame outputted by the multiplexing process means 22 is applied "as is", or after being divided into packets, to a label multiplexing network by a packet assembling means 25. FIG. 5D shows a packet assembling means 25 in addition to the configurations shown in FIG. 5A, but it can be added similarly to the configuration shown in FIGS. 5B and 5C.

Figure 6A:
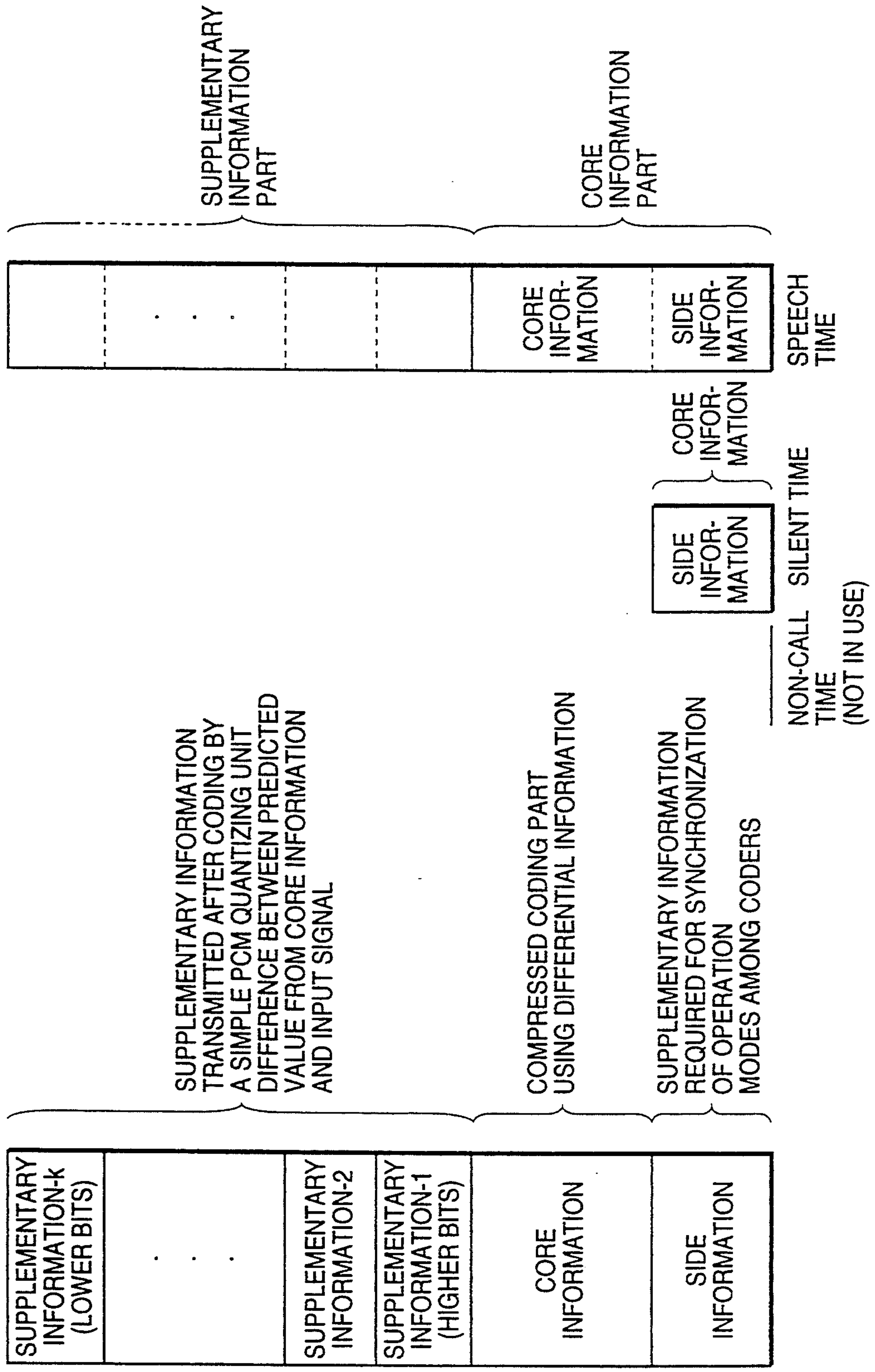
FIGS. 6A and 6B are block diagrams for explaining the segmentation of voice transmission information.

In this invention, voice information of each voice channel is segmented into a core information part and a supplementary information part, as described above, and then coded by the voice coding means 20. FIG. 6 is a block diagram for explaining the voice transmission information segmented as described above. FIG. 6A shows how a core information part and a supplementary information part are segmented. The core information part is compressed and coded using differential information, etc. and comprises core information for ensuring the minimum sound quality and side information necessary for synchronizing to the operating mode of a correspondent's coder.

The supplementary information part includes supplementary information to be transmitted after the difference between the value predicted from core information and an input signal is coded by a simple PCM quantizing unit. It is stacked sequentially on top of the core information part from the heaviest bit. Thus, it is sequentially discarded from the lightest bit, that is, the bit at the top. The core information part and the supplementary information part are transmitted where speech sections are detected, while only side information in the core information part is transmitted where silent sections are detected. FIG. 5C shows that nothing is transmitted for the non-calling-mode.

Figure 6B:
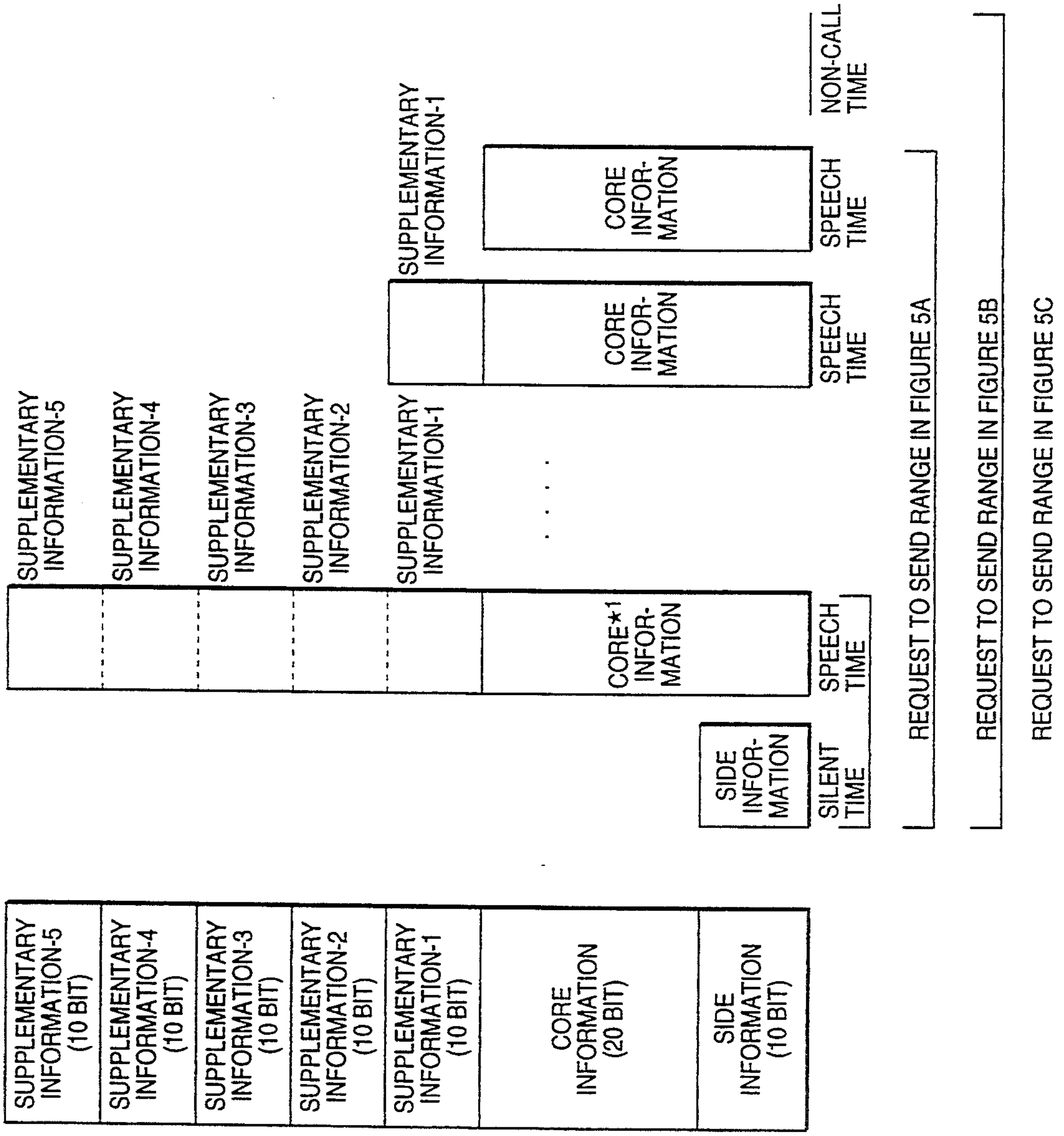

FIG. 6B shows a block diagram for explaining the band of requests to send data in each case shown in FIGS. 5A, 5B and 5C. In FIG. 6B, if, in the core information part, 10 bits of side information and 20 bits of core information add up to 30 bits, and 10 bits each of supplementary information make a total of 50 bits, 30 bits of the core information part (the sum of core information and side information) and 50 bits of the supplementary information part, adding up to 80 bits, are transmitted where speech sections are detected, while only 10 bits of side information is transmitted where silent sections are detected. During the discarding because of congestion, every lighter 10 bits of supplementary information are sequentially discarded from data for speech section. As a result, the transmission band of each channel bands from 30 bits comprising only a core information part to 80 bits including all supplementary bits for speech sections, and indicates 10 bits comprising only side information for silent sections.

In a block diagram showing the principle of this invention as shown in FIG. 5B, the request band of each channel for speech sections can be set in units of 10 bits to any value from 30 bits comprising only a core information part to 80 bits including all supplementary information. From the initial value of the request band, bits added for each channel are discarded sequentially in units of 10 bits at the discarding because of congestion, thus performing the arbitration of a band.

FIG. 5C is a block diagram for explaining the principle of this invention where no 10 bits of side information are transmitted, that is, no coded information is transmitted, for voice channels where the call detecting means 24 detects the non-calling-mode. In the calling mode, only 10 bits comprising side information are transmitted for silent sections, and total data ranging from 30 bits of only a core information part for speech sections to 80 bits including all supplementary information are transmitted to each channel.

Next, in this invention, to further improve the transmission efficiency, various control data are compressed and transmitted. For example, when signaling information for a voice channel is transmitted as a signal-send (SS) signal and a signal-receive (SR) signal, (at 26*a* shown in the block diagram in FIG. 5F), compressed transmission of signaling information can be performed where the SS signal remains unchanged, by transmitting a frame with a flag added to it indicating whether or not an SS signal is transmitted in a certain transmission cycle.

Figure 5G:
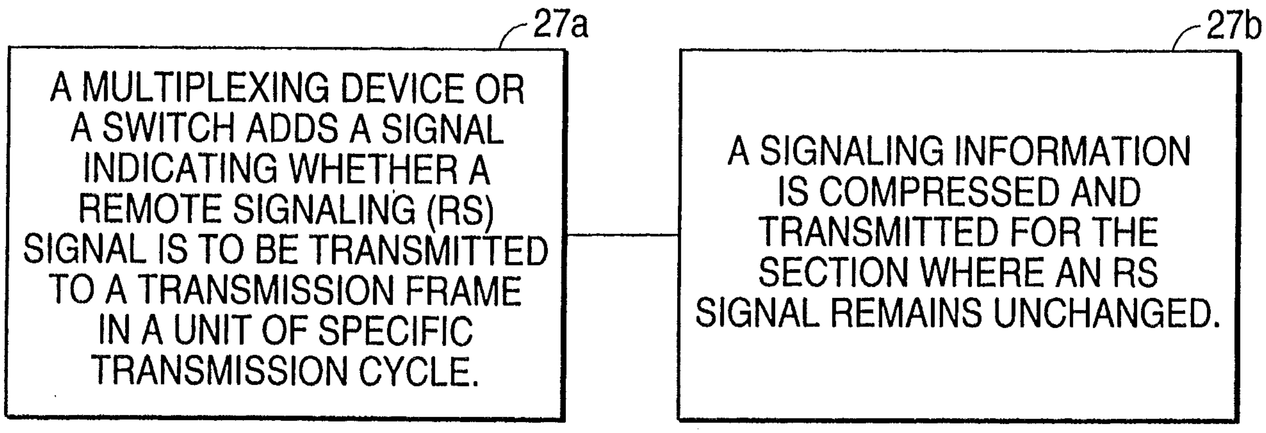

When a level signal is sent as a remote signaling (RS) signal for confirming the mode of a correspondent's device while comprising data channels, at 27*a* as shown in FIG. 5G, the RS signal can also be compressed and transmitted at 27*b* with a flag indicating whether or not an RS signal is transmitted added to a frame.

As described above, in this invention, only side information in a core information part is transmitted for silent sections, while total data including the supplementary information part are transmitted for speech sections. During discarding because of congestion, lighter bits in the supplementary information part are sequentially discarded, thus improving the communication efficiency and permitting compressed transmission of various control data.

Figure 7A:
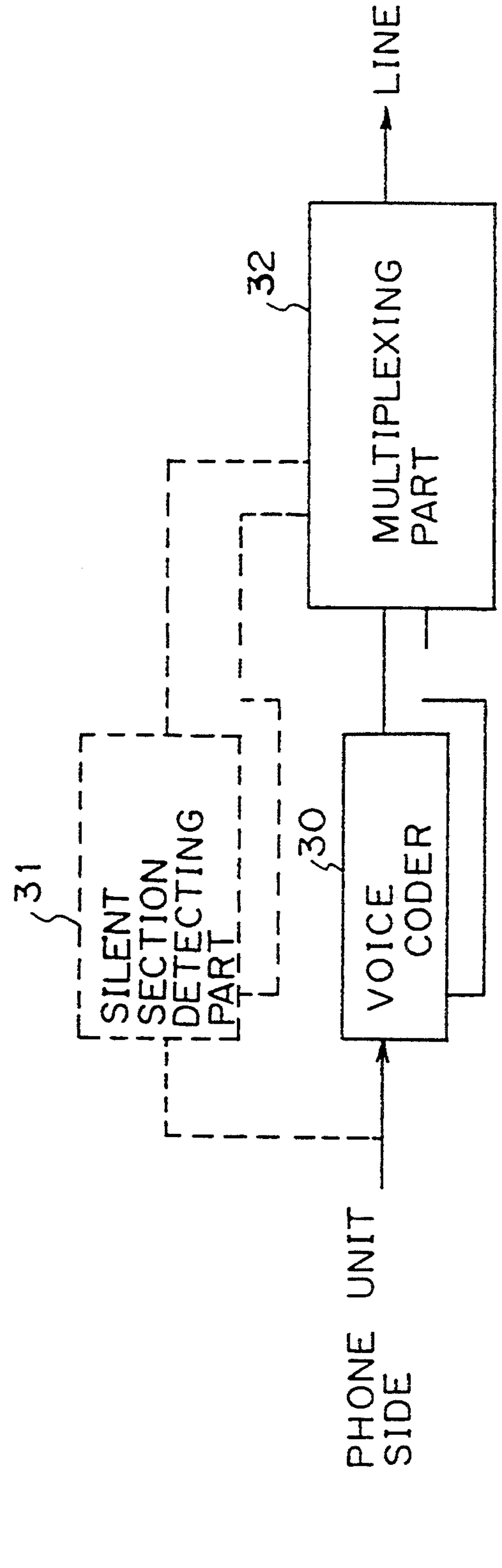
FIGS. 7A, 7B and 7C are views for explaining the basic configuration and operation of an embodiment of the first principle of this invention.

FIG. 7 shows a view for explaining the basic configuration and operation of the first embodiment of the transmission system of this invention. In the block diagram of the basic configuration shown in FIG. 7A, the embodiment comprises a voice coder 30 for coding input voice information provided by a phone, a silent section detector 31 for detecting silent sections in input voice information, and a multiplexing part (MUX) 32 for multiplexing the output of the voice coder 30 according to the detection result provided by the silent section detector 31 and then outputting the result to the line. The information to be used by a multiplexing part 32 for multiplexing voice comprises coded data outputted by the voice coder 30 (a band for each channel is predetermined to 80 bits, for example) and the speech-/silent mode of each voice channel outputted by the silent detector 31. The silent mode can be detected either by the voice coder 30 without independently providing a silent section detector 31 or by the multiplexing part 32 using the output from the voice coder 30.

A voice coded data length $V_i'$ actually transmitted to each voice channel (expressed by subscript i) is given by the following expression:

$$W' \geqq \Sigma(VDF_i \times (i' - V_S)) + N \times V_s \quad (1)$$

and $$V_i \geqq V_i' \geqq V\text{min} \quad (2)$$

Here, $V_i'$ is the number of bits assigned to each channel through a band arbitration process described later and corresponds to the band. The band of a channel is the product of the number of bits 10 assigned to the channels multiplied by the number of frames transmitted per second, which is a transmission bit rate. To guarantee the minimum acceptable sound quality, the required number of lines must be determined at the step of designing the line configuration by the following expression:

$$W' \geqq N \times V\text{min} \quad (3)$$

where: W' is the number of bits available on the line side; $V_i$ is the voice coded data length (predetermined as a fixed value); $V_S$ is the number of bits of voice coded data (side information) to be transmitted even during silent sections; $V_i'$ is the length of voice coded data to be transmitted; $VDF_i$ is the speech flag; N is the number of channels to be accommodated; and Vmin is the coded data length necessary for transmission at minimum acceptable sound quality.

The voice coder 30 requires that data be coded in a deletable form within the range from $V_i$ to $V_{min}$. For example, an embedded coder used in the adaptive difference (AD) PCM method is adopted.

Figure 7B:
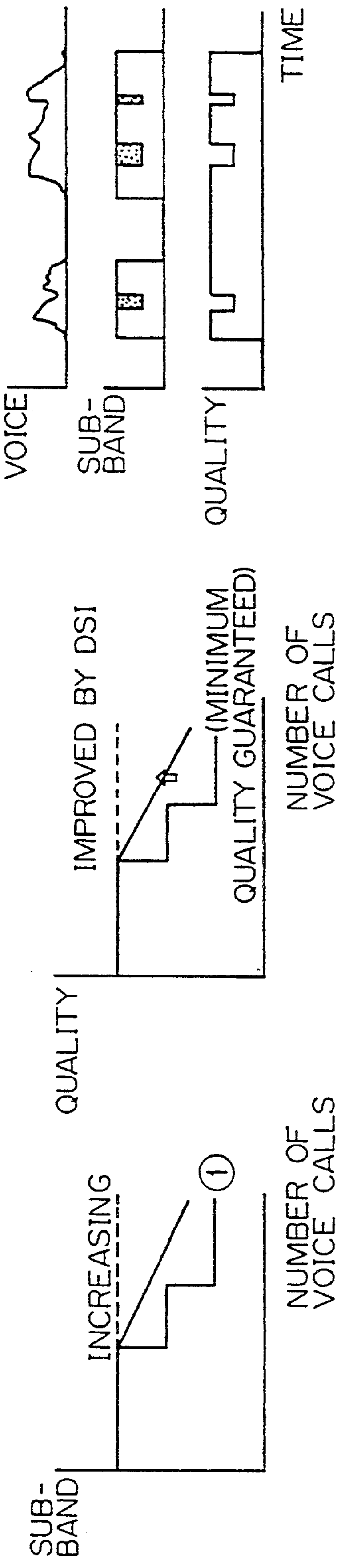

FIG. 7B shows the mode of a band and voice sound quality in the first embodiment. Detecting a silent section and transmitting only side information to the silent voice channel can reduce the deterioration of a band and of sound quality associated with the increasing number of voice calls. Even during the discarding because of congestion, there is only a very scant possibility of complete data for a specific channel being discarded temporarily, thus enabling the reduction of bands during the congestion to be minimized.

A DSI in "the improvement through a DSI" in FIG. 7B indicating the sound quality shows. statistical multiplexing, referring to the improvement of sound quality by extending the average band allocation.

Figure 7C:
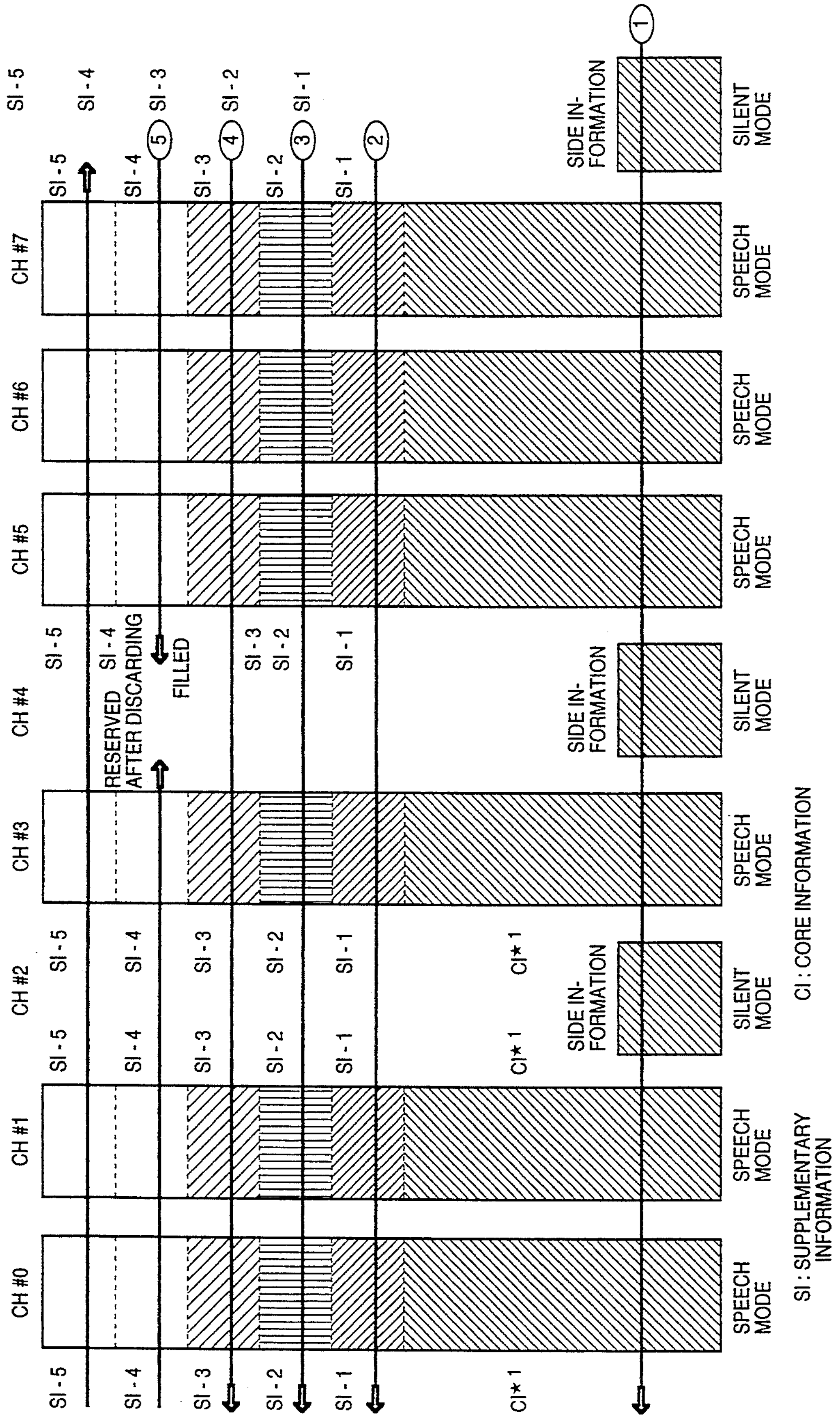

FIG. 7C shows an example of the multiplexing process during the discarding because of congestion in the first embodiment. In FIG. 7C, channels #2 and #4 refer to the silent mode for which only side information is transmitted. During the discarding because of congestion, bits 5 in the supplementary information for respective channels in speech mode sequentially discarded starting from channel #0, then bits 4 in the supplementary information are sequentially discarded starting from channel #0 through to channel #3, and all the remaining data are multiplexed. The data are multiplexed starting with the side information of each channel as shown by 1 in FIG. 7C, ending with the supplementary bits 4 of channel #5.

Figure 8A:
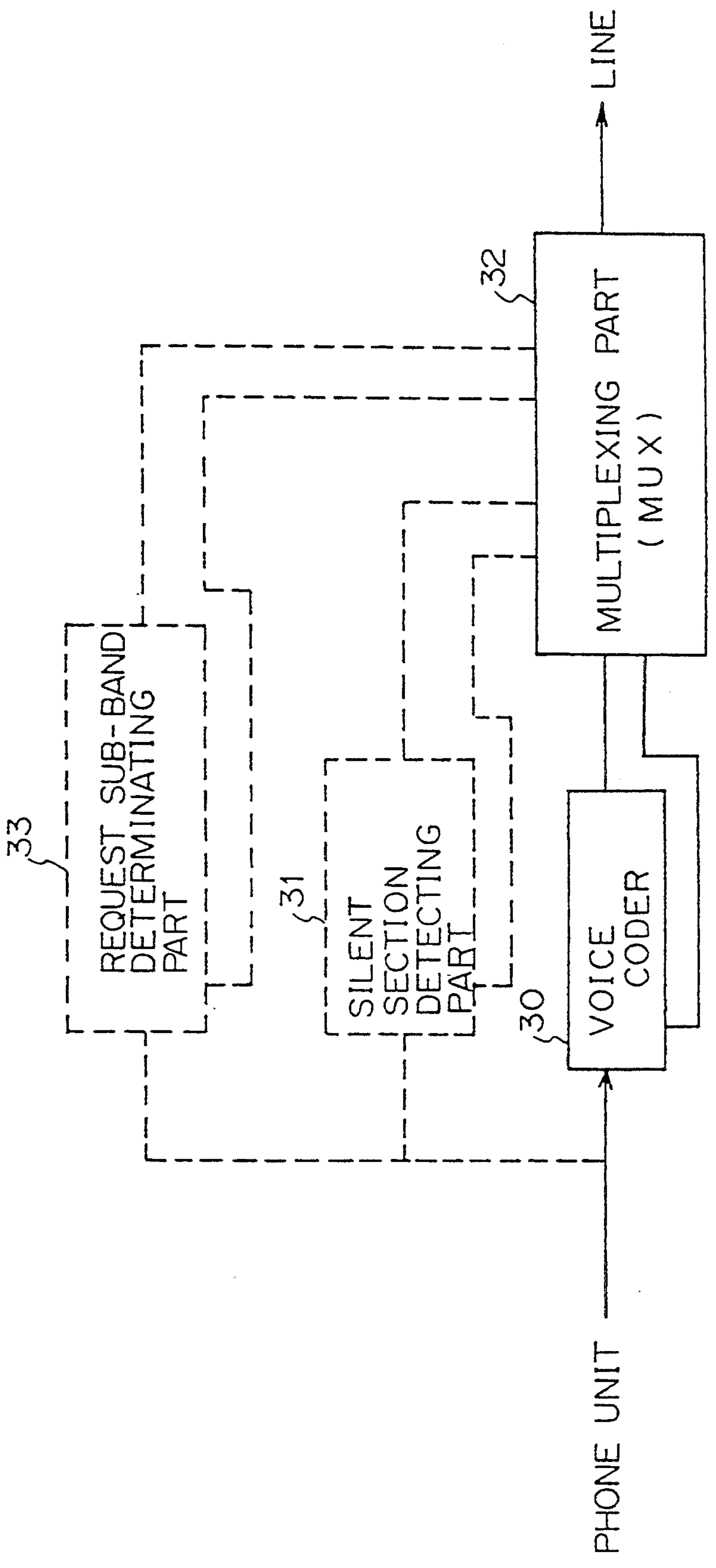
FIGS. 8A, 8B and 8C are views for explaining the basic configuration and operation of the second embodiment of the transmission system in this invention.
Figure 8B:
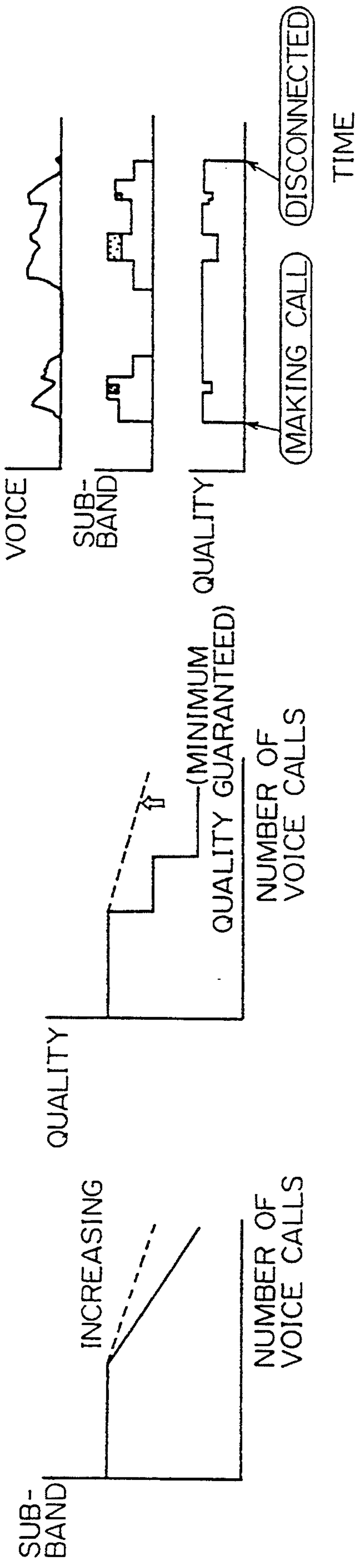
Figure 8C:
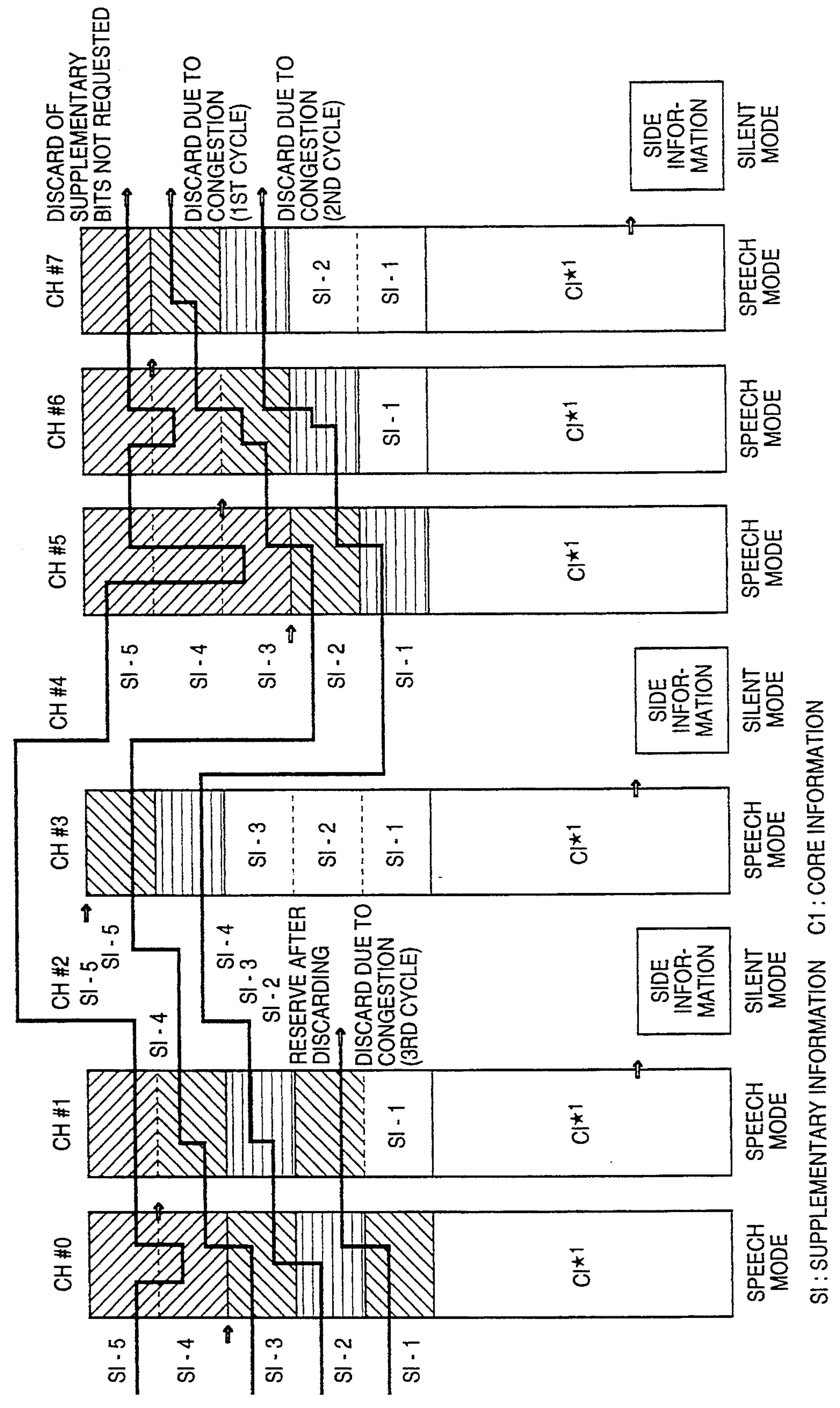

FIGS. 8A, 8B and 8C are block diagrams illustrating the basic configuration and operations of a second embodiment of the transmission system in this invention. In the block diagram FIG. 8A showing the basic configuration, a request band determining part 33 is provided, in addition to the configuration components shown in FIG. 7A, for determining the transmission band necessary for the voice information of each voice channel inputted from the telephone unit side.

The information used by the multiplexing part 32 for multiplexing voice includes coded data outputted by the voice coder 30 (The band can be either fixed or variable), the speech/silent mode information outputted by the silent section detector 31, and the voice coded data length outputted by the request band determining part 33 which is necessary for request quality transmission.

The speech/silent mode can be detected by the voice coder 30 and the multiplexing part 32. The voice coded data length required for requested quality transmission can be detected by the voice coder 30 and determined by the multiplexing part 32.

The multiplexing method in the second embodiment is determined in the identical manner to the expressions (1), (2) and (3) for the first embodiment.

However, the voice coded data length $V_i$ is, unlike in the first embodiment, not predetermined as a fixed value, but a resultant data length obtained after the request band determining part 33 determines a request band for input voice information. The condition for the voice coder 30 is the same as in the first embodiment.

FIG. 8B shows a voice band and sound quality based on the number of voice calls in the second embodiment. In the first embodiment described above, the voice transmission request level can be expressed in 2 values depending on the speech/silent modes. By contrast, in the second embodiment, the speech mode can further be divided into a plurality of levels to perform precise control, thus permitting further advanced improvement of sound quality.

FIG. 8C shows an example of a multiplexing process in the second embodiment. In FIG. 8C, channels #2 and #4 refer to the silent mode for which only side information is transmitted. For example, the request band for channel #0 is up to bits 3 in the supplementary information; the request band for channel #1 is up to bits 4 in the supplementary information; and the request band for channel #3 is up to bits 5 in the supplementary information. During the discarding because of congestion, every 10 bits of the upper supplementary bits in the request band in each channel are sequentially discarded. In FIG. 8C, supplementary bits are discarded up to bits 2 in the supplementary information for channel #1, and all the remaining data are multiplexed.

Figure 9A:
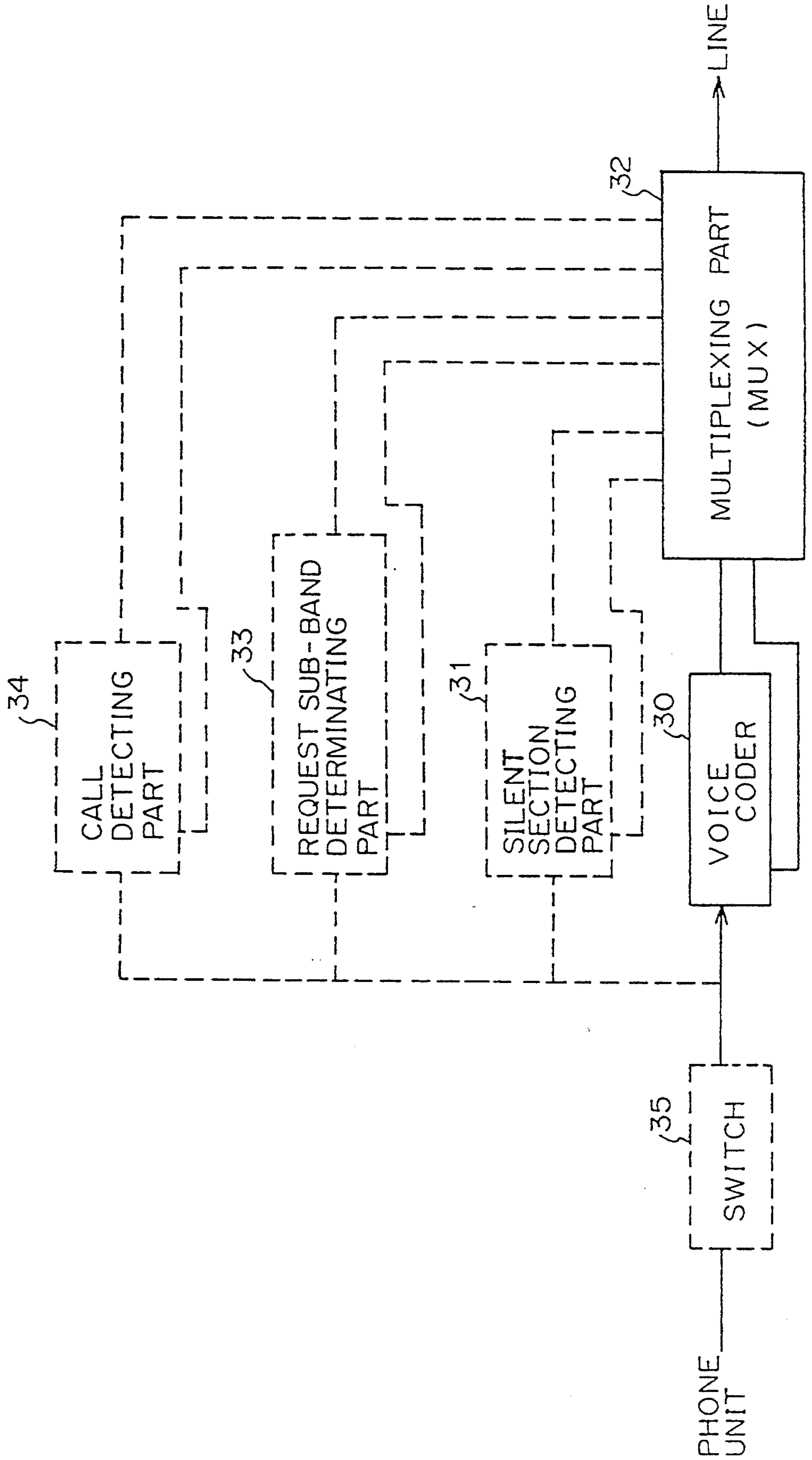
FIGS. 9A, 9B and 9C show a third embodiment of this invention and views for explaining its operation of the transmission system.

FIG. 9 illustrates a third embodiment of this invention and its operations. In FIG. 9, a call detecting part 34 is provided in addition to the configuration components for the second embodiment shown in FIG. 8. This is for detecting whether or not a call is being made, that is, the calling mode or the non-calling-mode, to prevent transmitting coded data to a voice channel having no calls at all. A switching system 35 is also provided between the phone unit side and the voice coder 30.

The information used by the multiplexing part 32 for voice multiplexing includes the speech/silent mode information detected by the call detecting part 34 in addition to the information in the second embodiment. However, the speech/silent mode can be notified by the switching system 35, or determined by either the voice coder 30 or the multiplexing part 32.

In the method for multiplexing voice, the following expression (4) is used instead of (1) in the first and second embodiments:

$$W' \geqq \Sigma(VDF_i \times (V_i' - V_s)) + \Sigma(V_s \times CDF_i) \quad (4)$$

Expressions (2) and (3) are also used in the third embodiment. In expression (4), a $CDF_i$ is a calling-mode flag for a channel i, set to 1 during the calling mode, and set to 0 in the non-calling-mode. The condition for the voice coder 30 is the same as that described above.

Figure 9B:
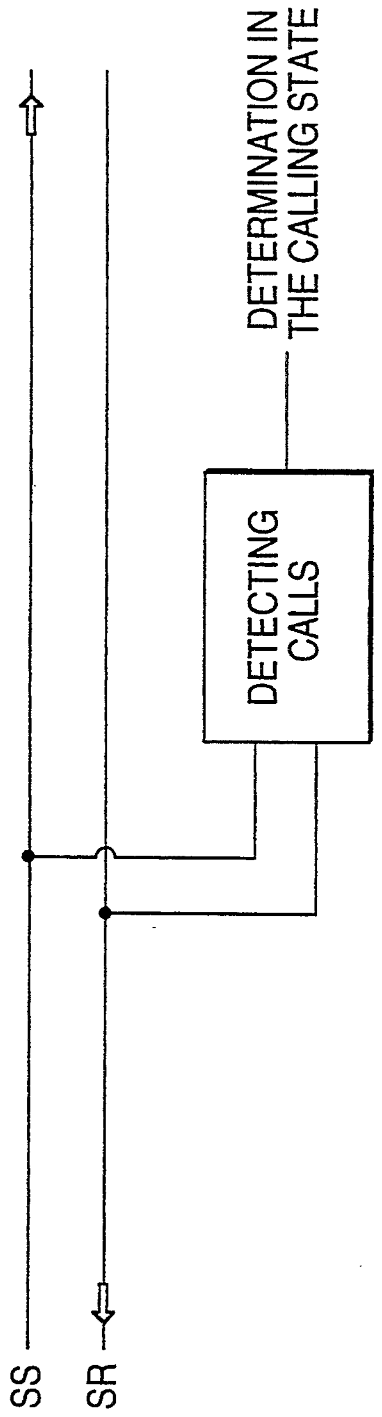
Figure 9C:
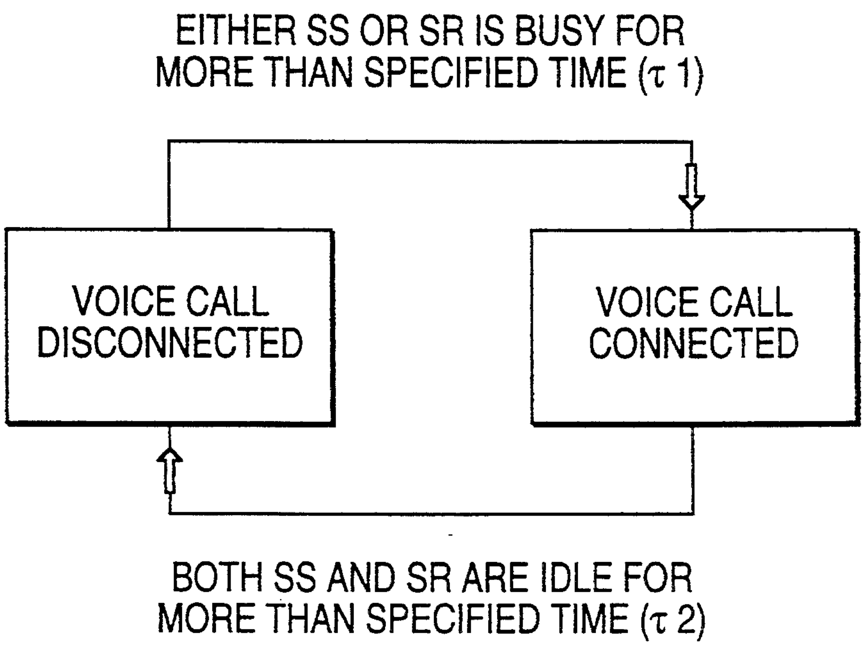

In this invention, the calling mode is not notified by a switching system, but detected by a coder or a multiplexing part, where a signal-send (SS) signal and a signal-receive (SR) signal are monitored as signaling information of voice channels to detect the calling/non-calling mode. FIGS. 9B and 9C show an embodiment of call detection. In FIG. 9B, a call is detected by monitoring the SS signal sent from the sending side and the SR signal sent from the receiving side, where a mode notifying path from a switching system is not required.

FIG. 9C shows a logic of call detection. In FIG. 9C, assuming that SS and SR signal are set to 1 when a call is not made at all (idle), and set to 0 when a call is made (busy), if the logical sum of SS and SR signals remains at '0' for more than the specified time period $\tau_1$, for example 1 second, it refers to the calling mode. Meanwhile, if the logical product of SS and SR signals remains at '1' for more than the specified time period. $\tau_2$, for example 1 second, it refers to the non-calling-mode.

Figure 10:
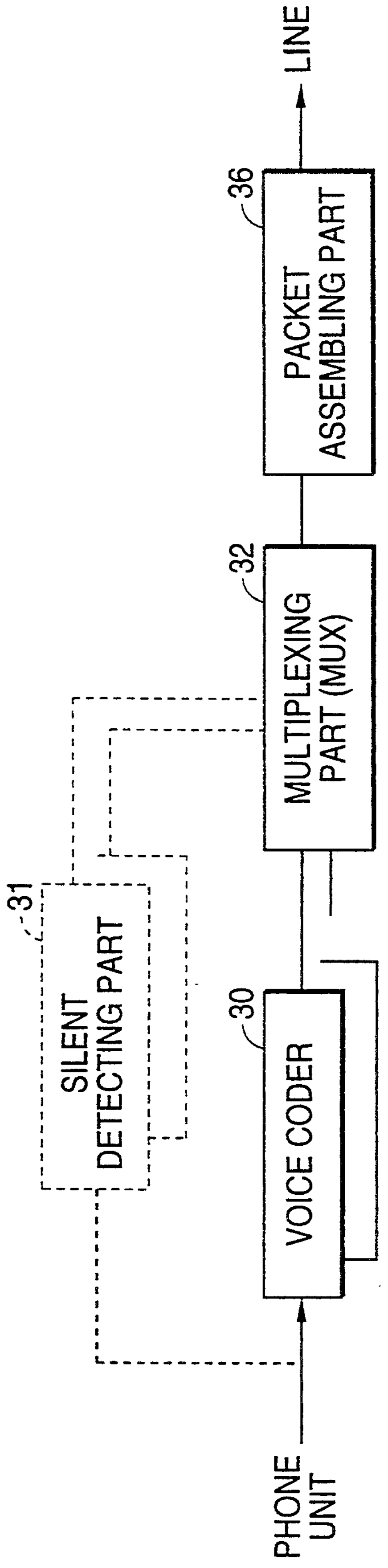
FIG. 10 is a block diagram for explaining the configuration of the fourth embodiment of the transmission system of this invention.

FIG. 10 shows a block diagram illustrating the configuration of a fourth embodiment of the transmission system of this invention. In this embodiment, a multiplexed frame generated by the multiplexing part 32 is assembled in a packet form of the label switching system network, for example in fixed length packet form and an ATM cell form by a packet assembling part 36, and then transmitted within the label switching system network.

FIG. 10 shows the configuration of the packet assembling part 36 added to the first embodiment shown in FIG. 7. It is obvious that a packet assembling part can also be added to the second and third embodiments. The operations of the voice coder 30, the silent section detector 31, the multiplexing part 32, etc. are the same as those in the first, second and third embodiments.

Figure 11:
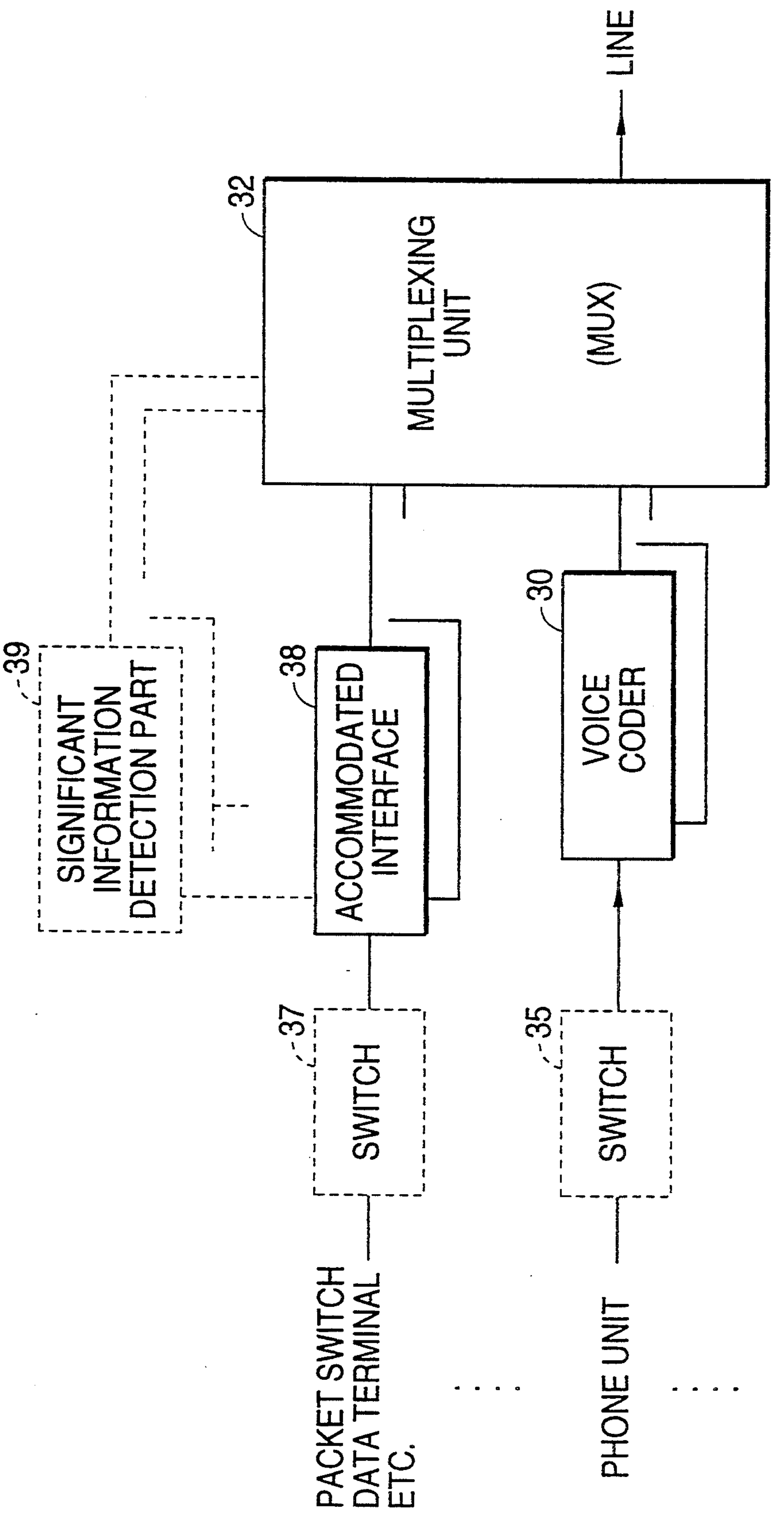
FIG. 11 is a block diagram showing the basic configuration of the fifth embodiment of the transmission system of this invention.

FIG. 11 is a block diagram for explaining the basic configuration of a fifth embodiment of the transmission system of this invention. FIG. 11 shows a sample of the voice information of a plurality of voice channels, which is inputted from the phone unit through the switching system 35 and coded by the voice coder 30. FIG. 11 also shows an embodiment of a multiplexing device for outputting the information to the line after multiplexing by the multiplexing part 32, a packet and data inputted from a packet switching system or a data terminal, etc. through a switching system 37 and the accommodated interface 38. The switch system 35 and 36 are not required where a fixed route is set without requiring any switching system.

A significant information detecting part 39 detects the necessity for transmitting a packet or data inputted to the accommodation interface 38 by detecting an insignificant part having the value all 1 and the usage of a terminal. The detection can be performed by the switching system 37 or the multiplexing part 32. The information used for multiplexing media other than voice channels such as a data terminal and a packet switching system is transmission information generated by the accommodation interface 38 (a band can be fixed or variable) and the significant information for the transmission information.

As the multiplexing method, a band required for multiplexing a packet and data inputted through the switching system 37 or the accommodation interface 38 is subtracted from the number of bits W' available on the line side, and the band W'' allocated to a plurality of voice channels is determined by the following expression:

$$W'' = W' - (\Sigma(DAF_i \times (D_i - D_{s-i}))) - \Sigma D_{s-i} \quad (5)$$

The number of available lines is determined by the following expression (6) so that the minimum sound quality can be ensured at the step of designing the line configuration, $$W' \geq N \times V\min + \Sigma D_i \quad (6)$$

For the voice information of each of the voice channels, one of the above described methods in the first to third embodiments is used for multiplexing. As described later, the history can determine the discarding method.

In expressions (5) and (6), W'' is the number of bits available on a voice channel, N is the number of voice channels accommodated, $D_i$ is the transmission data length of a packet or each datum, $DAF_i$ is a significant-/insignificant flag of data, and $D_{s-i}$ is control information for each datum.

Figure 12A:
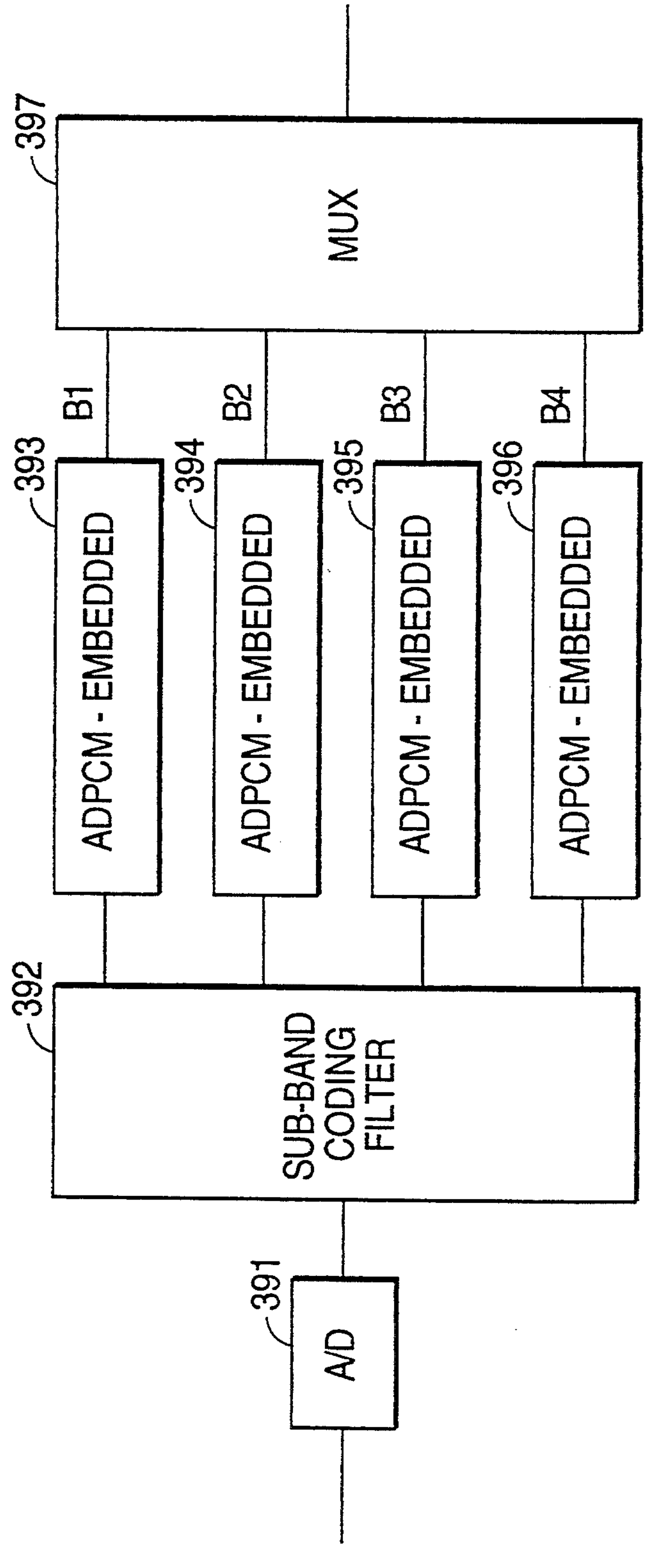
FIGS. 12A and 12B show the sixth embodiment of the transmission system and a diagram for explaining the operation of this invention.
Figure 12B:
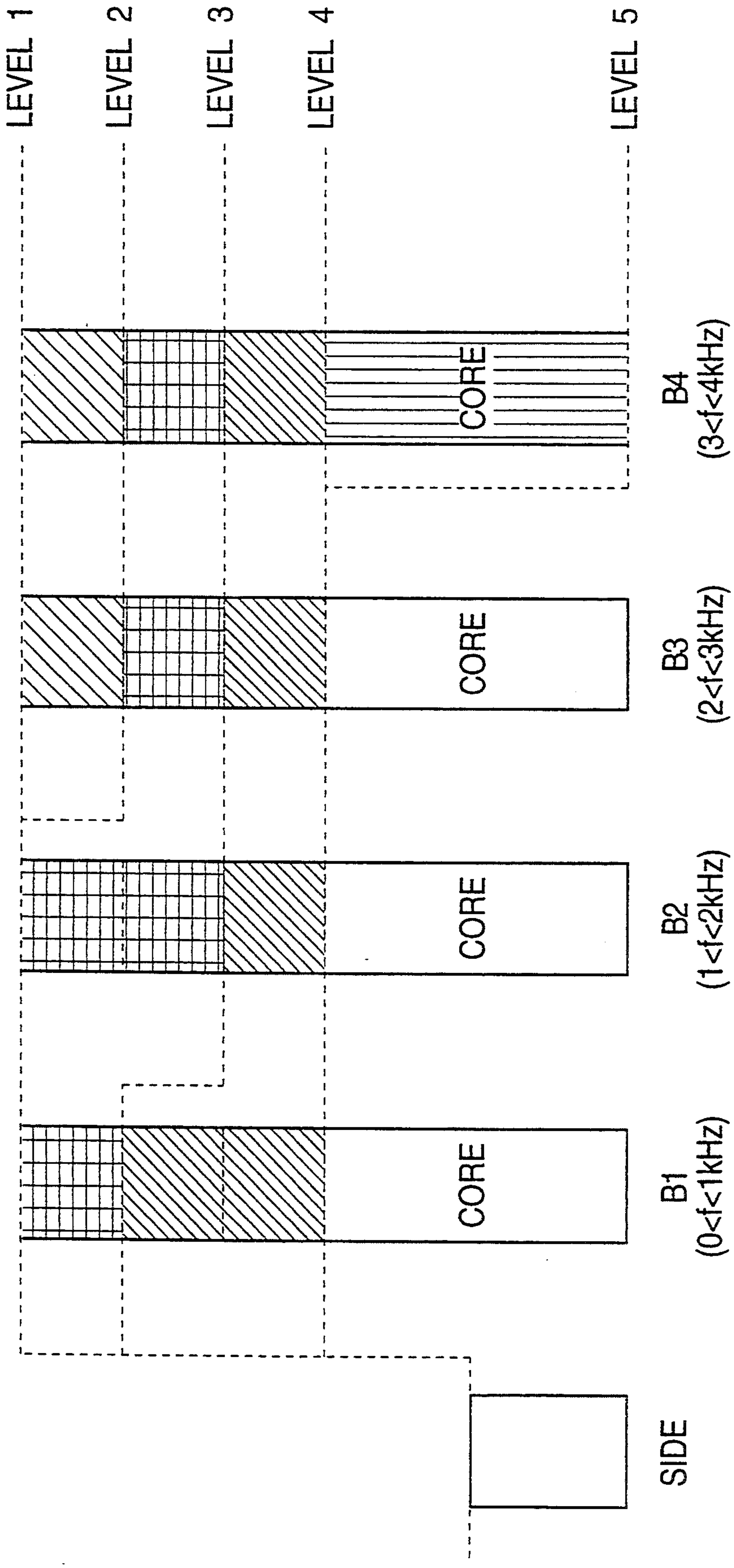

FIGS. 12A and 12B show a sixth embodiment of the transmission system of this invention and its operations. In the configuration diagram, FIG. 12A, only an A/D transformer 391, a sub-band coding filter 392, an ADPCM embedded coder 393 to 396, and a multiplexing part (MUX) 397 are indicated. There is no silent section detector, etc. In FIG. 12, input voice information is transformed to a digital signal by the A/D transformer 391, divided by the sub-band coding filter 392 into, for example, a band B1 of 0–1 KHz, B2 of 1–2 KHz, B3 of 2–3 KHz, and B4 of 3–4 KHz, each block of information being coded by respective ADPCM embedded encoders 393 through 396, multiplexed by a multiplexer (MUX) 397, and then outputted to the packet network side.

FIG. 12B shows an embodiment of discarding level in a multiplexing device to which the sub-band coding method is applied. In FIG. 12B where there are four sub-bands, it is assumed for simplification that core and supplementary information parts in respective sub-bands respectively have 2 and 3 bits. As shown in FIG. 12B, at level 1, all bits in core and supplementary information parts are transmitted without being discarded. At level 5, 2 bits in the respective core information parts are transmitted to bands B1 B2 and B3, but the bits in the core information part for band B4 having the highest frequencies are discarded without being transmitted.

In this invention, as described e.g. in FIG. 7C, the voice transmission band for each voice channel is split prior to transmission. However, a multiplexed frame on a line transmits the transmission band of each channel as a code. Various meanings depending on the kind of voice coder and the operating mode the setting are allocated to these codes.

Figure 13:
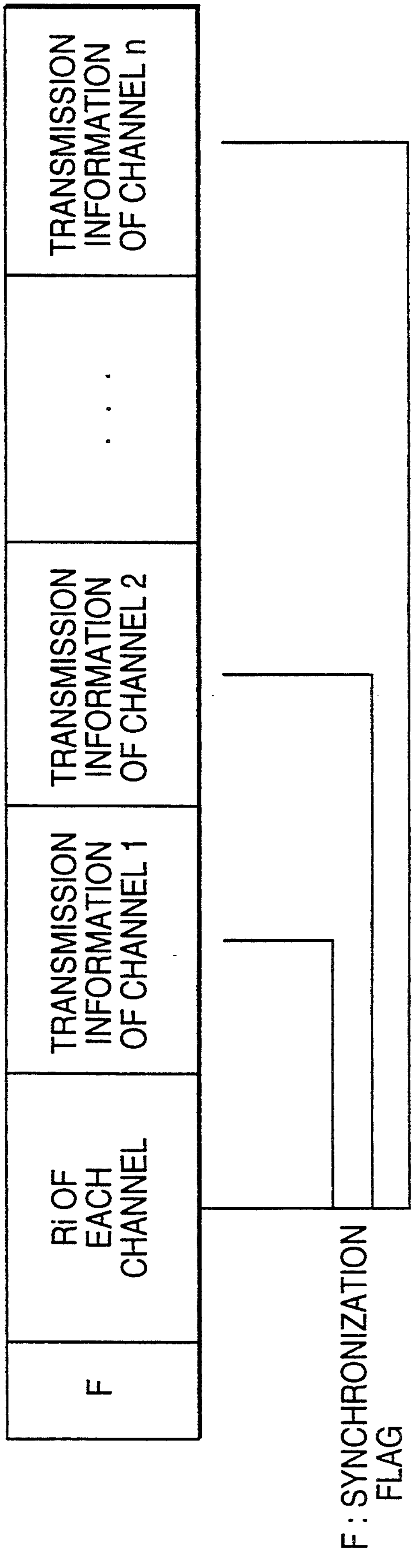
FIG. 13 shows an embodiment of a multiplexing frame where a transmission band is transmitted as a code.

FIG. 13 shows an embodiment of a multiplexed frame where a transmission band is transmitted as a code. In FIG. 13, an $R_i$, transmission band information for each voice channel coded following a synchronous flag F of the frame, is multiplexed first, and then transmission information for each actual channel is multiplexed. The transmission band code $R_i$ is made error-resistant by adding an error correction code (ECC).

Described above is the whole procedure for efficiently transmitting, to a correspondent, the transmission band information necessary for holding voice channels in a variable band. With regard to media other than those for voice transmission, similar codes can be used for notifying of the transmission band, specifically of the necessity for transmission. For media such as data channels which provide fewer modes, the number of bits can be reduced, where the efficiency can be further improved by filing the data of a packet switching system in the blank.

In FIG. 11 indicating the fifth embodiment described above where queuing media (e.g. packet switching system), other than voice channels, are multiplexed, a band can be reserved for the minimum throughput required for respective media. Then arbitration is made for voice multiplexing, and finally remaining bands are allocated to the media. Thus, the line is efficiently utilized. In this case, the allocation of the minimum throughput to the above media can be made variable depending on a voice request band and activity (speech/silent mode, calling mode).

Next, an explanation is given with regard to the first through sixth embodiments, about the method of discarding information in consideration of the weight information for discarding according to the history and the priority of each channel when coded voice information has to be somehow discarded. In arbitrating the discarding priority among channels, the number of accommodated lines is determined by the following expression to ensure the minimum request sound quality for each channel:

$$W' \geq \Sigma(V\min - i) \quad (7)$$

For the actual multiplexing, the voice coded data length $V_i$ can be determined to meet following expressions (8) and (9):

$$W' \geq \Sigma(VDF_i \times (V_i - V_s)) + \Sigma V_s \times CDF_i \quad (8)$$

$$V_i \geq V_i' \geq V\min - i \quad (9)$$

The meanings of the signs used in expressions (7) (8) and (9) are the same as those in the second and third embodiments. However, the coded data length Vmin required for transmitting information in the minimum sound quality is the same, while in this method, the value Vmin is set separately for each channel.

Figure 14:
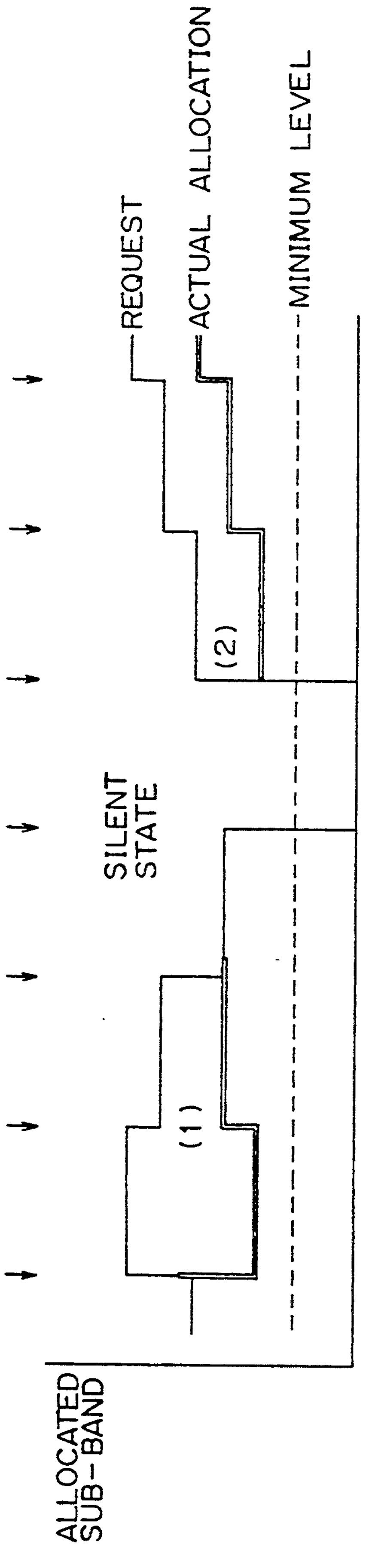
FIG. 14 shows an embodiment of a method of discarding determination for the current transmission frame according to the past discarding history.

FIG. 14 shows an embodiment of a method for determining the discard in the current transmission frame according to the past discarding history. In FIG. 14, as shown in expression (1), restoration to the request band is performed sequentially when discarding because of congestion occurs. As shown by expression (2), a narrower band is allocated when the mode changes from silent to speech. In FIG. 14, the arrow shows the time at which band allocation is determined.

Figure 1:
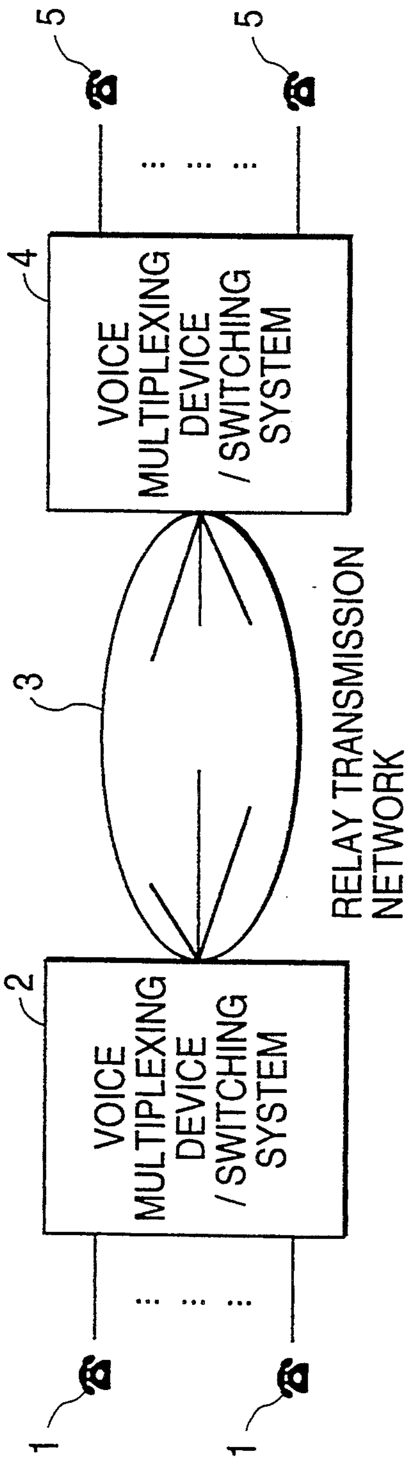
FIG. 1 shows an example of a voice multiplexing device or a switching system.
Figure 2:
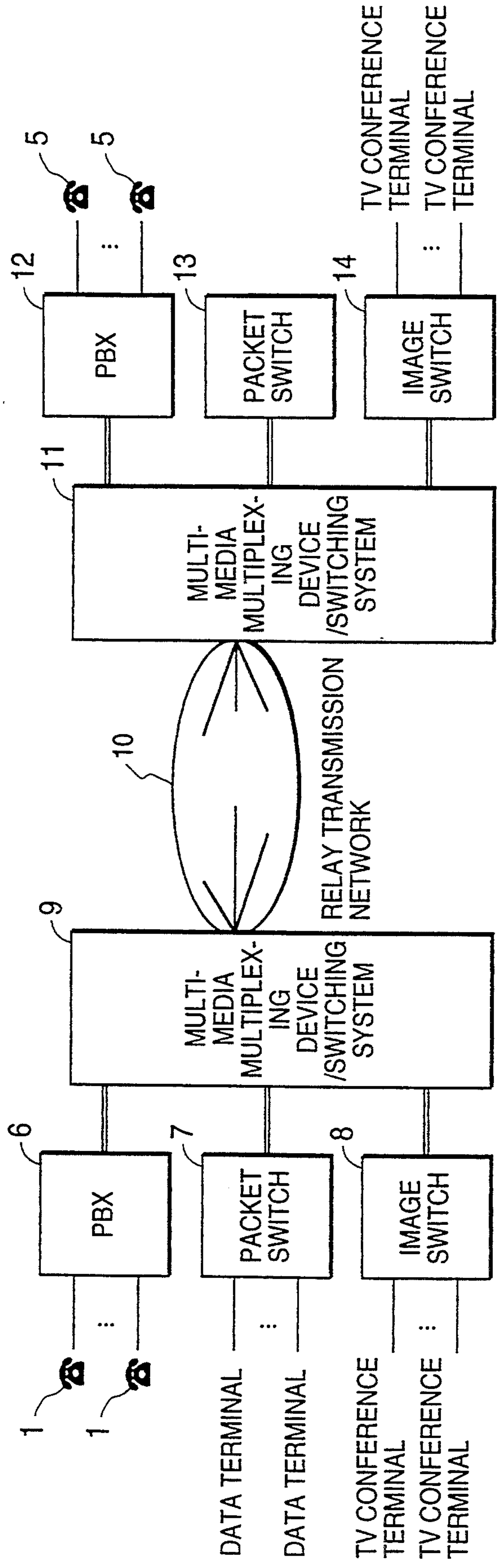
FIG. 2 shows an example of a multi-media multiplexing device or a switching system.
Figure 3A:
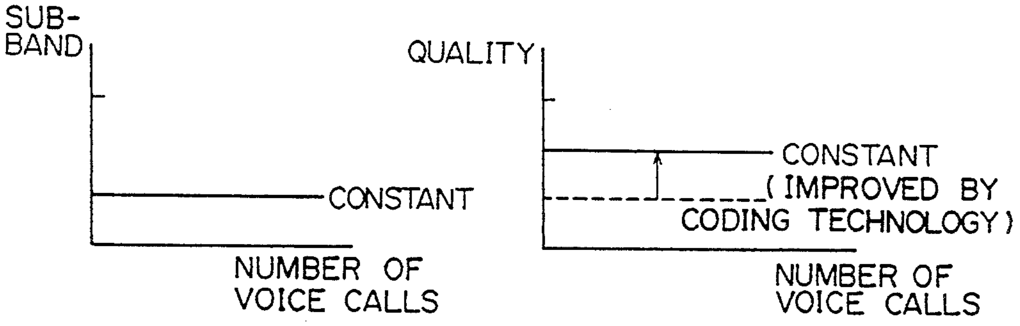
FIGS. 3A and 3B show examples of band allocations using a conventional TDM multiplexing method and a statistical multiplexing method.
Figure 3B:
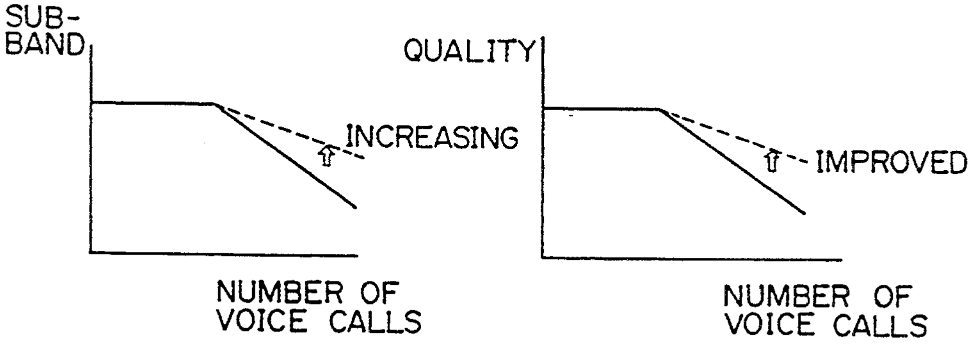
Figure 4:
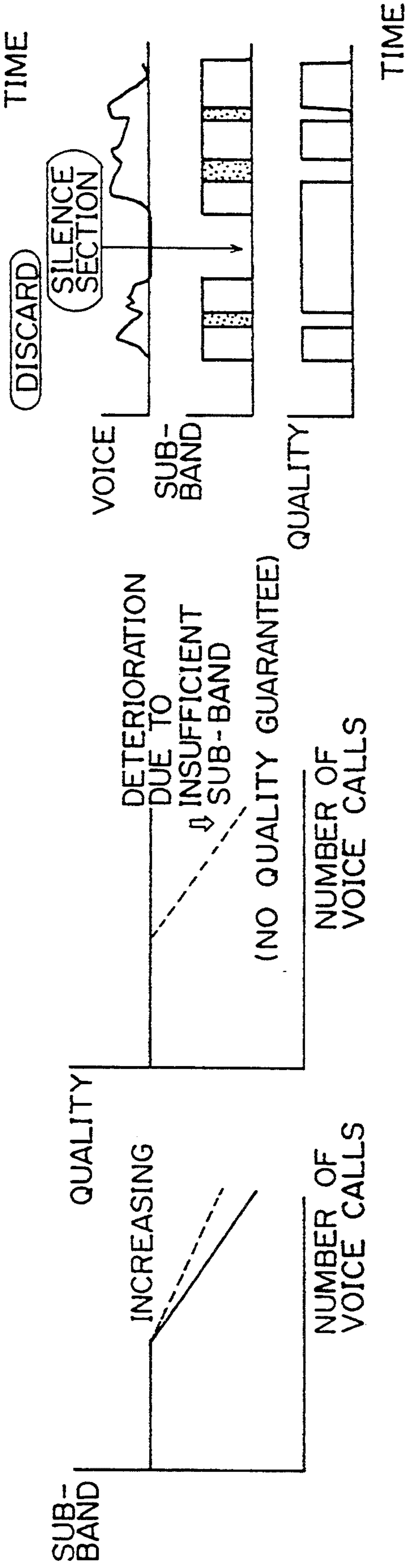
FIG. 4 shows an example of band allocations using a DSI method.
Figure 15:
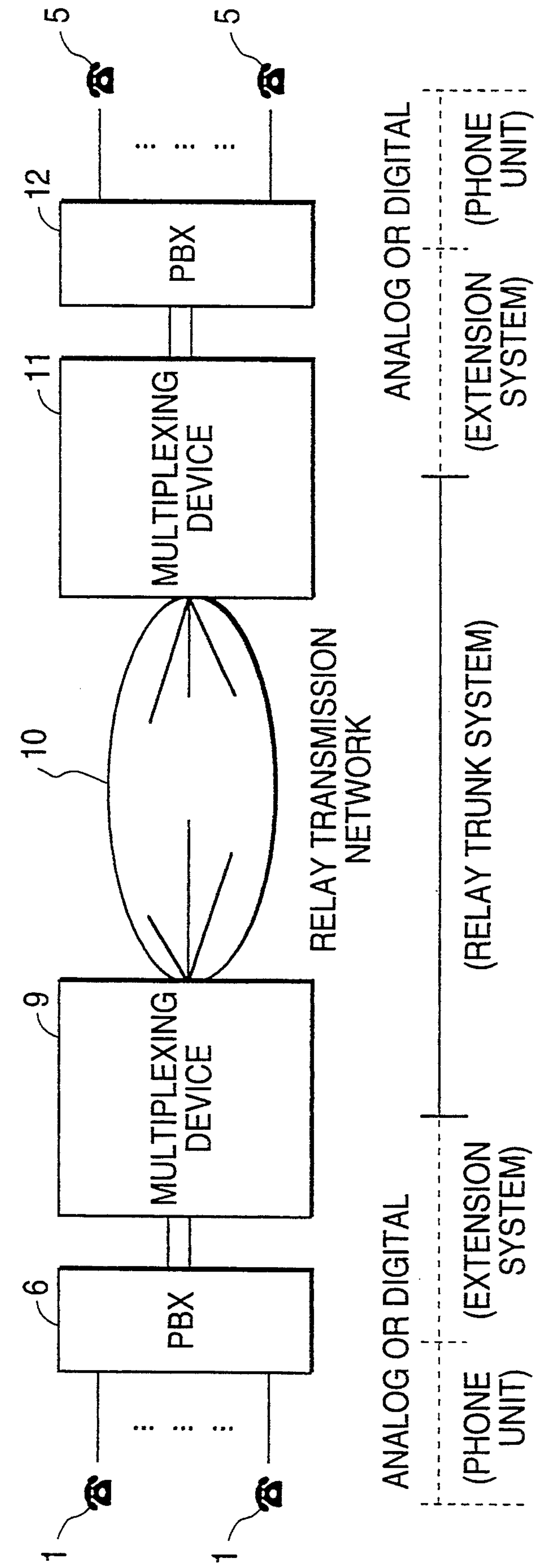
FIG. 15 shows an embodiment of a voice multiplexing transmission system.

FIG. 15 shows an embodiment of a voice multiplexing transmission system. FIG. 15 is almost identical to a part of the multi-media multiplexing transmission system as shown in FIG. 2. Identical parts are allocated the same numbers. In the telephone units and extension system from the telephone unit 1 to the multiplexing device 9, analog or digital signals are used. In the relay trunk system from the multiplexing device 9 to the multiplexing device 11 through the transmission network 10, digitally coded transmission is performed.

Figure 16A:
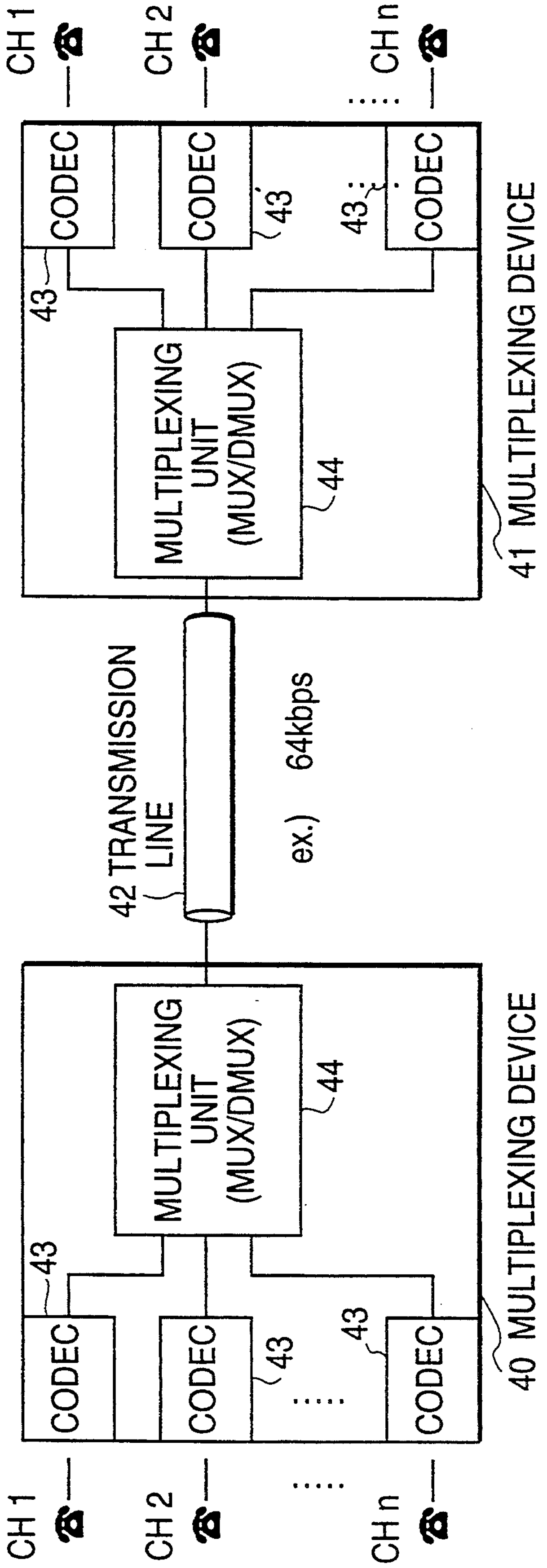
FIGS. 16A and 16B show a basic configuration of a multiplexing device and a basic example of the process of a multiplexing unit.
Figure 16B:
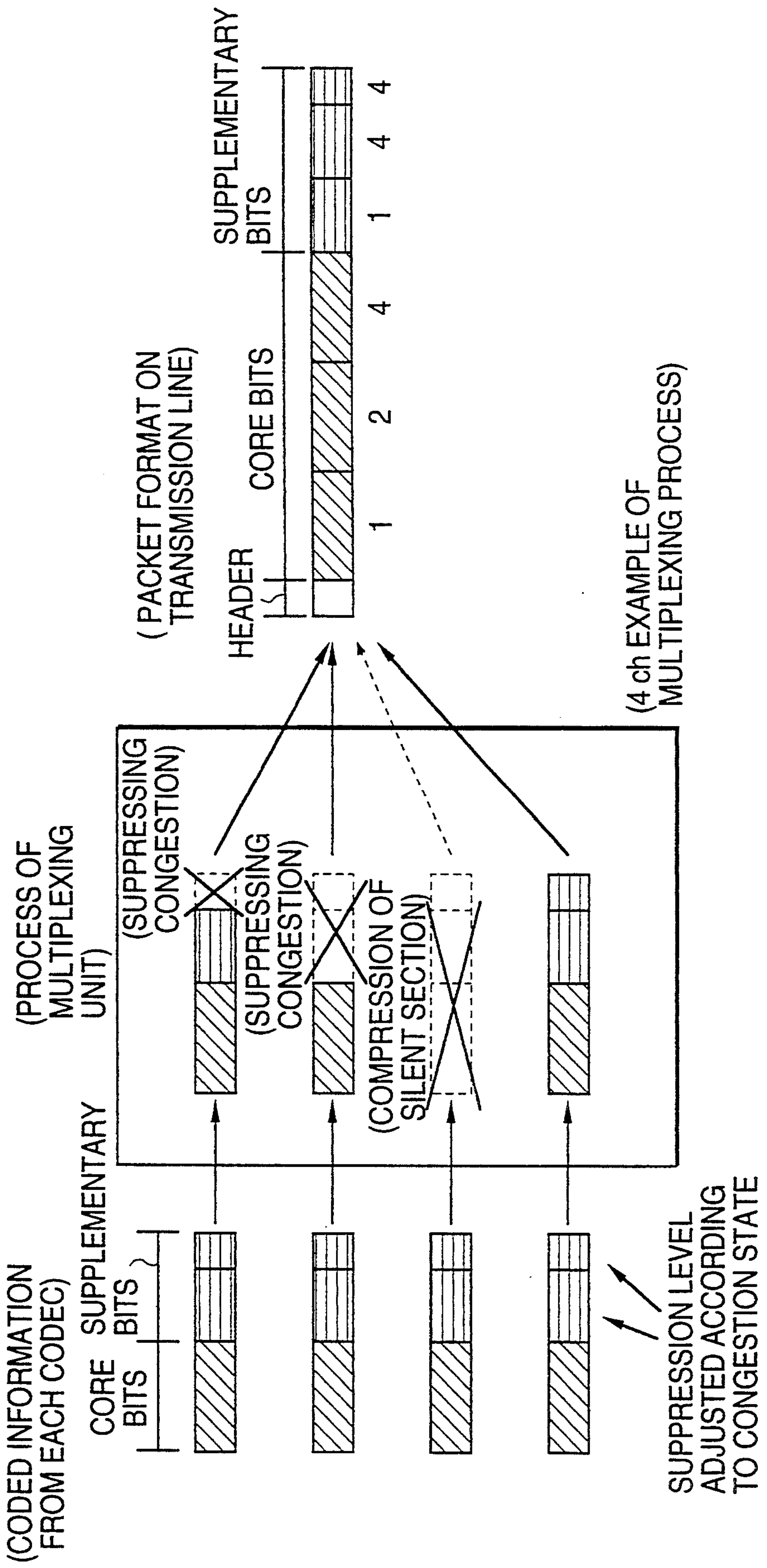

FIGS. 16A and 16B show a basic configuration of a multiplexing device and a basic example of the process of a multiplexing unit. FIG. 16A also refers to a configuration of a multiplexing transmission system comprising a multiplexing device, and multiplexing devices 40 and 41 are connected to both ends of a transmission line 42. Each multiplexing device comprises a CODEC 43 corresponding to each voice channel and a multiplexing unit (MUX/DMUX) 44.

FIG. 16B shows a basic example of the process of a multiplexing unit. In this invention, the embedded multiplexing method is adopted where the voice coded information is split for transmission into core bits and supplementary bits. Core bits refer to basic information that cannot be discarded, while supplementary bits refer to redundant bits that can be discarded when the congestion of voice information occurs in a multiplexing unit. Discarding supplementary bits necessarily deteriorates sound quality, but permits transmission of core bits, thus ensuring the minimum sound quality provided by core bits.

Since supplementary bits are sequentially discarded during the discarding because of congestion, the deterioration of sound quality can be minimized at the lower level of congestion. Besides, when a communication is not made or silent is detected in information being transmitted, a silent compression is made, and silent sections are not transmitted to the transmission line.

In FIG. 16B, channel 3 is silent compressed for silent, and its core bits are not transmitted. The suppression levels of supplementary bits are arbitrated according to the congestion level. The supplementary bits of channel 2 are not transmitted at all, but the supplementary bits of channels 1 and 4 are transmitted.

Described below in association with FIGS. 16A through 16D are the functions required to execute the statistical multiplexing method of this invention, that is, the statistical multiplexing method applied to the activity fluctuation among voice channels transmitted to the same transmission line. In the frame format as shown in FIG. 16B, the existence of transmission information of each channel, the emission band of transmission information of each channel, etc. are transmitted as a part of header information.

First, the method for identifying the activity of each voice channel and the notification route are described. A coder of a CODEC 43 in a multiplexing device 40 shown in FIG. 16A identifies the calling mode, the speech/silent mode, and the measuring information for transmission request, and the result is sent to a multiplexer (MUX) of a multiplexing unit 44. Here, the calling mode is identified by monitoring the signaling -information, the speech/silent mode is identified by a voice detector (VDET) described later, and the weighting information for transmission request generates information of up to 8 levels/channels using the SN ratio as a yardstick.

A multiplexer in a multiplexing unit 44 arbitrates the line multiplexing based on the above described information. A band may be reduced to less than a requested band as a result of the arbitration. All coder information is transmitted to a multiplexer, and sometimes transmission beyond the requested band is enabled. After the arbitration of the line multiplexing, a multiplexer informs a demultiplexer (DMUX) of the multiplexing unit 44 within the correspondent's multiplexing device 41 through the transmission line 42, for example, the transmission level (code) of the identification result of calling, the speech/silent mode, and the arbitration result by a multiplexer.

The demultiplexer informs a decoder of a CODEC 43 within a multiplexing device 41 or a relaying multiplexer in the succeeding stage of received information "as is", and the decoder in turn recognizes the amount of coded data to be provided through the information from the demultiplexer of the transmission level, and then detects an occurrence of a discard.

Other requisite functions in the statistical multiplexing method of this invention include a relay switching function of the system, countermeasures to erroneous transmission on a transmission path, the utilization efficiency of a transmission path, and a function for monitoring the fluctuation of transmission quality of each channel.

As described above, the first function necessary for adopting an embedded multiplexing method is a redundancy detecting function of voice transmission, where the calling/non-calling-mode and the speech/silent mode are identified by a coder, and necessary transmission bands are informed to a multiplexing unit.

The second function is an arbitrating function for an embedded multiplexing, where the multiplexer in a multiplexing unit deletes unnecessary coded information and the remaining bands are flexibly allocated to other voice channels.

The third function is a discard information notifying function where a multiplexer notifies multiplexing units of the information on transmission bands of respective channels, and the information is provided as header information of periodically transmitted fixed length frames. An error correction code is added to a header as a countermeasure to a line error.

The fourth function is a logging function realized by a multiplexer and an external console, where the utilization of lines and the fluctuation of sound quality of each channel can be confirmed from an external console.

Figure 17:
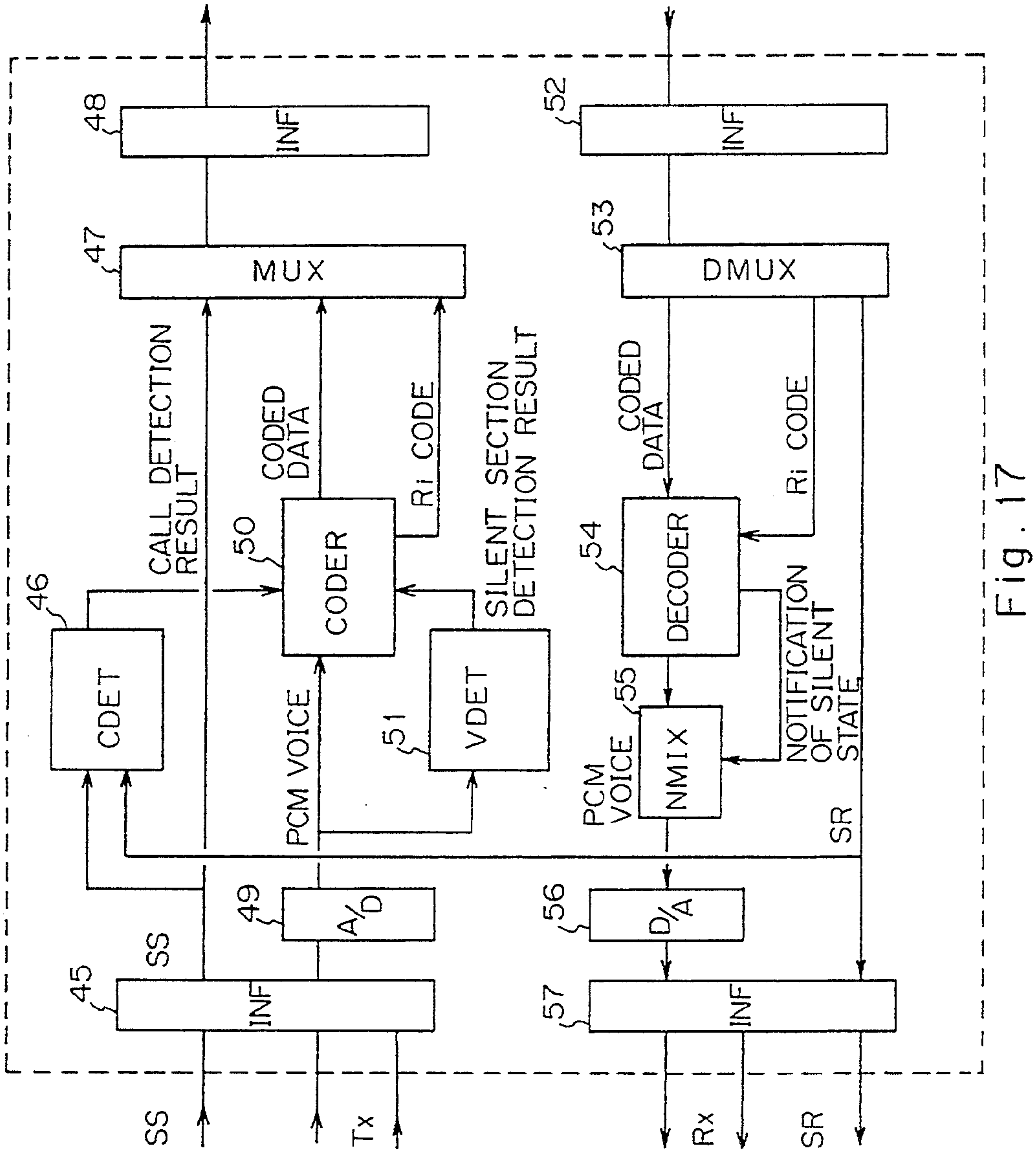
FIG. 17 is a block diagram of an embodiment of a voice coder.

FIG. 17 shows a block diagram of an embodiment of a voice coder. In FIG. 17, a voice coder uses the following devices for sending data: a 6-line interface 45 comprising 4 lines for transmitting voice signals and 2 lines (SS/SR) for transmitting signaling information such as on dial pulses, etc., a call detector (CDET) 46 for detecting a call through monitoring by SS and SR signals, a multiplexing part (MUX) 47 for sending an internal bus interface, an internal bus interface circuit 48 for emission, an analog-to-digital (A/D) converting part 49 for transforming voice codes to digital signals, a coder (CODER) 50 for outputting voice codes identifying core bits that cannot be discarded and supplementary bits that can be discarded sequentially, and a voice detector (VDET) 51 for detecting silent sections by using the output from the A/D converting part 49.

On the other hand, the following devices are used for receiving data: an internal bus interface circuit 52 for receiving data, a demultiplexing part (DMUX) 53 for receiving an internal bus interface, a voice signal decoder (DECODER) 54 for decoding coded data, a noise mixing part (NMIX) 55 that is a noise interposing circuit for reducing abnormal impression given by silent sections, a digital-to-analog(D/A) converting part 56, and an OD circuit interface 57.

Figure 18A:
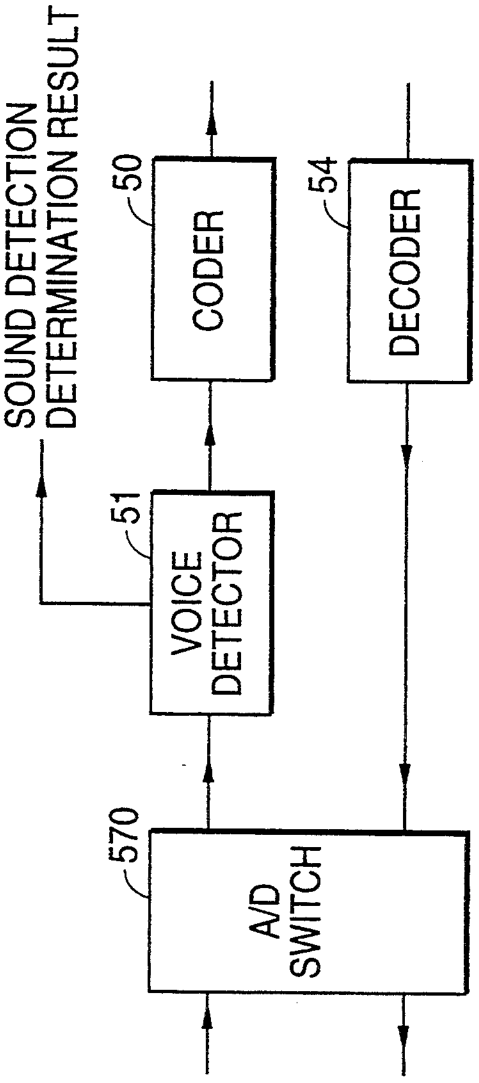
FIGS. 18A and 18B are views outlining the speech/silence determining method.
Figure 18B:
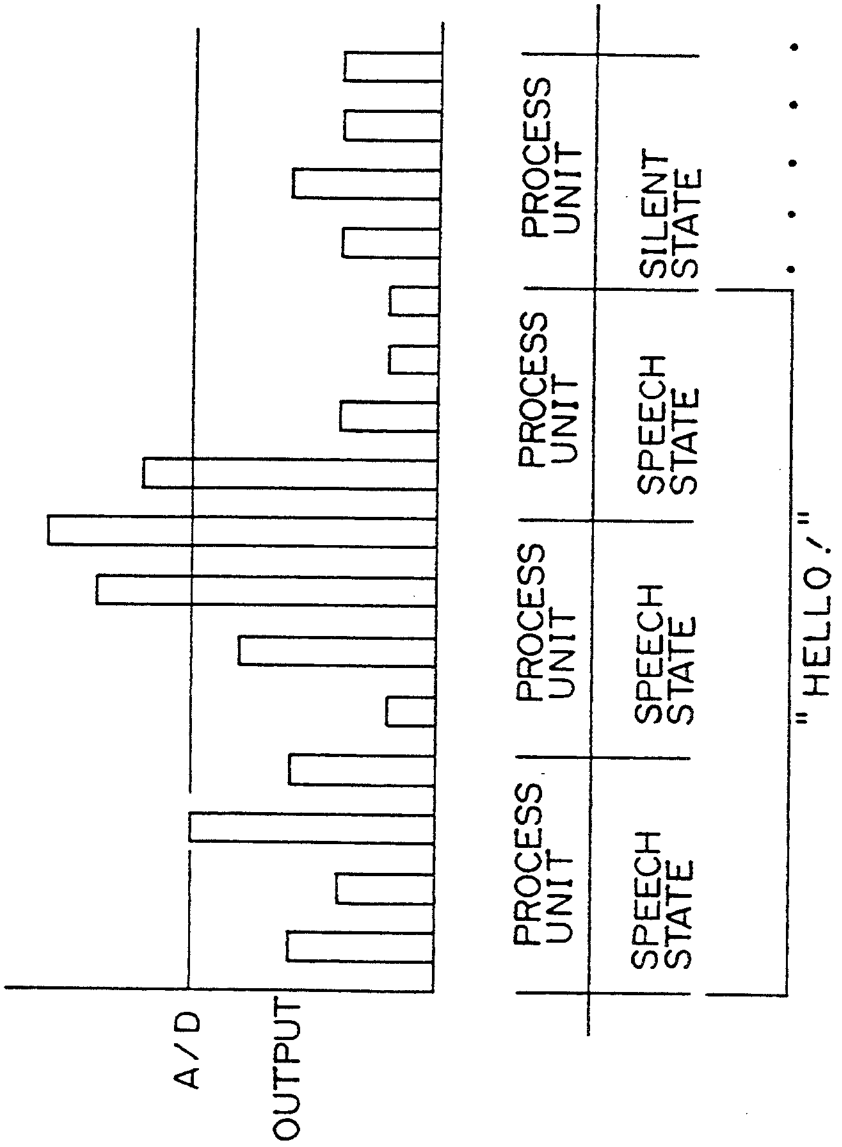

FIGS. 18A and 18B are views for outlining the speech/silent mode determining method. FIG. 18A shows a part associated with speech/silent mode determination by the voice detector (VDET) 51 for detecting a silent section in the voice coder shown in FIG. 17. An A/D converter 570 corresponds to the combination of A/D converting part 49 and D/A converting part 56 shown in FIG. 17.

FIG. 18B shows a view for describing the method of determining the speech/silent mode. The voice detector (VDET) 51 determines the speech/silent mode by cutting the strings of voice data coded by the A/D transformer 570 in a specific time unit, and then analyzing the voice data strings.

Figure 19:
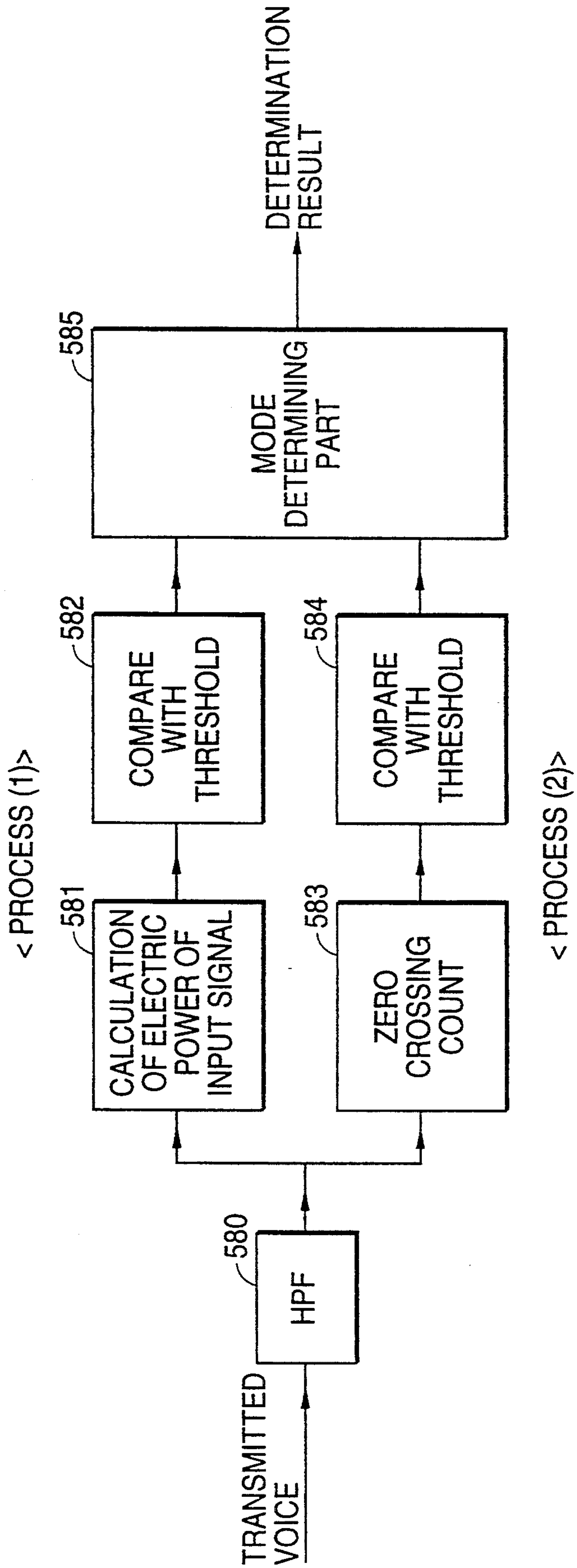
FIG. 19 is a view for explaining an embodiment of the speech/silence mode determining process.

FIG. 19 shows a view for explaining an embodiment for the speech/silent mode determining process. As shown in FIG. 19, a voice signal is applied to a high path filter (HPF) 580 to clear the direct current offset from a transmission voice signal, and the following two processes are performed on a high frequency signal.

In the first process , 581 calculates the electrical power for an input signal, 582 determines whether or not the electrical power exceeds a threshold, and a mode determining part 585 detects the speech mode when the electrical power exceeds the threshold.

In the second process, 583 counts zero-passings per sub-frame split from one whole frame, that is, the count of signals passing the zero level, 584 compares the count with a threshold, and the mode determining part 585 detects the speech mode when the zero-passing count exceeds the threshold.

That is, when the speech mode is detected in the first or second process, the result of the determination shows "speech", but the first process means determines "speech" as a large voice, and the second process determines a voice starting with a sound with a high frequency component as a word head.

In FIGS. 17, 18A, 18B and 19, the silent mode is detected by the voice detector (VDET) 51 connected to the voice coder (CODER) 50. However, the multiplexing unit 44 shown in FIG. 16 can determine the speech/silent mode. In this case, the multiplexing unit 44 has to recognize the coded information and identify the silent mode. The simplest method of realizing this function is to provide a multiplexing unit with a decoding part of a voice coder and the voice detector, where coded information is first decoded and then searched for the silent mode like in a voice coder.

The following description explains how to realize the request band determining part 33 in the second embodiment of the transmission system described in FIG. 8. The voice coder 30 includes the functions of the request band determining part 33 as described above. A voice coder in this invention is operated by the prediction coding where a coding part and decoding part synchronize to each other to operate an prediction unit. The coding part, quantizes the difference (prediction error) between an input signal and the prediction by the prediction unit.

Coding part to which the above principle is applied easily generates a signal equivalent to the signal regenerated by a decoding part, which is commonly called a local decoder. A local decoder calculates the electrical power error between an input signal and a re-generated signal provided by a local decoder for every specific samples; the result is divided by the electrical power of the input signal, and the resulting "segmental SNR" is calculated for each transmission band levels. The minimum band level that meets the specific SNR value is determined as the transmission request band. The relation between the segmental SNR and the transmission band level is described later.

On the other hand, when a request band determining part is provided separately from a voice coder, the involved process is identical to that in the silent detector. That is, the voice detector (VDET) 51 simply determines 1/0.

The determination is divided by levels, and each corresponding band is determined as the request band. For example, four-level determination can comprise complete speech, incomplete speech, incomplete silent and complete silent levels. When a request band is determined by a multiplexing unit, as in the above described silent detection, a voice decoding process is performed in a multiplexing unit and then a process similar to that in the determination by the voice coder is performed.

Figure 20A:
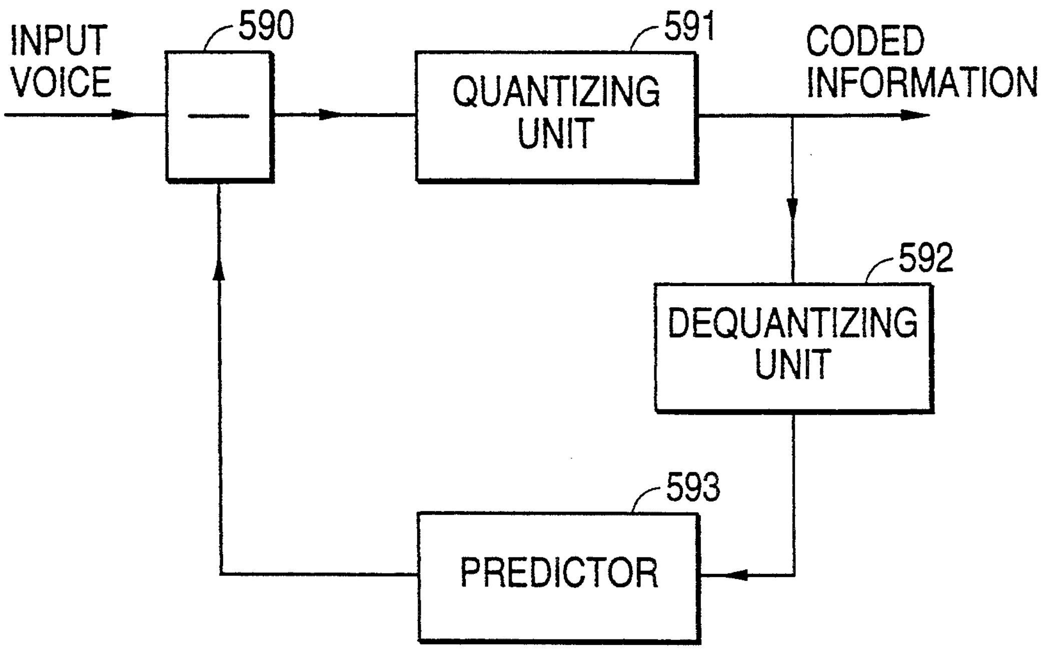
FIGS. 20A and 20B are views for explaining an embedded ADPCM coding method.
Figure 20B:
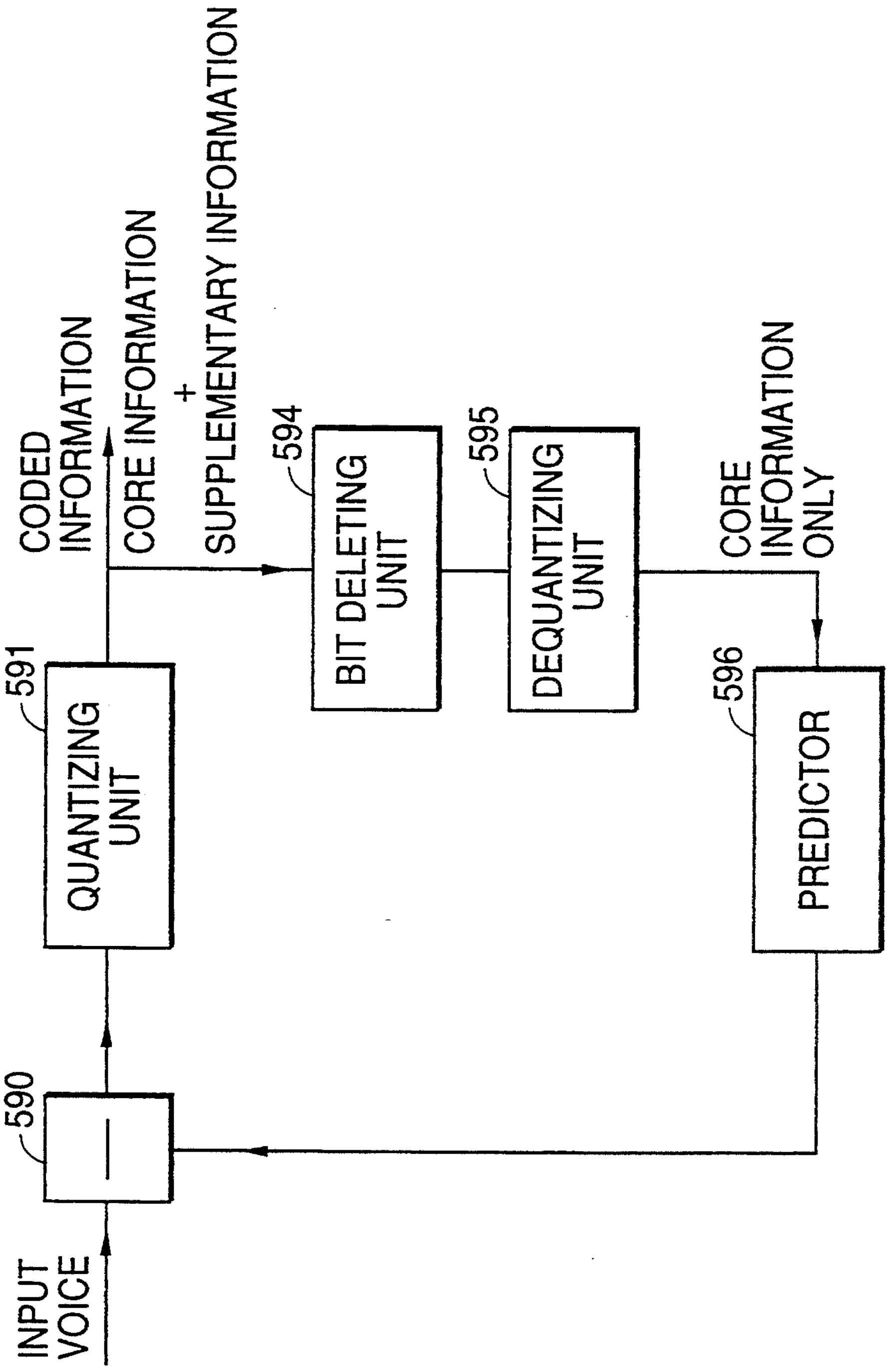

FIGS. 20A and 20B show views for explaining embedded ADPCM coding methods. FIG. 20A shows a block diagram of a configuration of a common ADPCM coding method. FIG. 20A shows an example of a conventional high compression coding method. For the input voice information, a subtracter 590 obtains the difference between the input value and the output of an prediction unit 593, and this difference is coded by a quantizing unit 591. Thus coded information is outputted. The coded information is applied to an prediction unit 593 by a dequantizing unit 592 for an adaptive prediction. This method is based on the synchronization of the sending and receiving sides. When data are discarded, the silent process is required.

FIG. 20B is a block diagram of an embedded ADPCM coding method. This method differs from the common ADPCM method shown in FIG. 20A on the following points: supplementary bits are deleted from the coded information (the sum of the core information and the supplementary information outputted from the quantizing unit 591) by a bit deleting part 594, and only the resultant core bits are applied to an prediction unit 596 through a dequantizing unit 595. That is, the internal loop forming an prediction signal passing through an prediction unit 596 contains only core bits, and the bits actually involved in the ADPCM coding are core bits only. "The compressed coding in a core information part using difference information" means this internal loop, and the prediction value of core information means the output from the prediction unit 596.

In the embedded ADPCM coding method, the quantizing unit 591 on the sending side has a resolution corresponding to the sum of the number of core bits and the number of supplementary bits. The dequantizing unit 595 has resolutions corresponding to the number of core bits only.

On the other hand, on the receiving side, a dequantizing unit having resolutions corresponding to the number of supplementary bits received is provided for the decoding. This means that supplementary bits are, in equivalence, simply PCM coded. That is, core bits are involved in the difference coding where a coded part and decoded part travel through the same prediction loop, which means supplementary bits are simply PCM coded because they are not used in the prediction loop.

Figure 21:
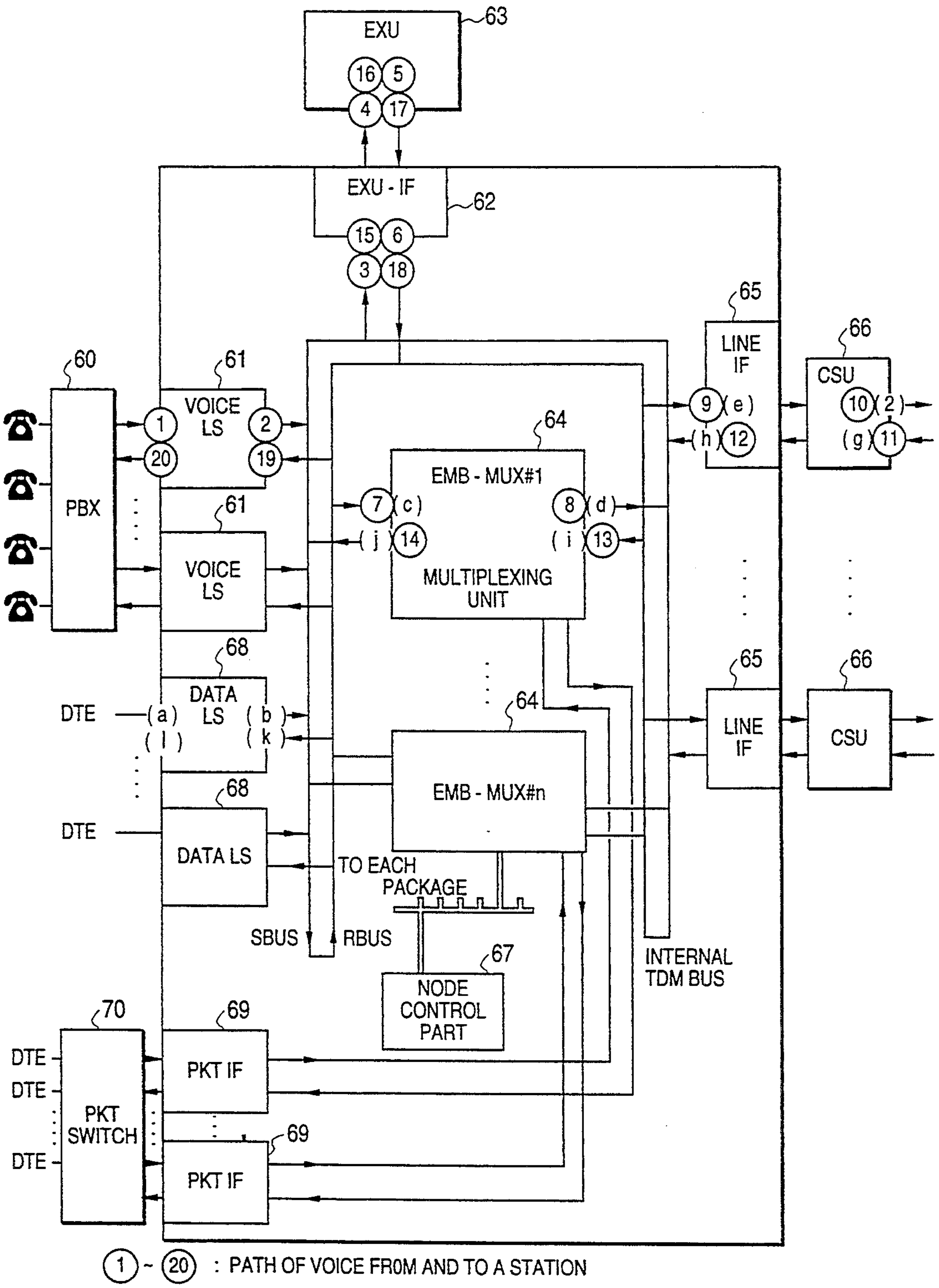
FIG. 21 is a view for explaining the transmission route of voice and data in a multiplexing device.

FIG. 21 is a view for explaining the transmission route of voice and data in a multiplexing device. The following description is given in association with FIG. 21 for illustrating activity identification of voice channels and the notification path. In ① and ②, voice information in analog signals and signaling information in dial pulses of 10 PPS, for example, are given from a PBX 60 to a voice LS (line set, or terminal container) 61. Based on the information described above, voice signals are highly compressed and coded. For example, the signaling information is binary coded by sampling at 0.4 kbps, and then the voice activities are detected.

The voice activities are divided into the identification of the calling mode by monitoring the signaling information, the identification of the speech/silent mode by a voice detector, and the weight information for transmission request generated by a coder using the SN ratio as the yardstick. The method of identifying the calling mode by monitoring signaling information is illustrated in FIG. 9.

Next, in ② through ⑦, the activity information detected by the voice LS 61 to a MUX 64 is notified through relay switching system units (EXU) 62 and 63 in ③ through ⑥ using the code format ($R_i$ code) described below.

The MUX 64 arbitrates the line multiplexing based on the activity information ($R_i$ code) provided for each channel, and the result is given to the DMUX in the 3-bit-code format. As described later, the transmission band allocation code is given in 4 bits. However, the remaining 1 bit is used for compressed transmission of signaling information. In this case, the identification of the calling mode and the speech/silent mode can be determined by the information provided by the voice LS 61, with the transmission level determined according to the arbitration result of the MUX, and can be sent to the MUX' 64 on the receiving side in 14 via lines 65 and 66 in ⑨ through 12 .

The DMUX in the MUX' on the receiving side sends the transmission information based on the arbitration result in 14 through 19 to the voice LS 61 through the EXU 62 and 63, 19 through 18 , or to the relay MUX for the next stage. The voice LS 61 recognizes the size of the voice coded information provided by the voice LS on the sending side according to the activity information obtained from the DMUX. Based on this recognition result, the voice decoding process can be performed. At this time, the occurrence of discard in the relay stage can be detected, and the decoded result is sent to the PBX 60 in 19 and 20 . A CODEC 43 shown in FIG. 16 is placed within the voice LS 61 in FIG. 21, and the voice coder shown in FIG. 17 corresponds to the content of the voice LS 61.

A plurality of a node control parts 67 are provided in a multiplexing device for controlling a plurality of the MUXs 64. These node control parts store multiplexing parameters which are determined according to the features of the coders for respective voice channels and the deterioration of sound quality due to the discard of supplementary bits. This parameter is set to the MUX 64 at system startup. These parameters can be used based on the features of coders where, for example, the sound quality can be reduced even if only core bits are transmitted when the speech mode is restored from the silent mode. Furthermore, a data LS 68 for a data channel and an interface 69 for a packet switching system 70 are provided in a multiplexing device.

Described below is the process for realizing a significant information detecting part 39 in the fifth embodiment of the transmission system shown in FIG. 11. The "insignificant" determination is made simply when the data in the multiplexing process frame are all "1"; a flag indicating that the data within the frame are not transmitted (an idle flag described later) to the receiving side; on the receiving side, an idle flag confirms the existence of transmitted data; and all the "1" information is generated for a frame having no emitted data, thus suppressing the emission of unnecessary information.

In FIG. 21, a significant information detecting part is embedded in the data LS 68 or the multiplexing unit 64.

When the detection is performed by the data LS 68, data in one cycle frame of a multiplexing process are stored in a memory or a shift register, and a comparator determines whether or not the stored values are all "1". Otherwise, a processor is equipped in the data LS 68, where it is determined whether the data in one cycle frame of a multiplexing process are all "1".

Next, when the detection is performed by a multiplexing unit, as in the data LS 68, either a memory or a shift register and a comparator are operated for the detection in a few channels, or a processor 77 in FIG. 26 described later makes a determination through software processing. The latter requires a smaller scale hardware configuration.

FIG. 22 shows an embodiment of a transmission band allocation code. In FIG. 22, the transmission band allocation code is given in 4 bits, where the lower 3 bits are used for transmitting coded transmission band information ($RI_2$, $RI_1$ and $RI_0$) and the most significant bit $b_3$ is used for emitting signaling transmission flag. This signaling transmission flag is set to 1 for the transmission of signaling information, and to 0 for the compression of information. The signaling information is transmitted to the frame where signaling information is changed, but when signaling information remains unchanged, the signaling information received last by the DMUX on the receiving side is outputted to a voice channel.

For a data channel, a remote signaling (RS) signal transmission flag is transmitted as "1" for transmission and as "0" for compression to the most significant bit. The meaning is the same as that of a signaling transmission flag. An idle flag is sent to the least significant bit to indicate whether or not it is necessary to transmit data areas. The flag is set to "1" for transmission and "0" for compression. The intermediate bits b1 and b2 are filled with data from the packet switching system.

FIG. 23 shows an embodiment of a code table of transmission band information. In FIG. 23, the transmission band information $RI_2$, $RI_1$ and $RI_0$ are transmitted after being transformed to 3-bit codes depending on whether the state is non-calling, silent, or speech modes (6 steps). This transmission band information is multiplexed and transmitted after the arbitration. The transmission level is divided every 2 kbps to levels 1 through 7.

Next, the determination algorithm for determining the transmission request level by a local decoder using a segmental SNR in a voice coder is described in association with the levels shown in FIG. 23.

In this determination algorithm, segmental SNRs corresponding to respective transmission levels 2 through 7, that is, an SNR (2) through an SNR (7), are calculated in every multiplexing frame cycles first. Next, when the determination threshold SNR (TH) of an SNR from the SNR (2) in the ascending number of levels is detected as larger than the threshold through the comparison with 25 dB, the level is considered to be the transmission band request level. After comparing up to the seventh level, the level 7 is considered to be the transmission band request level when all segmental SNRs are smaller than the threshold SNR (TH).

Figure 24:
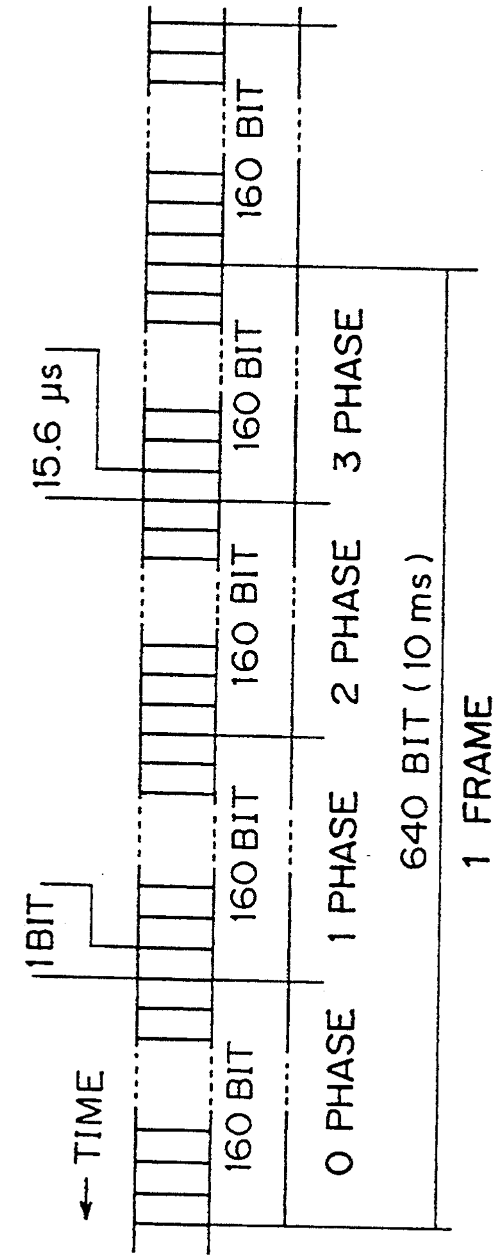
FIG. 24 shows an embodiment of serial data on the line multiplexed to a 64 kbps line.

FIG. 24 shows an embodiment of serial data in the line multiplexed to 64 kbps line. In FIG. 24, one frame comprises 640 bits, and the transmission time is 10 ms. The 640 bits are divided into phases 0 through 3, that is, 4 phases of 160 bits each. The transmission time for one bit is 15.6 μs.

Figure 25A:
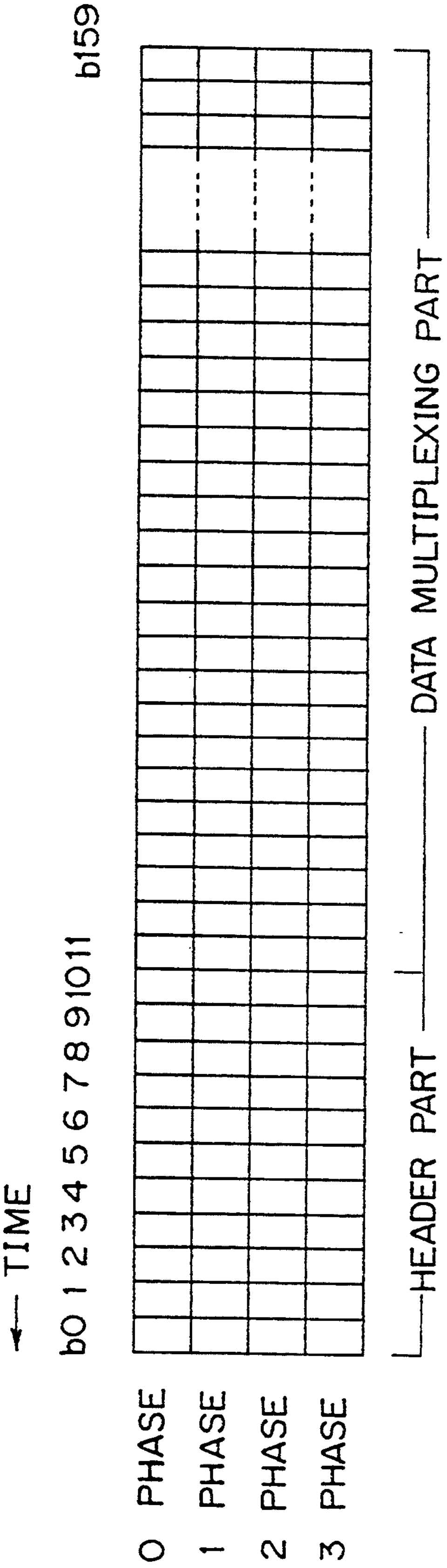

FIGS. 25A and 25B show an embodiment of a frame configuration. FIG. 25A shows a general configuration of a frame comprising 4 phases (0 through 3) where the leading 11 bits of respective phases (a total of 44 bits) are used as header parts and the bits including and following the 12th bit (a total of 596 bits ending with the 160th bit) are used as data multiplexing parts.

FIG. 25B shows the configuration of the header parts. In FIG. 25B, the header parts comprise 11 bits for respective phases, but the first bits F1, F2 and F3 for phases 0, 1 and 2 are used as frame synchronous patterns, and SEND for phase 3 is used as the device alarm bit. The second through the ninth bits (a total of 32 bits) in respective phase are used as 4 bits each of transmission band allocation code $R_i$ (#k) or for transmitting a packet PKT from a packet switching system. The tenth and eleventh bits in respective phases are used as storage areas for error correction codes ECC for transmission band allocation codes $R_i$ (#k).

Figure 26:
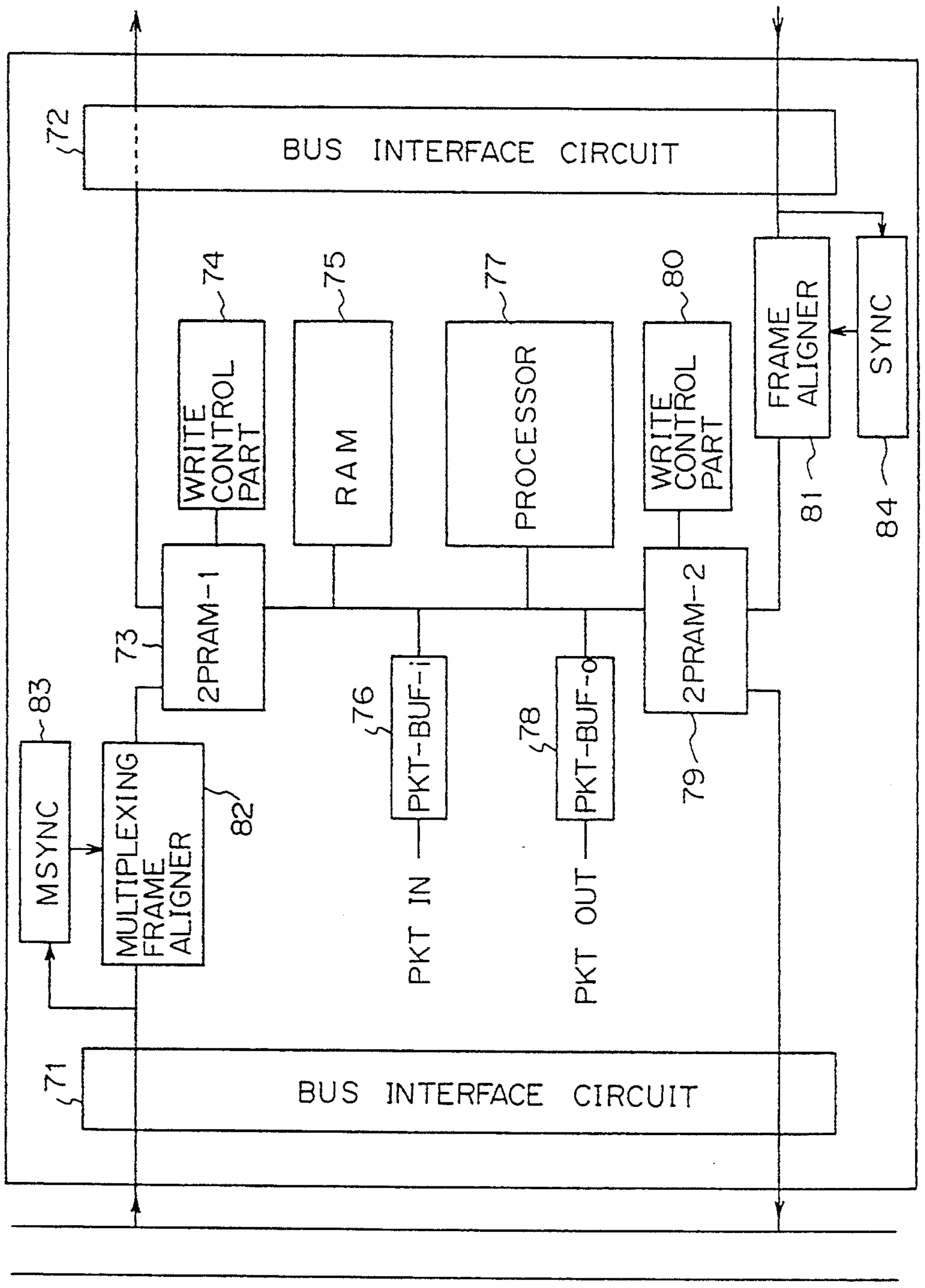
FIG. 26 is a block diagram of an embodiment of a multiplexing unit.

FIG. 26 shows a block diagram of an embodiment of a multiplexing unit. In FIG. 26, the multiplexing unit comprises a bus interface circuit 71 as an interface to each channel, a bus interface circuit 72 as a line interface, a two-port RAM 73 provided with transmission request information by each channel and outputting multiplexed frame information, a write control part 74 for the two-port RAM 73, a RAM 75 for storing programs and data, an input interface circuit 76 for a packet channel, an operation process processor 77 for multiplexed and demultiplexing, an output interface circuit 78 for a packet channel, a two-port RAM 79 for storing received data, a write control part 80 for a two-port RAM 79, a multiplexing frame aligner 82 as a buffer circuit for synchronizing to a multiplexing cycle the transmission request information from each channel, an MSYNC part 83 as a cycle timing detecting circuit, a frame aligner 81 as a frame synchronization establishing circuit among MUXs, and a SYNC part 84 as a frame timing detecting circuit.

In FIG. 21, a node control part 67 sets a multiplexing parameter to each multiplexing unit 64 as described above, and the setting is performed through a control bus for a package of each multiplexing unit 64.

In FIG. 26, such a control bus is skipped, but actually, for example, a register where setting information is written from the node control part 67 is connected to a memory bus of the processor 77; and the processor 77 in the process of executing the multiplexing program reads the content of the register if necessary.

Figure 27:
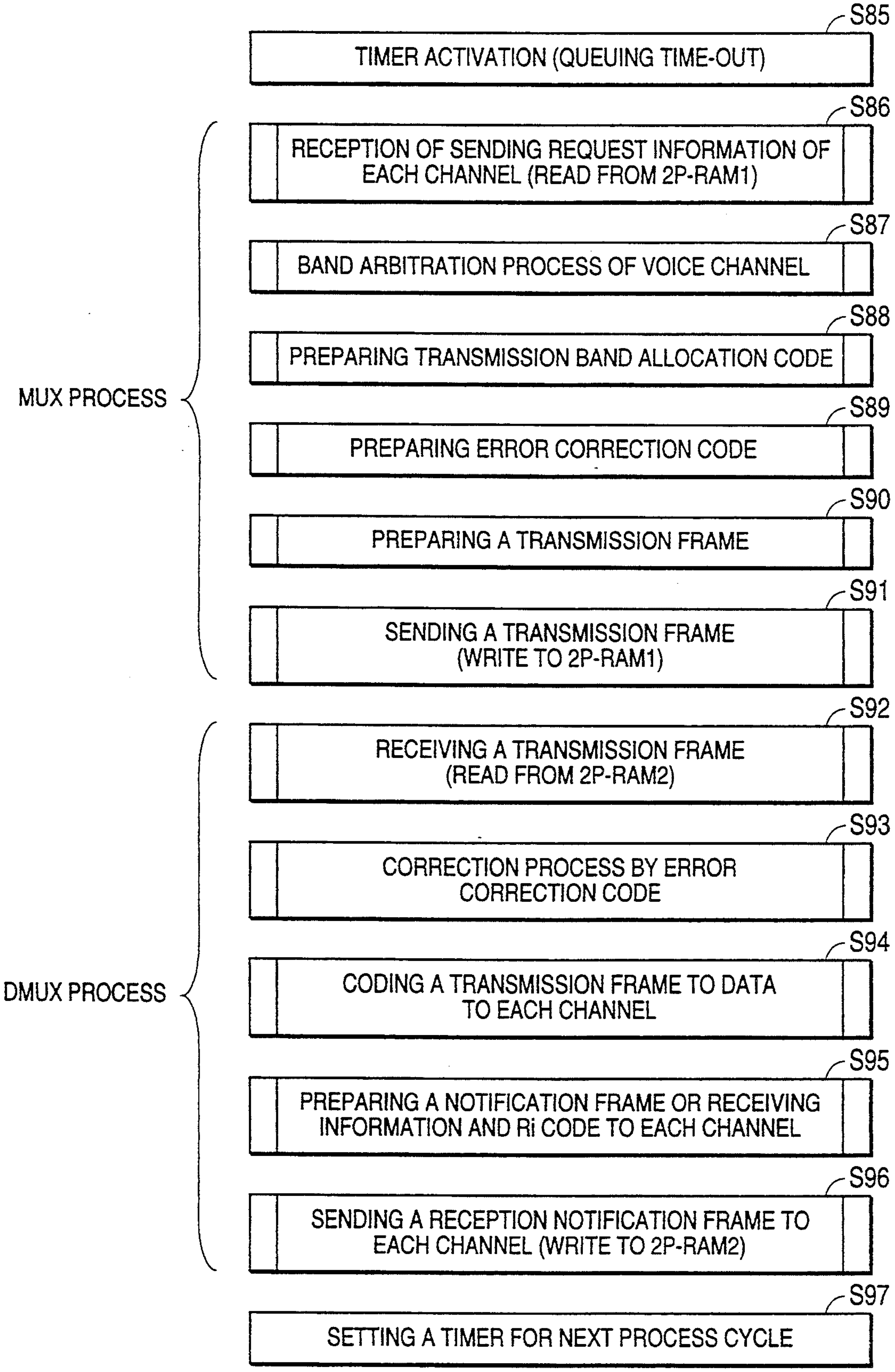
FIG. 27 is a flowchart of an embodiment of a general process of a multiplexing unit.

FIG. 27 is a flowchart outlining the processes in an embodiment of a multiplexing unit. In FIG. 27, after the queue-time-out timer is activated at S85, the multiplexing process (MUX) is performed. In the multiplexing process, transmission request information of each channel is received at S86, that is, the information is read from the two-port RAM 73 shown in FIG. 26; the band arbitration for voice channels is performed at S87; a transmission band allocation code ($R_i$ code) is generated at S88; an error correction sign is generated at S89; a transmission path frame is generated at S90; and a transmission path frame is emitted at S91, that is, information is written to the two-port RAM 73.

During the demultiplexing process (DMUX) of received data, a transmission path frame is received at S92, that is, read from the two-port RAM 79 shown in FIG. 26; the correcting process is performed at S93 using error correction signs; a transmission path frame is demultiplexed to data of each channel at S94; information received at each channel and a notification frame of transmission band allocation codes ($R_i$ codes) are sent, that is, written to the two-port RAM 79; and a timer starts for the next process cycle.

The band arbitration process at S87 is performed by a processor 77 shown in FIG. 26. The arbitration program is either stored in a RAM 75 or embedded in the processor 77 as a mask ROM.

Figure 28:
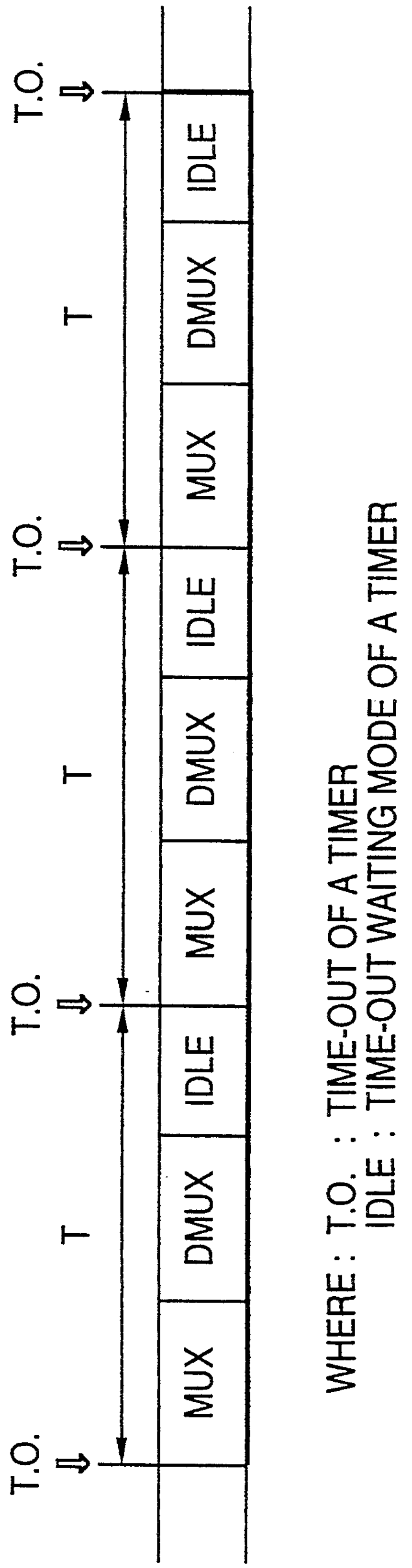
FIG. 28 is a view for explaining the process cycle in a multiplexing unit.

FIG. 28 is a view for explaining the the process cycle. The process cycle T is a constant value, for example 5 ms or 10 ms, according to which a timer indicates a time-out every specific process cycle. During the cycle, the multiplexing (MUX) process and demultiplexing (DMUX) process are performed. The remaining time is considered idle, i.e. the time-out waiting time of the timer.

Figure 29:
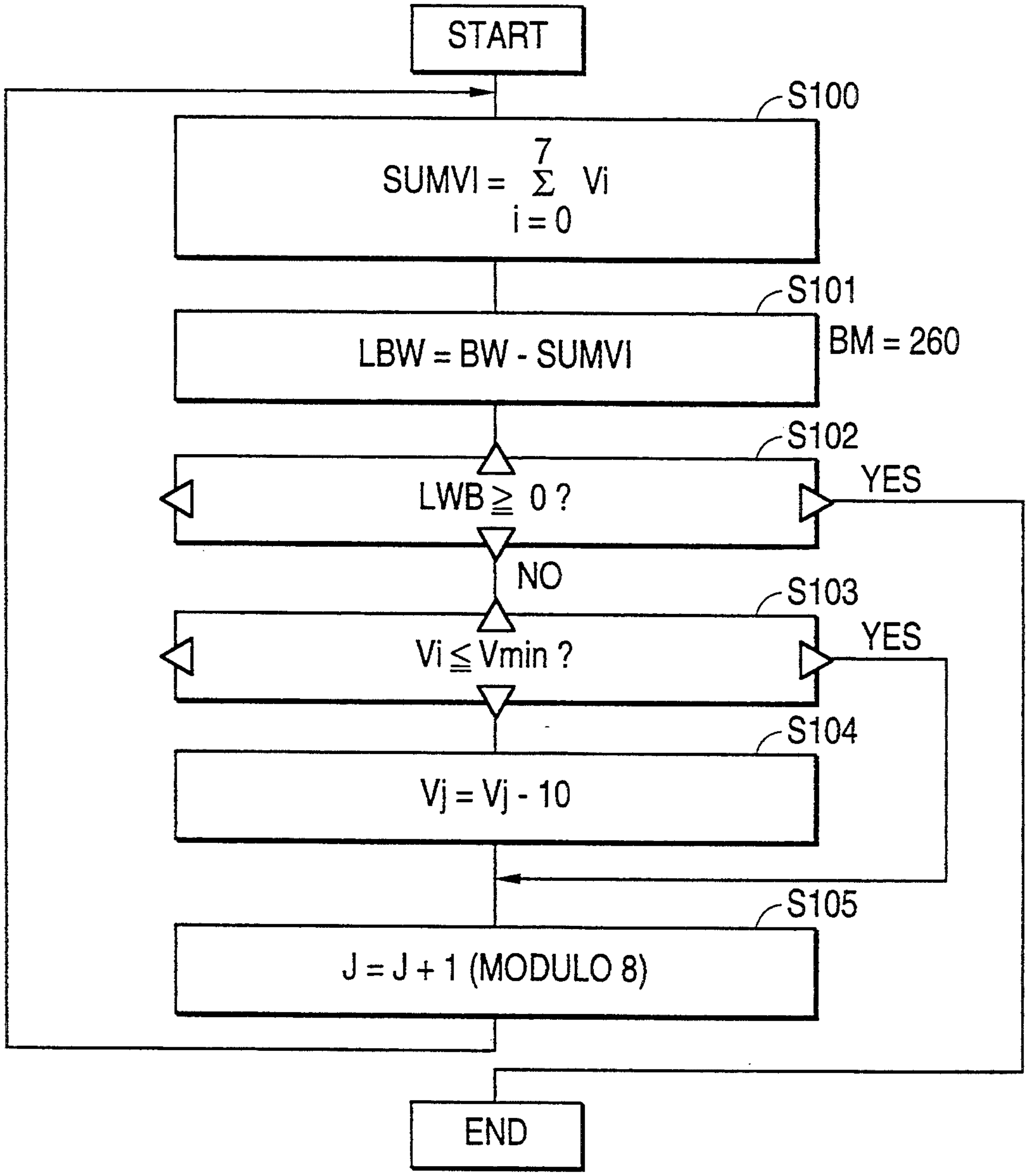
FIG. 29 is a flowchart indicating the first embodiment of the band arbitration process at the multiplexing operation.

FIG. 29 is a flowchart indicating a first embodiment of the band arbitration at a multiplexing operation. FIG. 29 shows the band arbitrations corresponding to the first embodiment of the transmission method shown in FIG. 7, the second embodiment shown in FIG. 8, and the third embodiment shown in FIG. 9. In FIG. 29, as shown in FIG. 6, the side information during the process cycle T is given in 10 bits, and the core information in 20 bits, thus forming the core information part having a total of 30 bits, and the supplementary information parts consist of 10 bits each, thus forming a total of 50 bits.

The transmission speed is 64 kbps; the multiplexing frame generating cycle is 5 ms; and the number of accommodated channels is 8. For a frame format, the number of bits allocated to voice channels BW is 260 excluding 4 flag bits, transmission band allocation code 4×8 bits=32 bits, error correction signs ECC 8 bits, and signaling information 2×8 bits=16 bits. The coded data length Vmin which is necessary during voice transmission in the minimum sound quality is 30 bits.

That is, the initial value (request band) of the voice coded data $V_i$ ( corresponding to $V_i'$ in expression (1)) of each channel is 10 bits during silent in the first embodiment shown in FIG. 7, and 80 bits during speech, totaling 2 levels only. However, it is 10 bits during the silent mode in the second embodiment shown in FIG. 8, and variably between 30 and 80 bits in the speech mode; 0 bits in the non-calling-mode in the third embodiment shown in FIG. 9, 10 bits in silent and variably between 30 and 80 bits in speech during the calling mode.

When the process begins as shown in FIG. 29, the sum of the initial values of the voice code data length for the respective channels, e.g. the sum of the bands $V_i$ requested by the respective voice channels, is allocated to the 8 channels in S100. LBW is obtained by subtracting the sum from the BW bits allocable to the voice channels, which are 260 bits in this case in 8101. It is Judged in S102 whether the LBW value is positive, 0 or negative. When the LBW value is positive or 0, since the request bands are totally satisfied, the process ends without an arbitration.

Since the band is deficient when the LBW turns out to be negative in S102, it is judged in S103 whether the voice code data length for channel j next to the channel containing bits last discarded by an arbitration during the last frame transmission is smaller than, equal to, or greater than the code data length $V_{min}$ for transmission at the minimum acceptable sound quality. Since no more data for the channel can be discarded when $V_j$ is smaller than $V_{min}$, the value of j is incremented in step S105, and the processes from S100 are repeated.

When $V_j$ is larger than $V_{min}$ in S103, 10 bits of the voice data for the channel are discarded in S104. After the value of j is incremented in S105, the processes after S100 are repeated. When LBW becomes non-negative in S102, all processes are terminated.

FIG. 30 shows an embodiment of arbitration based on the flowchart shown in FIG. 29. In FIG. 30, T=1 through 15 indicate arbitration timing when multiplexed frames are created. At T=1, the bands requested by all channels 1 through 8 correspond to 10 bits, i.e. a silent mode. Respective channels receive the 10 bits as requested.

At T=2, the bands requested by respective channels are all 50 bits. Since their sums, 400 bits, are greater than the earlier described BW 260 bits, some data need to be discarded. For instance, if the discarding begins from channel 1, 10 successive bits in channels 1 through 8 are discarded. Then, 10 successive bits in channels 1 through 6 are also discarded. Thus, a total of 140 bits are discarded and the arbitration is terminated.

Similar arbitrations are performed at and after T=3. The voice data discarding at T=3 starts from 10 bits in channel 7, i.e. the next channel after the one from which the last discarding was made. As a result, channels 7, 8 and 1 through 4 discard a total of 40 bits and channels 5 and 6 discard a total of 30 bits, before the arbitration is completed.

Although similar arbitrations are performed at following points in time, there are exceptions. Channel 8 discards only 30 bits at T=7 and 8 because those 30 bits represent the core bits. Channel 8 does not discard any bits at T=9 because side information during a silent should not be discarded.

FIG. 31 is a flowchart of a second embodiment of this invention for the band arbitration processes. FIG. 31 shows an embodiment of a processing for determining the method of discarding current transmission frames from the past discarding history. In FIG. 31, the number of bits allocable to voice channels, the number of accommodating channels, the tag information part, and the core information part are the same as those in the first embodiment shown in FIG. 29.

When the processes begin as shown in FIG. 31, i (indicating the channel number) is set to 1 in S106, and subroutine DISCMD (Discard Mode Renewal Subroutine) is executed in S107. This is described later as the renewal of the discarding mode. Then, the value i is incremented in S116, and it is judged whether or not the value i is smaller than 8 in S117. If it is smaller, the processes from S107 are repeated.

Figure 31A:
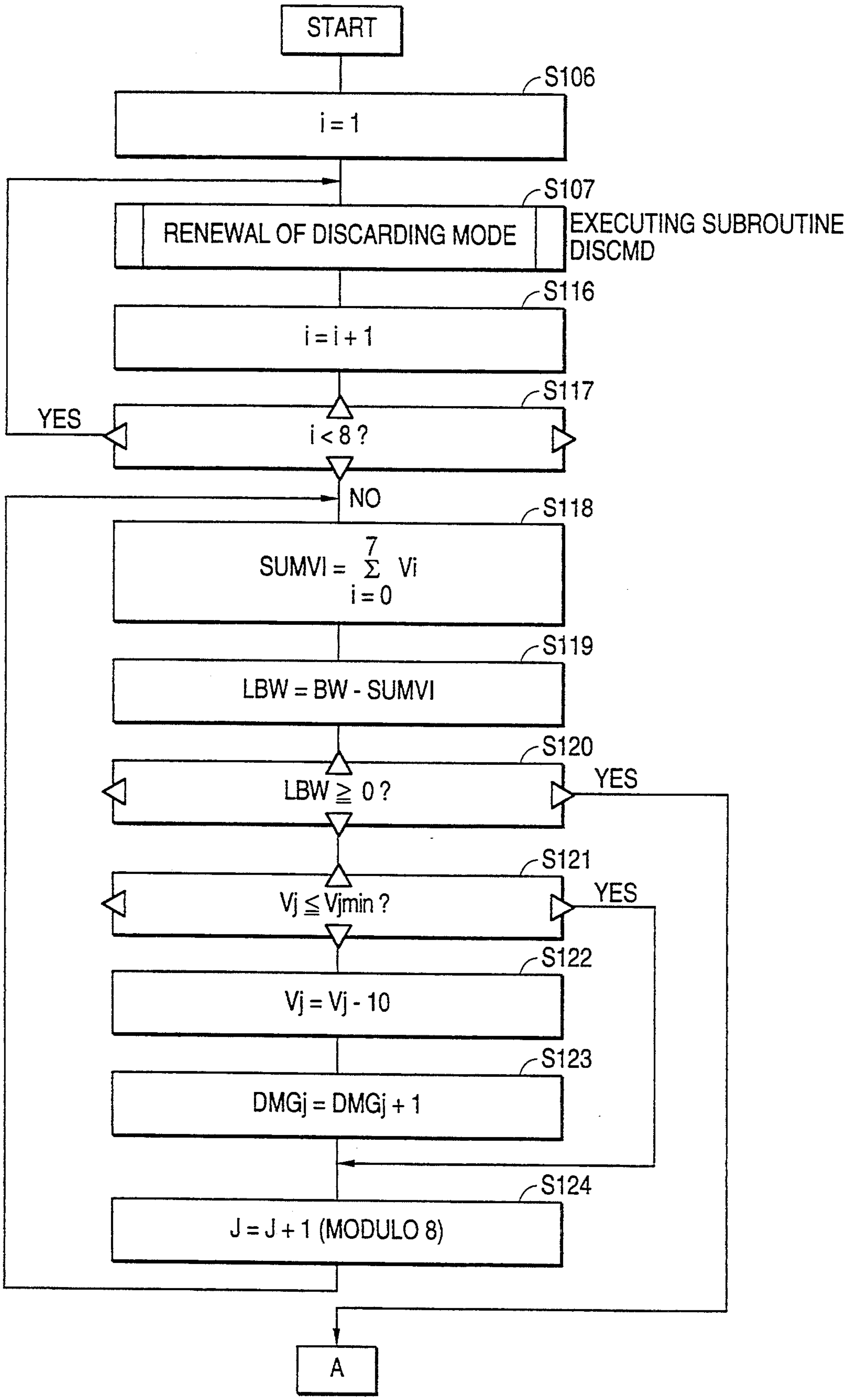
FIGS. 31A and 31B are flowcharts of a second embodiment of the band arbitration processes.
Figure 31B:
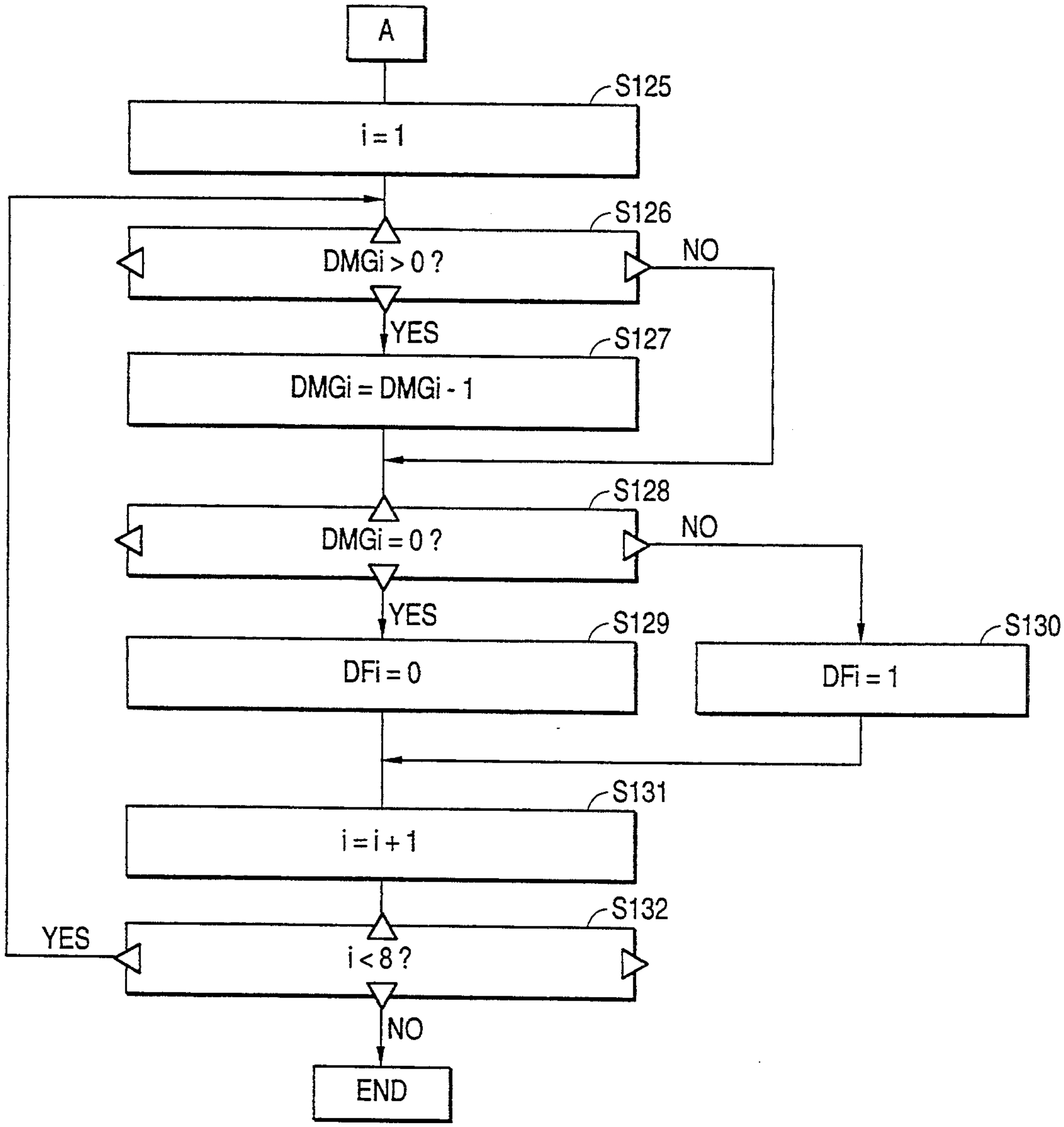
Figure 32:
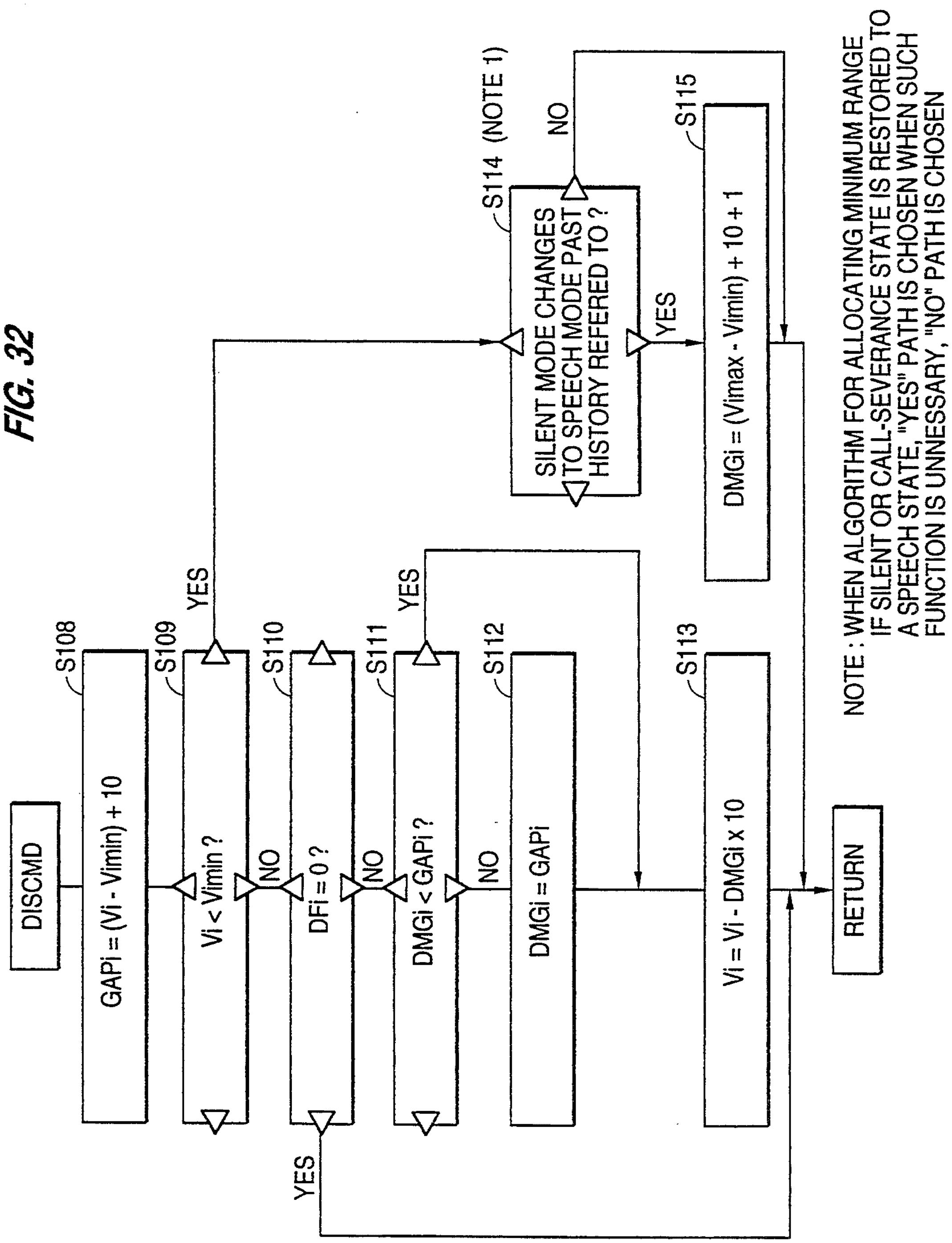
FIG. 32 is a flowchart of an embodiment of discarding mode renewal processing.

FIG. 32 is a flowchart of S107 shown in FIG. 31, i.e. an embodiment of the discarding mode renewal processing. FIG. 33 shows an embodiment of the arbitration, based on the flowchart shown in FIG. 31. FIG. 34 shows an embodiment of the relations among the values of respective variables. The flowcharts shown in FIGS. 31A, 31B and 32 are explained by referring to the embodiment shown in FIG. 34.

As in FIG. 30, which shows the first embodiment of arbitration, FIG. 33A shows the bands requested by respective channels and those allocated as a result of arbitration processing, at respective arbitration timings T=1 through 15. The first row of the display for respective channels at respective arbitration timings has the requested bands on the left side and the allocated bands on the right side. In the second row, the leftmost side indicates a discard mode flag DF, the center indicates a discard damage factor DMG, and the rightmost side indicates a margin gap factor GAP for the minimum allocated bands.

On the right side of these arbitration results for channels 1 through 8, all the requested bands and allocated bands are indicated. Among the requested bands, the right side indicates the total of the requests from the encoders for the respective channels, the left side indicates the total of the requested bands, taking a later described discard mode into consideration.

For instance, at T=1, although the total of the requests from the encoders for the respective channels, 80 bits match the total of the requested bands considering the discard mode, since the speech mode is restored from the silent mode at T=2, lower bands are allocated.

Here, the bands requested by respective channels are assumed to comprise the 30 bits of core information, and they total 240 bits immediately after the sound restoration, so that only 30 bits of the core information part are allocated to respective channels at T=2.

FIG. 33A shows the values of the discard made flag DF, a discard damage factor DMG, and a margin gap factor GAP for the minimum allocated bands after the arbitration processings through the processes shown in FIGS. 31A, 31B and 32. Here, GAP=9 indicates that GAP has a negative value. The flowchart shown in FIG. 33B explains how these values are determined.

FIG. 33B shows how many bits are actually allocated to the bands in response to the requests from channel encoders at arbitration timings T=1 through 11. The channel herein is equivalent to a channel in FIG. 33A.

At the arbitration timing T=1 shown in FIG. 33B, the discard mode renewal is performed in S107 shown in FIG. 31. That is, in ST108 shown in FIG. 32, the requested bits $V_i$=80 bits are used to obtain the GAP. The coded data length $V_{imin}$ necessary for transmitting voices at the lowest acceptable voice quality is set to 30 bits. As a result, GAP becomes 5, and the next step S109 checks whether or not the requested bits $V_i$ are smaller than $V_{imin}$.

Since in this case $V_i$ is larger, it is judged whether or not the discard mode flag is 0 in S110. Here, the discard mode flag DF indicates 1 for discarding and 0 for preserving. Since this is a case of the first arbitration timing, if the discard mode is not yet entered, the flag value remains 0 and the discard mode renewal processing is terminated and S116 shown in FIG. 31 is invoked. If it is judged that the discard mode renewal for all 8 channels have already been performed in S117, the processes after S118 begin.

The processings in S118 through S124 in FIG. 31 are essentially similar to the the processes shown in FIG. 29 showing the first embodiment of the arbitration processing. That is, if the sum of the requests from the respective channels is larger than the bit number BW allocable to the voice channels, the arbitration processes cause the bands in the respective channels to discard 10 bits respectively and the process in S125 to be invoked. However, unlike the case shown in FIG. 29, the channels which discard 10 bits in S123 increments their discard damage factor DMG values.

As shown in FIG. 31, after the channel number i is set to 1 in S125, it is judged in S126 whether or not the DMG value is positive. Since the arbitration has only begun at T=1, as shown in FIG. 33B, if the DMG values are 0 then, it is judged in S128 without having to go through S127 whether or not the DMG values are 0. Then, the discard mode flag DF is set to 0 in S129, the value of the channel number i is incremented in S131. It is judged in S132 whether i is smaller than 8. If i is smaller than 8, the processes from S126 are repeated, until i becomes equal to 8. The processes are then terminated. Here, the processes from S118 to S124 assume that the requested bits for the channels are not decreased. Consequently, 80 bits of $V_i'$ are allocated to the channel.

A silent section starts at an arbitration timing T=2, as shown in FIG. 33B, and 10 bits are requested. As a result, the GAP value in S108 in FIG. 32 becomes −2, and it is judged in S109 that the requested bits are smaller than $V_{imin}$, and it is judged in S114 whether or not the change history from the silent mode to the speech mode should be referred to. Here, as illustrated in (2) of FIG. 14 in order to lower the allocated band when the silent mode changes to the speech mode, the DMG value is changed in S115. Here, when the $V_{imax}$ value is set to 80 bits, the DMG value becomes 6, and S116 shown in FIG. 31 is invoked.

In the processes from S118 to S124 shown in FIG. 31, the bits allocated to the channels are not decreased. It is judged in S126 whether DMG is positive or negative. Since the DMG is 6 at this time, the value is decremented in S127, it is not judged to be DMG=0 in S128, and the discard mode flag DF is set to 1 in S130. The DMG value determined in S127 becomes the next DMG value shown in FIG. 33B.

The processes at arbitration timing T=3 are similar to those at T=2. When 80 bits are requested at T=4, the GAP value in S108 becomes 5. After going through the processes in S109 and S110, GAP and DMG are compared in S111. In this case, since GAP is equal to the preceding DMG, after going through the process in S112, $V_i$ is set to 30 bits in S113, before going to the process in S116 shown in FIG. 31.

In the processes from S118 to S124 shown in FIG. 31, since $V_i$ is already 30 bits, no more discarding is performed. After going through the processes in S125 and S126, the DMG is set to 4 in S127, DF is set to 1 in S130, and all processes for the channels are completed.

Although the number of requested bits is always 80 at and after T=5, the allocated bits are only incremented by 10 up to T=8. Finally, at T=9, the requested bits match the allocated bits. That is, in contrast to the silent sections at T=2 and 3, the period T=4 through 8 drag the discarding history, during which period the DMG value is decremented by 1. The period of dragging the discarding history ends when the DMG value becomes 0. That is, the variable DMG informs the next frames of the frequency of past discards.

FIG. 33C illustrates dragging the history of discarding because of congestion. As in the case shown in FIG. 33B, requested bits are allocated "as is" at T=1. However, after the GAP value is set to 5 in response to the 80 bit request in S108 shown in FIG. 32, no bits are discarded, as shown in FIG. 32. It is assumed that the processes S118 through S124 shown in FIG. 31 cause 40 bits to be discarded because of congestion, so that the the number of allocated bits becomes 40. The DMG value at this time, which is the final value, is 4 after adding 4 to the preceding DMG value of 0 for the 40 bits discarded at S123. The DMG value of 3 after decrementing by 1 in S127 becomes the succeeding DMG value.

After T=3, the number of requested bits is always 80. Yet, at T=3, 4 and 5, since the succeeding DMG values are transmitted at the next timings after being decremented by 1, the number of allocated bits is incremented by 10 at T=3, 4 and 5, so that the number of requested bits matches the number of allocated bits at T=6.

FIG. 34 shows an example of how respective variables in the flowchart shown in FIG. 31 are determined in response to the preceding DMG value and the requested bits. In FIG. 34, only the columnar contents have meanings, and the row arrangements are entirely irrelevant.

In the leftmost case, the number of requested bits is 40 and the preceding DMG value is 0. GAP becomes 1 in S108 in FIG. 32. Assuming that all discard mode flags DF are 1 in FIG. 34, GAP is compared with DMG in S111. Since GAP is greater than DMG, the DMG value does not change, but remains 0. This value is the DMG value shown under GAP in FIG. 34. The value $V_i$ does not change, and the process in S116 shown in FIG. 31 is invoked. The value $V_i$ at this time is the new $V_i$.

Thereafter, discards because of congestions are performed in S118 through S124 in FIG. 31. The number of allocable bits for the channels in the discards because of congestion is 40. The value is expressed as the actual $V_i$. Hence, the requested bits "as is" become the final $V_i$, i.e. allocated bits, without being discarded, the final DMG value, the succeeding DMG value and the DF are all set to 0, and the processes are terminated.

The second column from the left shows a case in which the number of requested bits is 40, but the preceding DMG value is 2. In this case, as shown in FIG. 32, GAP is set to 1 in S108. Since DMG is judged to be greater than GAP in S111, DMG is set to 1 in S112, the $V_i$, i.e. the new $V_i$ is set to 30 bits in S113, and the process in S116 is invoked. As described earlier, the number of allocable bits for congestion in this channel is assumed to be 40 in process S118 through S124. However, since the $V_i$ is already 30 bits, its value becomes the final $V_i$ and the process in and after S125 is invoked. Then, the DMG value is set to 0 in S127, which becomes the succeeding DMG, and the DF value becomes 0.

Since the preceding DMG is 2 when the number of requested bits is 70 in the fifth column from the left, after the new value $V_i$ becomes 50 bits in S113 as shown in FIG. 32, discarding because of congestion is performed in the processes after S118 shown in FIG. 31. As described earlier, since only 40 bits can be allocated to the channel, 10 bits are discarded in S122, and DMG, i.e. the final DMG, is set to 3 in S123. Then, the DMG, value is set to 2 in S127, the resultant DF becomes 1, and the process is terminated.

The band arbitration processes explained in FIGS. 29 through 34 have the problem of determining how the past discarding history can be dragged. The mode of dragging the discarding history is set by a part of the content of the multiplexing parameters set in respective multiplexers 64 by the node controller 67 in FIG. 21.

The following three modes can be considered for dragging the discarding history. First, there is the arbitrating mode shown in FIG. 29, in which the discarding history is not actually dragged. Second, there is the arbitrating mode shown in FIGS. 31A and 31B, in which the discarding history is dragged and the restoration is performed stage by stage for each arbitration. Third, there is the arbitrating mode in which one stage is restored for every five arbitrations by decrementing DMGi by one for every five arbitrations in S127 shown in FIG. 31B.

Figure 35:
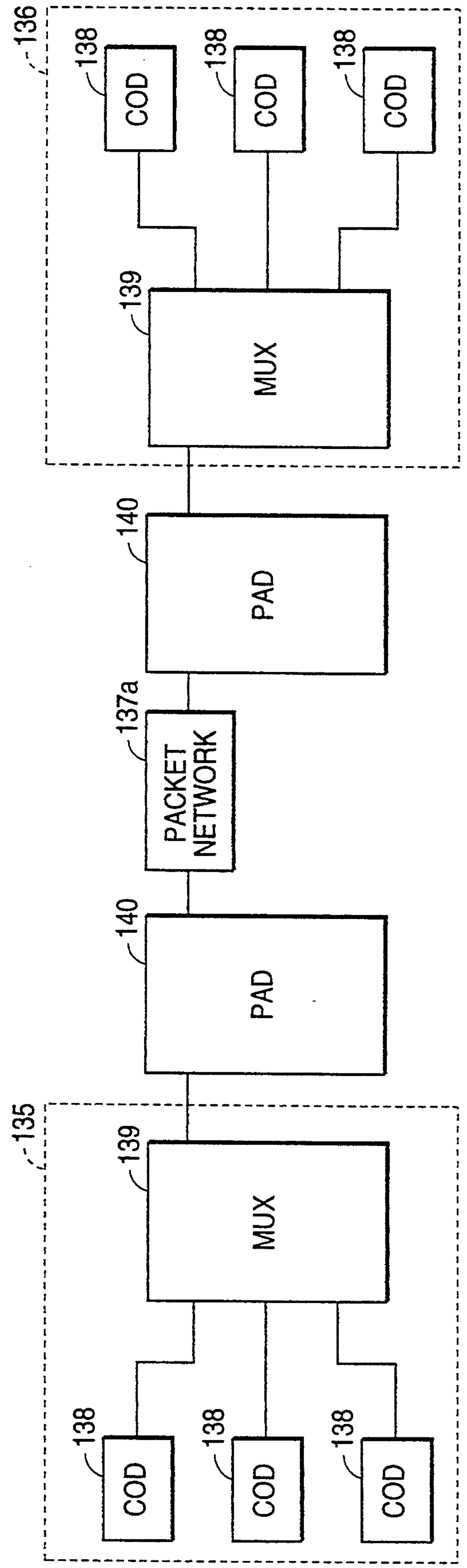
FIG. 35 is a block diagram showing an embodiment of a packet switching network to which this invention is applied.

FIG. 35 is a block diagram of an embodiment of a packet exchange network according to the high efficiency digitally multiplexed transmission method of this invention. In FIG. 35, the multiplexer has exactly the same configuration as that shown in FIG. 16A. A packet interface (PAD) 140 is inserted between a multiplexer 135 and a packet network 137*a*. Another packet interface (PAD) 140 is inserted between a multiplexer 136 and a packet network 137*a*. A packet interface (PAD) 140 assembles and dissembles packets, thereby transforming between multiplexed frames and packets.

Figure 36:
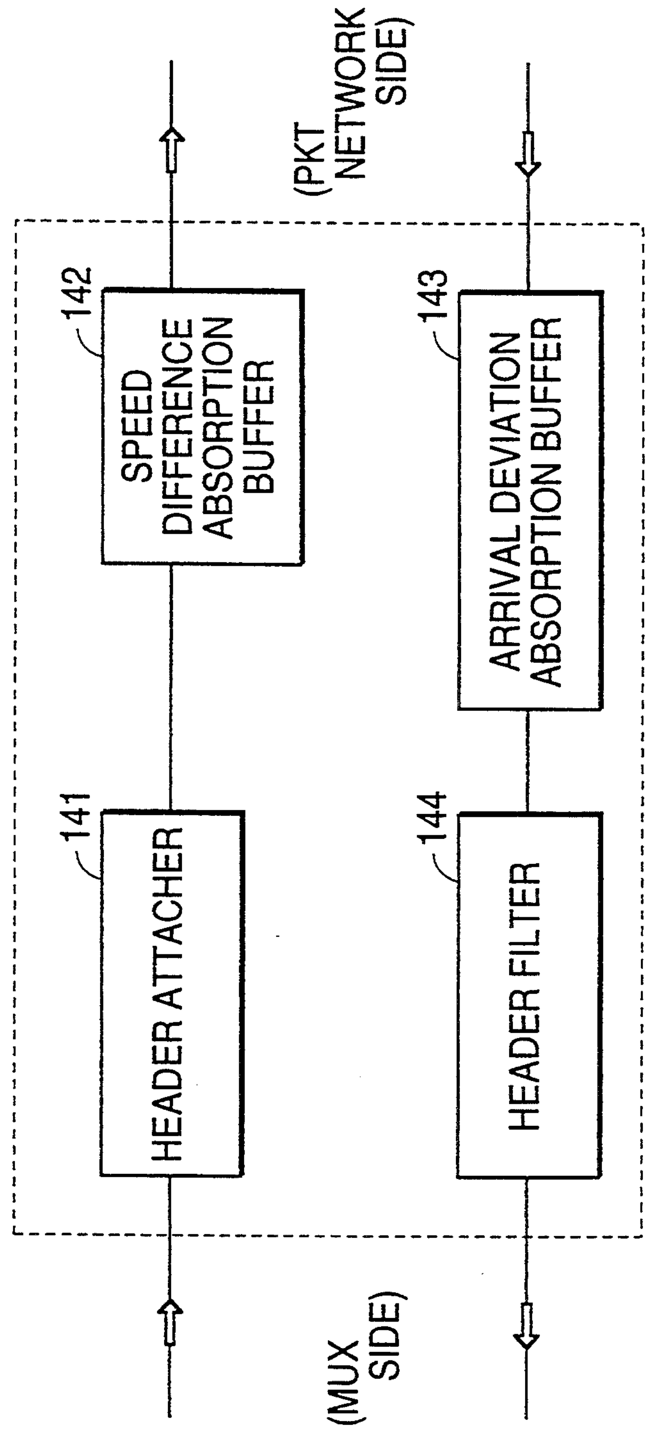
FIG. 36 is the block diagram showing the configuration of the packet interface part shown in FIG. 35.

FIG. 36 is a block diagram of the embodiment of the packet interface 140 shown in FIG. 35. In FIG. 36, a header attacher 141 attaches a packet header to the packets received from the multiplexer side. After being assembled, packets are outputted to the packet network side through a speed difference absorption buffer 142. An arrival deviation absorption buffer 143 absorbs the deviations caused by packet exchanges of the packets received from the packet network side. A header filter 144 filters the packet header out. The packets are then transformed to multiplexed frames and outputted to multiplexers.

Figure 37:
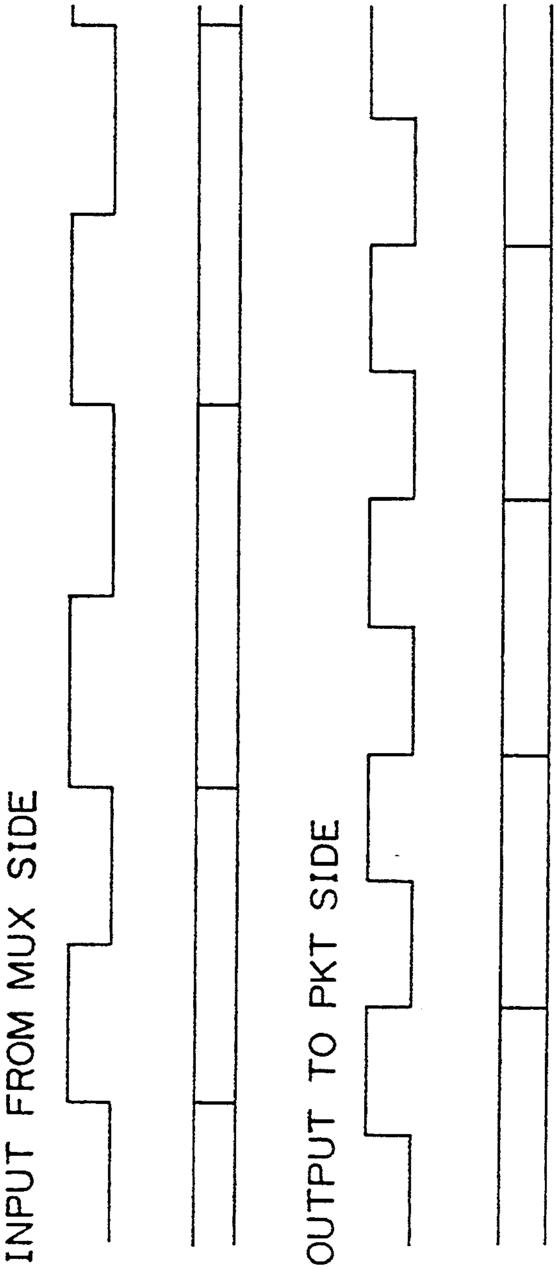
FIG. 37 illustrates the operation of a speed difference absorption buffer.

FIG. 37 illustrates the operations of the speed difference absorption buffer 142 shown in FIG. 36. In FIG. 36, since the header attacher 141 attaches headers to the multiplexed frames inputted at speed $V_1$ from the multiplexer side, transmission speed $V_2$ to the packet network side is not the same as $V_1$. When they are transmitted at a uniform speed, $V_2$ becomes larger than $V_1$. The speed difference absorption buffer 142 absorbs this difference. When packets are transmitted in a burst to the packet network side when enough packets are accumulated and they are ready for transmission, the speed difference absorption buffer 142 is used as a transmission holding buffer. FIG. 37 shows transmission mode at a uniform speed.

Figure 38:
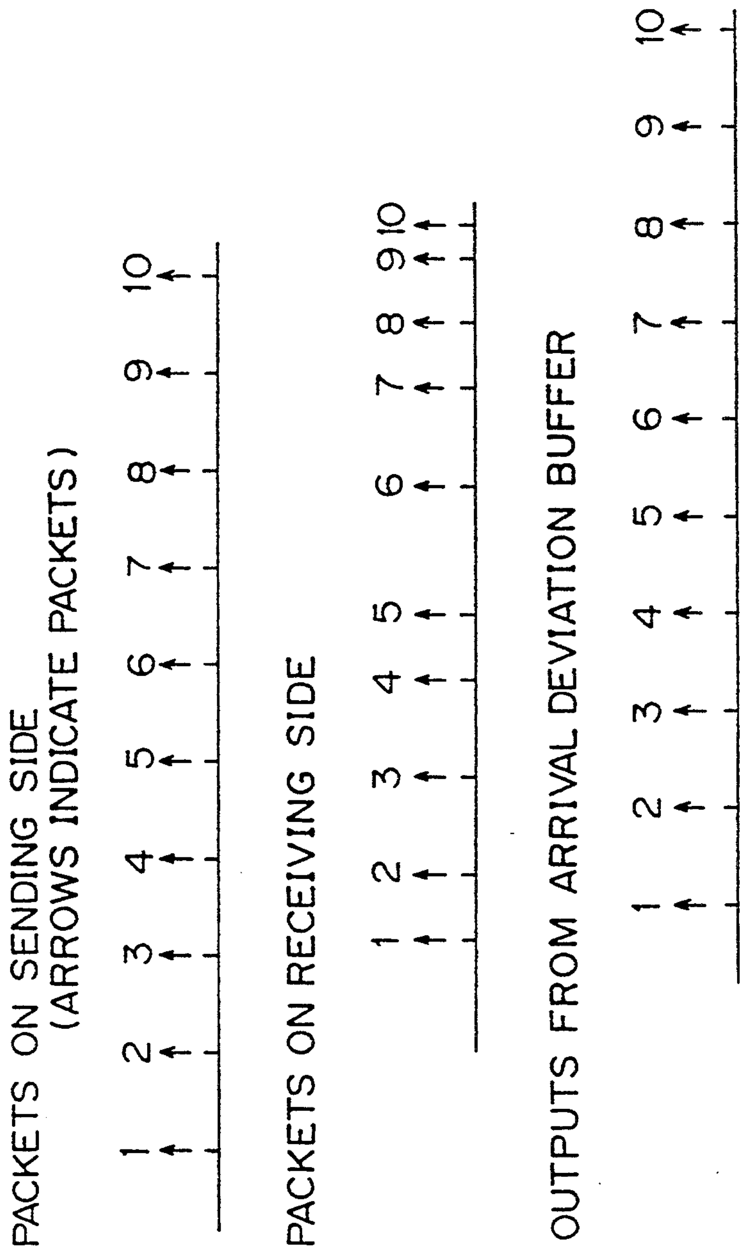
FIG. 38 illustrates the operation of an arrival deviation absorption buffer.

FIG. 38 also illustrates the actions of the arrival deviation absorption buffer 143 shown in FIG. 36. Even if the transmission side outputs packets to the packet network at a constant speed, the delays in the packet arrivals at the receiving side are not constant but have deviations, which the arrival deviation absorption buffer 143 absorbs, so that it outputs packets to the header filter 144 at a constant speed.

Figure 39A:
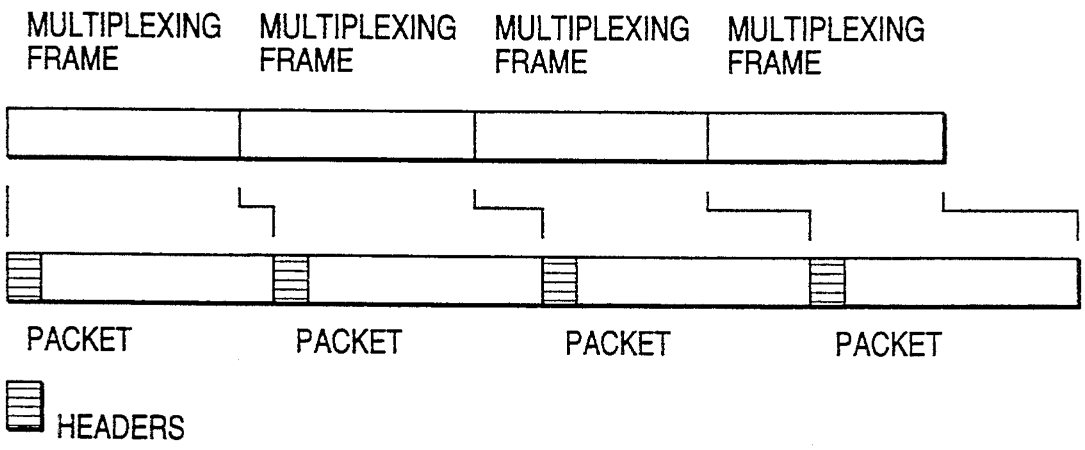
Figure 39B:
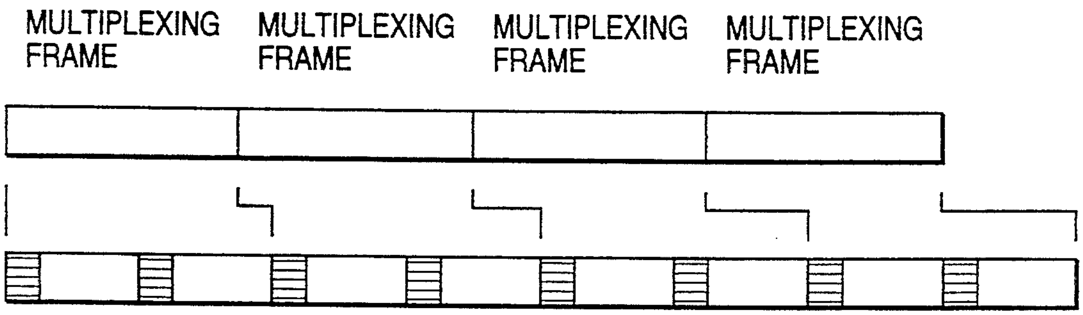

FIGS. 39A and 39B show an embodiment of a packet formatting. In FIG. 39A, respective multiplexing frames with headers added to them become packets "as is" and are outputted to the packet network side. In FIG. 39B, respective multiplexed frames are split into a plurality of packets, and respective packets have packet headers added to them, into which identifiers for reassembling multiplexed frames, etc. are inserted before they are outputted to the packet network side.

In FIG. 39A, the multiplexed frame cycle is 5 ms, the multiplexed frame length is 48 bytes, the execution throughput to the packet network side is 76.8 kbps, and packets are formatted as ATM cells having 5-byte headers and 48-byte message data, for example.

In FIG. 39B, the multiplexed frame cycle is 5 ms, the multiplexed frame length is 96 bytes, the execution throughput to the packet network side is 153.6 kbps, and packets are formatted as ATM cells having 5-byte headers and 48-byte message data, for example.

Here, although multiplexed frames are transmitted in split forms, since the multiplexers have a function of synchronizing multiplexed frames, the packet interface on the receiving side does not need to assemble frames, and there is no need to add extra control bits to the message data.

FIG. 40 shows an embodiment of a code table for transmission band information at a band divisional coding illustrated in FIG. 12. The transmission band codes for respective channels have e.g. 4 bits. Their three (3) least significant bits RI2, RI1 and RI0 are transmitted between the multiplexers (MUX) on the sending side and the demultiplexers (DMUX) on the receiving side. The most significant bit is used for notifying the discarding mode described later.

As shown in FIG. 12, aside from the information of the respective bands having split side information, the numbers of transmission bits at respective discarding levels for bands B1 through B4 are shown as the numbers in the parentheses. For instance, the numbers of transmission bits for bands B1 through B4, e.g. at discarding level 1, are all 5. The transmission level at this time is 40 kbps, and the transmission band information code is 110. At discarding level 5, the numbers of transmission bits for bands B1, B2 and B3 are 2 and the number of transmission bits for band B4 is 0, while the transmission level is 12 kbps and the code is 010.

Figure 41:
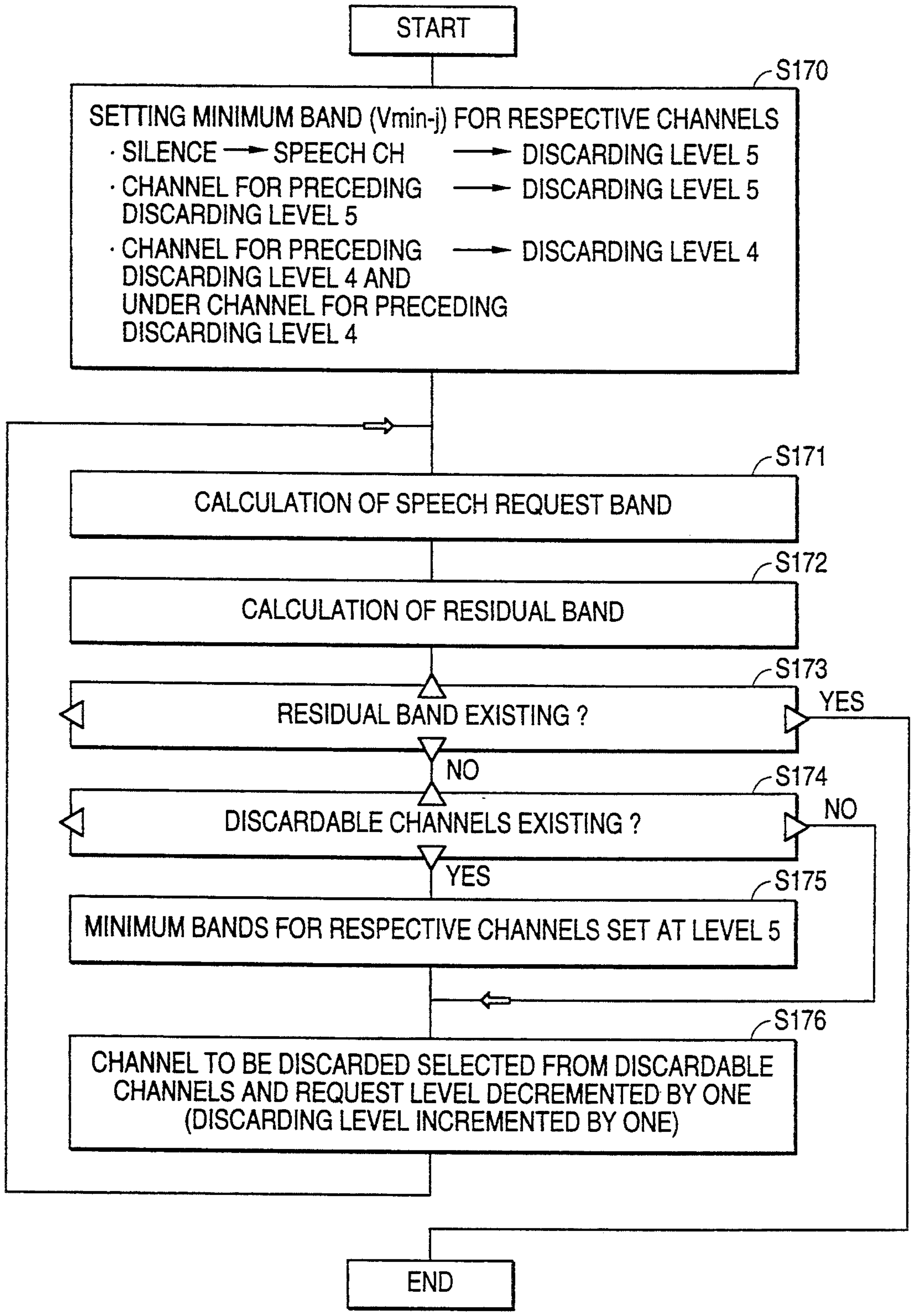
FIG. 41 is a flowchart of an embodiment of multiplexing using a sub-band coder.

FIG. 41 is a flowchart showing an embodiment of a multiplexation performed by a multiplexer for sub-band coding. In FIG. 41, the minimum bands $V_{min}$ for respective voice channels are set in S170. The minimum bands are different by channel numbers j. To reflect the past discarding history, the minimum bands for the channels changed from a silent mode to a speech mode and the channels previously set at discarding level 5 are set at discarding level 5, while the minimum bands for the channels previously set at discarding levels 1 through 4 are set at discarding level 4.

Next, in S171 to calculate the bands requested for voices, the sum of the transmission request bands is calculated for respective channels, excluding parts unnecessary for transmission for some voice channels among 50 supplementary bits, e.g. as shown in FIG. 6. The remaining bands in the multiplexed frames are calculated in S172. Existences of remaining bands are judged in S173. If there is a remaining band (including 0), since the requested bands for respective channels can be multiplexed, the processes are terminated.

If it is not judged that there is any remaining band in S173, existences of discardable channels are judged in S174. If there is no discardable channel, the minimum bands for the respective channels are lowered to discarding level 5 in S175. If there are discardable channels, the process goes on to S176, skipping S175. The discarding level for the discardable channels is incremented by one level in S176, and the process reverts to S171. Then, the process continues until it is judged there is a remaining band in S173 when the process ends.

Figure 42A:
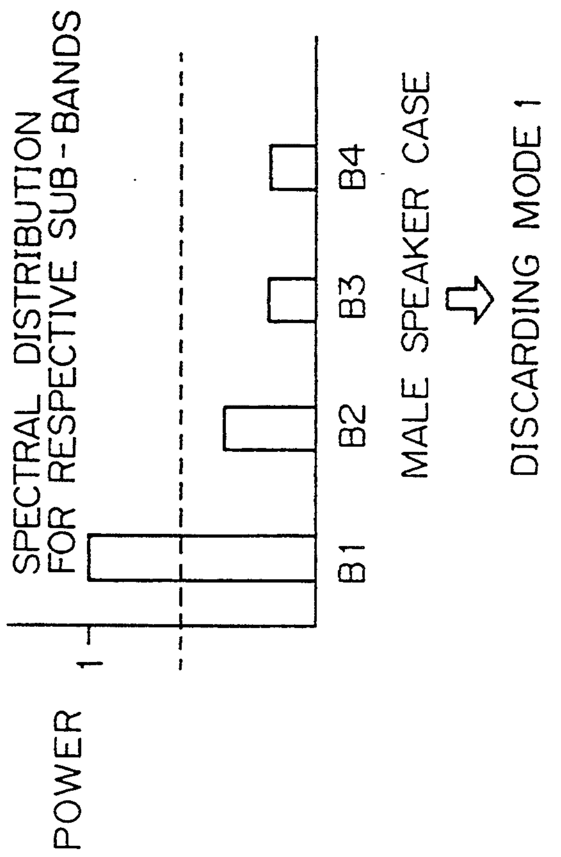
FIGS. 42A and 42B show embodiments of the discarding mode corresponding to the frequency characteristics of voices.
Figure 42B:
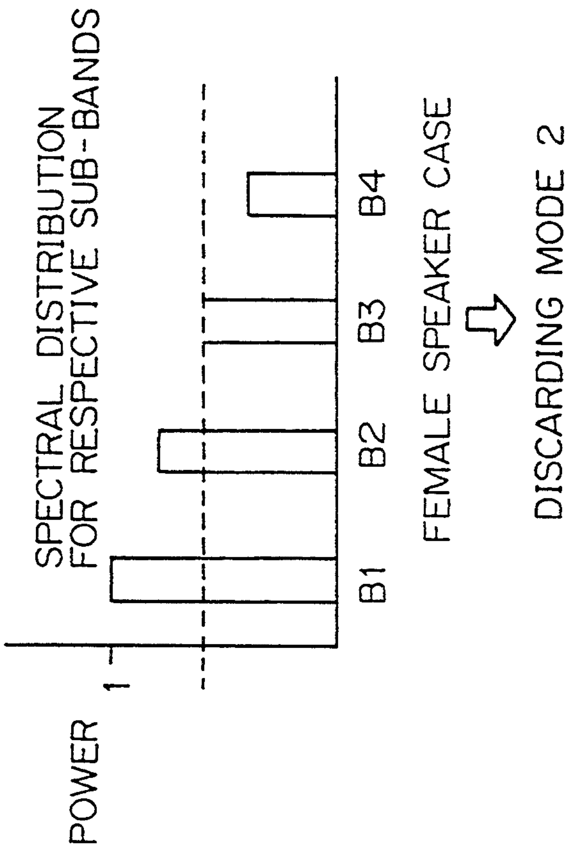

FIGS. 42A and 42B show an embodiment of a discarding mode corresponding to the voice frequency characteristics of the speaker. For example, in FIG. 12, coders 393 through 396 for bands B1 through B4 measure voice powers for a predetermined period of time and calculate their average values. FIG. 42A shows an example of the spectral distribution of the voice powers in the respective bands of a male speaker. The distribution is normalized by using the power in band B1. FIG. 42B shows an example of a spectral distribution of the voice powers in the bands of a female speaker. Respective bands split in the spectral distribution by a threshold (indicated by a dashed line) are judged by their importance. In FIG. 42A, discarding mode 1, emphasizing band B1, is used. In FIG. 42B, discarding mode 2, emphasizing bands B1 and B2, is used.

FIG. 43 shows an embodiment of the code table of transmission band information when a discarding mode is specified. In FIG. 43, one bit of side information for identifying the discarding mode is used at a speech time in addition to the earlier described side information, together with an additional 1 kbps for transmission level.

In FIG. 43, at discarding level 5, mode 1, i.e. the number of transmission bits for a male speaker in respective bands B1 through B4, is the same as mode 2. At discarding level 4, unlike mode 2, mode 1 has 4 transmission bits for band B1 and 0 transmission bits for band B4.

Figure 44A:
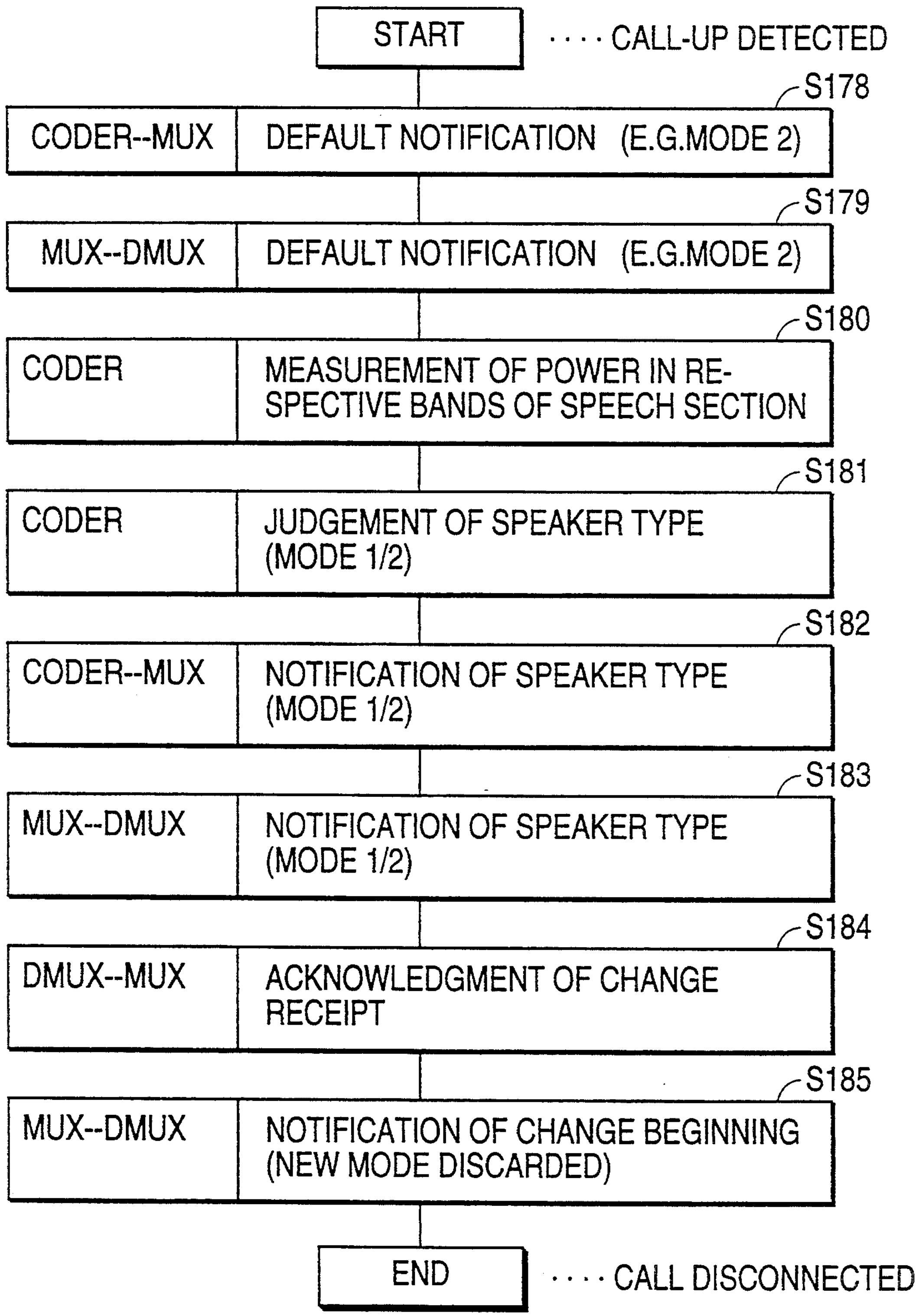
FIGS. 44A and 44B are flowcharts showing an embodiment of the determination of the discarding mode and the mode notification to the receiving side.
Figure 44B:
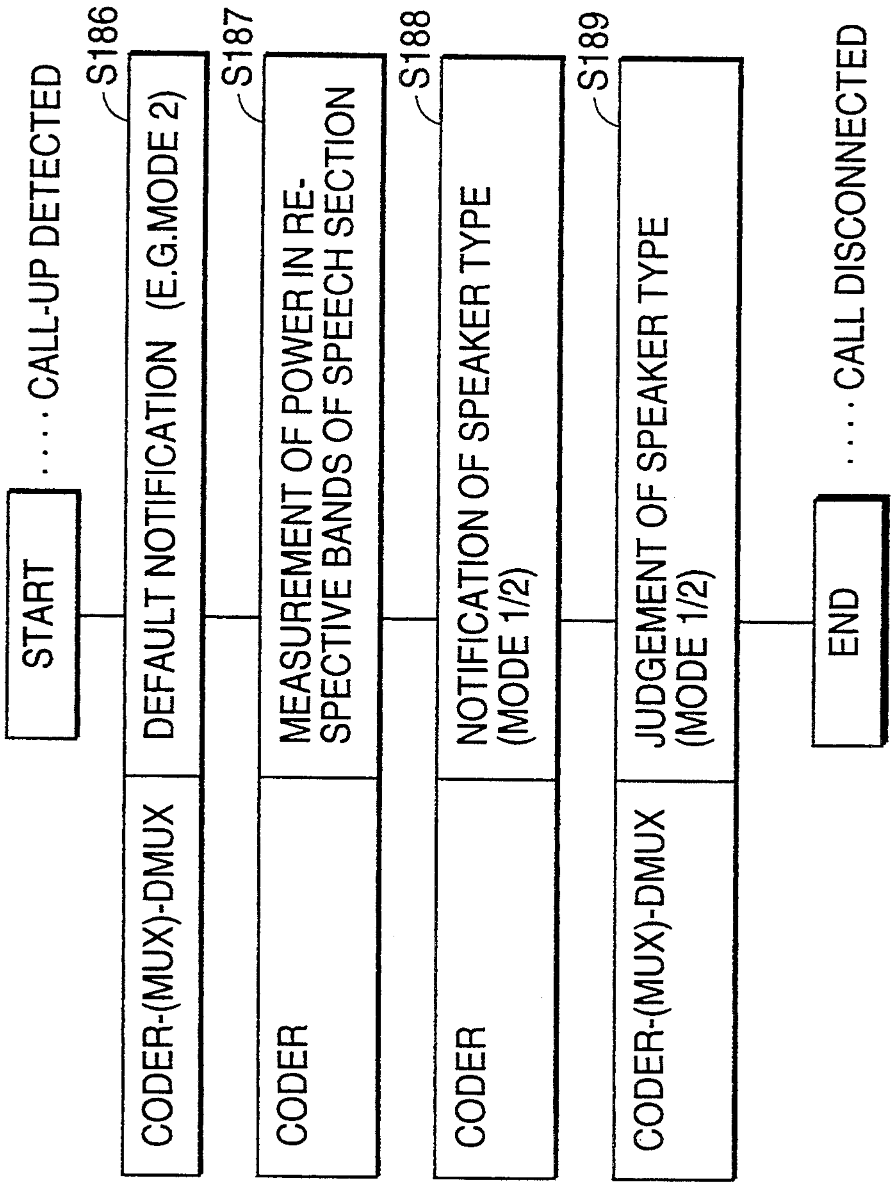

FIGS. 44A and 44B are flowcharts of an embodiment for notifying the receiving side of a mode and for determining a discarding mode. FIG. 44A is a flowchart of the case in which the sending side notifies the receiving side of a discarding mode, the receiving side returns the change receipt, and a discarding per the new mode begins. A voice coder notifies the multiplexer of the discarding mode predetermined as a default value before measuring the voice powers of respective bands in S178. The multiplexer notifies the demultiplexer on the receiving side of the default discarding mode in S179.

The coder on the sending side measures powers of respective bands in speech sections in S180, the coder judges the discarding mode per the speaker type in S181, and the coder notifies the multiplexer of the discarding mode in S182.

The multiplexer notifies the demultiplexer on the receiving side of the discarding mode in S183. The demultiplexer on the receiving side notifies the multiplexer of the receipt of a change in S184. The multiplexer notifies the demultiplexer on the receiving side of the beginning of the change, and a discarding per the new mode begins.

FIG. 44B is a flowchart of the process for notifying the receiving side of a discarding mode as side information of a voice. In this case, a discarding mode is changed, even though the demultiplexer on the receiving side does not notify the multiplexer of the receipt of a change. The coder notifies the demultiplexer of a default mode via the multiplexer in S186. The coder measures the powers in respective bands in S187, determines the discarding mode in S188, notifies the demultiplexer on the receiving side of the discarding mode as the side information of a voice via the multiplexer in S189.

The methods for determining discarding modes, illustrated in FIGS. 42A, 42B, 43, 44A and 44B, are explained in further detail below. The powers of the respective bands in speech sections are measured as described below. The processes are equivalent to those in S180 in FIG. 44A or S187 in FIG. 44B.

Samples of the powers (n) of respective bands are measured at cycle intervals for Judging speech and silent sections, e.g. a few milliseconds to a few tens of milliseconds. The powers of the respective bands at the intervals of judging cycles are expressed below as the input signal components of the band objected to $S_k$.

$$P(i) = \sum_{k=i\times n}^{i\times n+(i+1)\times n-1} S_k^2$$

where i is incremented by n.

Next, the electrical power values calculated from the above equations are accumulated only when there ts a speech in a judging cycle for obtaining the average power of respective bands, e.g. in 1,000 cycle periods for judging speech or silent. The accumulated value is divided by the number of accumulated terms. That is, the average electric power for the speech period is obtained from the following equation.

$$P = \left(\sum_{k=1}^{1000} VDF_i \times P(i)\right) / \left(\sum_{k=1}^{1000} VDF_i\right)$$

where $VDF_i$ i s a speech flag, becoming "1" when speech is judged to exist.

Next, the determination of the discarding mode in S181 or S188 is based on the calculation of the frequency characteristic distributions, as illustrated in FIGS. 42A and 42B. The spectral distribution for band $B_2$ is obtained by dividing the average electric power of $B_2$ by assuming the average electric power during a speech period for band $B_1$ is 1. FIG. 42 illustrates the method of judging the spectral distribution of all bands based on a constant threshold. Yet, it is possible to change the threshold for each band in an actual use.

Figure 45:
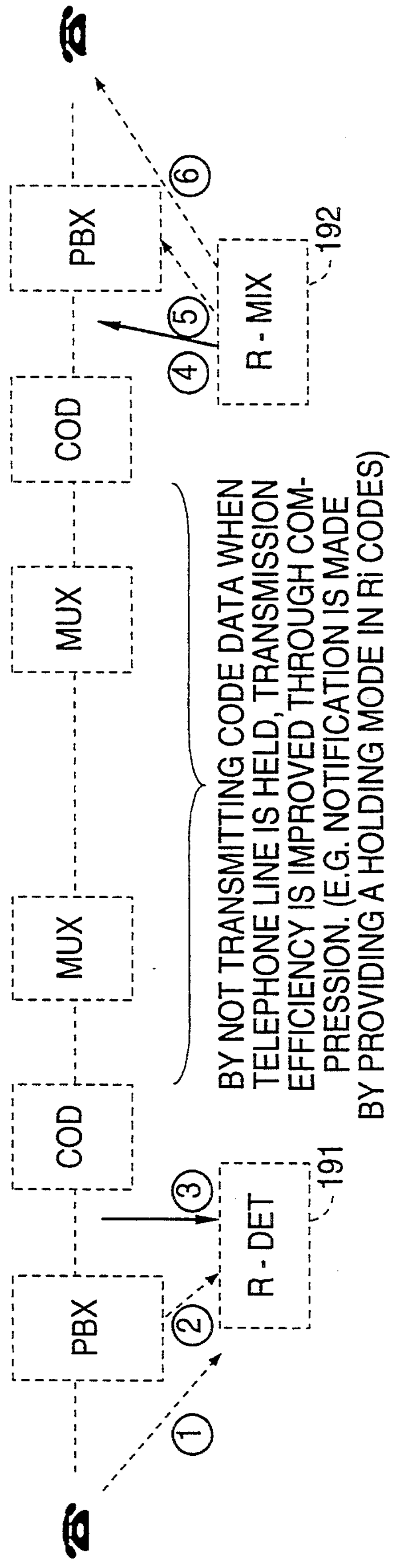
FIG. 45 is a block diagram of an embodiment of a compressed transmission system in which channels in a holding mode are assumed to be in a silent mode.

FIG. 45 is a block diagram showing an embodiment of a compressed transmission system regarding the channels in a holding mode as being in a silent mode. In FIG. 45, when the line is held, the transmission band is compressed as a silent mode without transmitting a holding sound. The sending side notifies the receiving side of the holding mode by inserting the information e.g. in the $R_i$ code described earlier.

As shown in FIG. 45, the holding mode detector (R-DET) 191 on the sending side detects a line holding directly [1] when a holding button of the telephone is depressed, [2] when a PBX detects a holding sound pattern outputted from a telephone unit, or [3] when the input side of the voice coder detects a holding sound pattern. The holding sound mixer (R-MIX) 192 on the receiving side mixes holding sounds [4] on the output side of a voice coder, [5] in a PBX, or [6] on another telephone unit. Clearances of holding mode is notified to the R-DET 191 [1] through a change in a hooking condition of a telephone or clearing the holding button, [2] through a mismatch of a holding sound on the input side of a coder, or [3] through a change in the hooking condition on a PBX, with a combined use of a monitor of a signaling signal. Thereafter, voices are transmitted to the receiving side per the earlier described method.

Figure 46A:
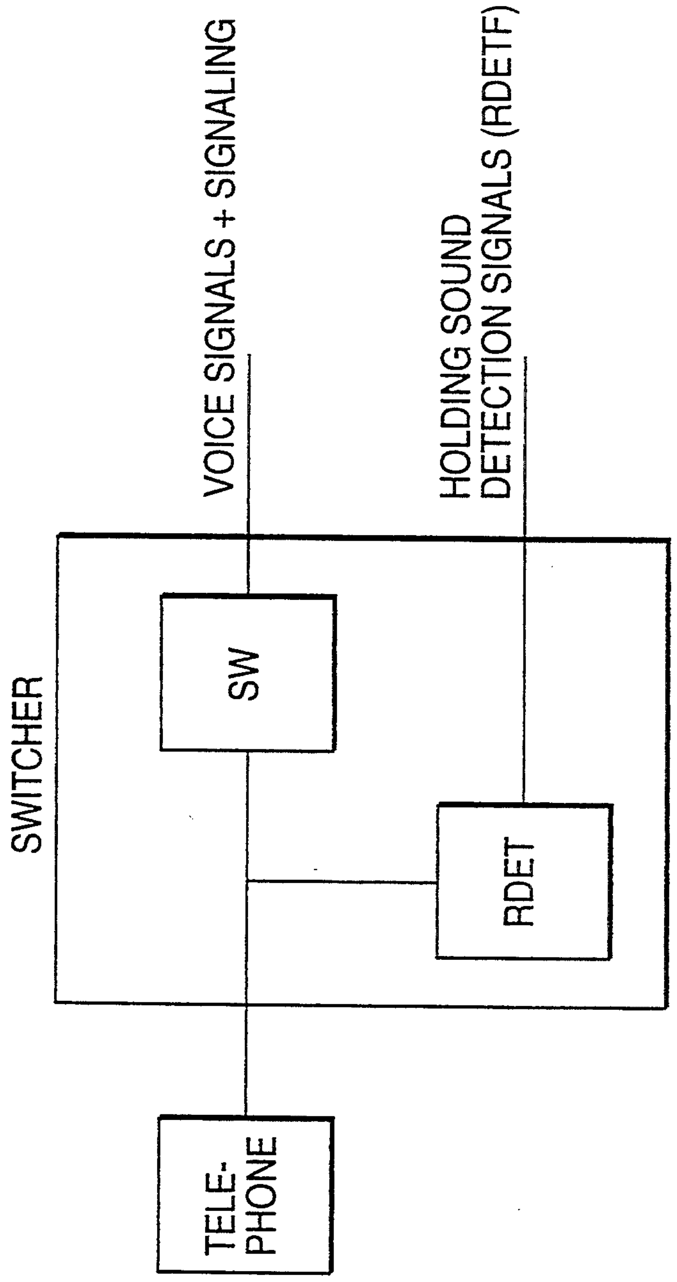
FIGS. 46A and 46B illustrate an embodiment in which a holding mode detector is contained in the switch.
Figure 46B:
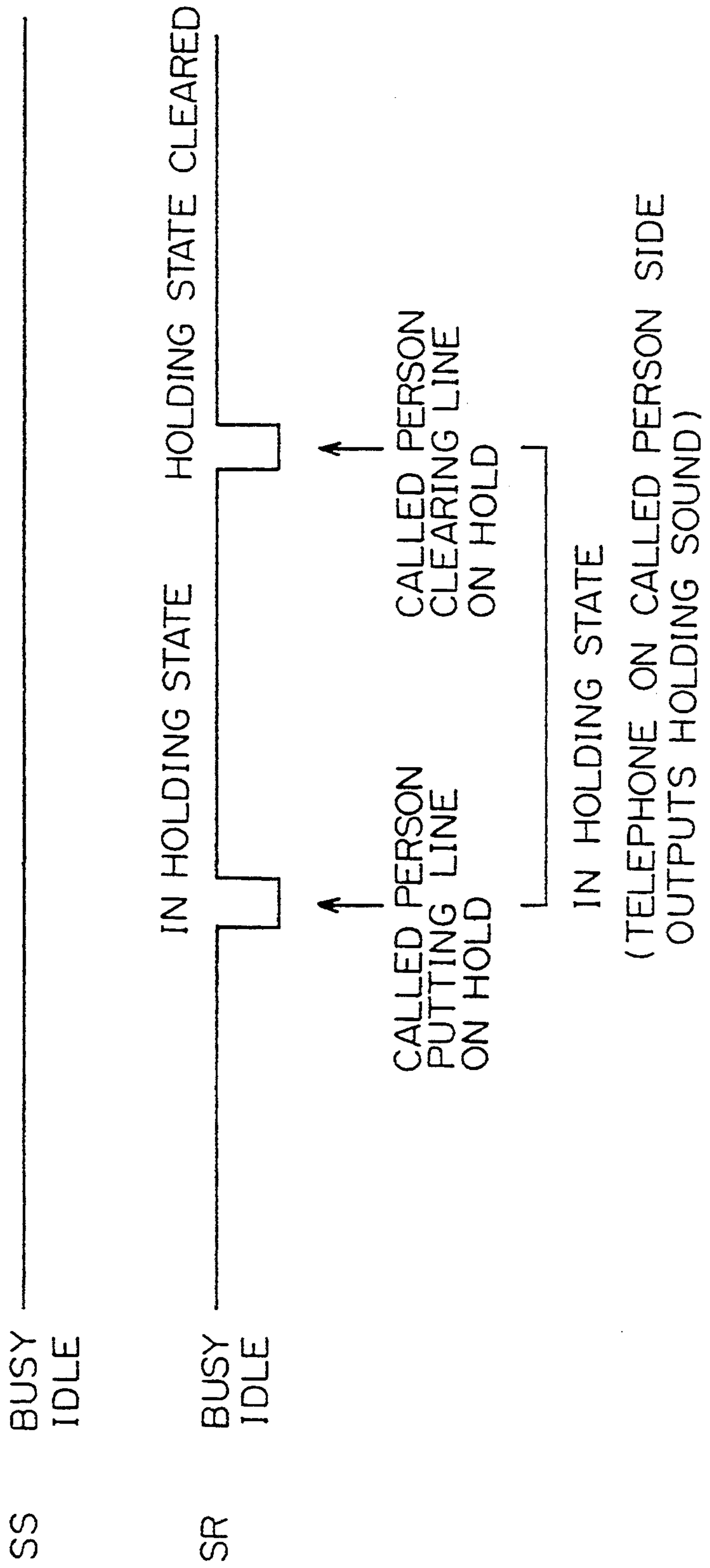

A holding mode detector (R-DET) such as one shown in FIG. 45 can be contained in the block of a PBX, a COD (coder) or MUX (multiplexer). FIGS. 46A and 46B show embodiments for containing a holding mode detector in a switching system. In FIG. 46A, the holding mode detector R-DET provided in a switching system outputs a holding sound detecting signal, when it detects a holding mode.

FIG. 46B illustrates a method for judging the holding mode. According to this method, the holding mode is judged to be in effect when the receiving side is in an on-hooked mode for a predetermined time period during a call connection, and the holding mode is judged to be cleared when the receiving side is in an on-hooked mode for a predetermined time period during a holding. Such predetermined time periods can be anywhere between 50 ms and 1 second, for example. Oftentimes, the call is disconnected when the calling side is hooked on during a call connection, although the called side cannot disconnect the call unless the on-hooked mode is maintained for about 30 seconds. Therefore, such a holding becomes possible.

Figure 47:
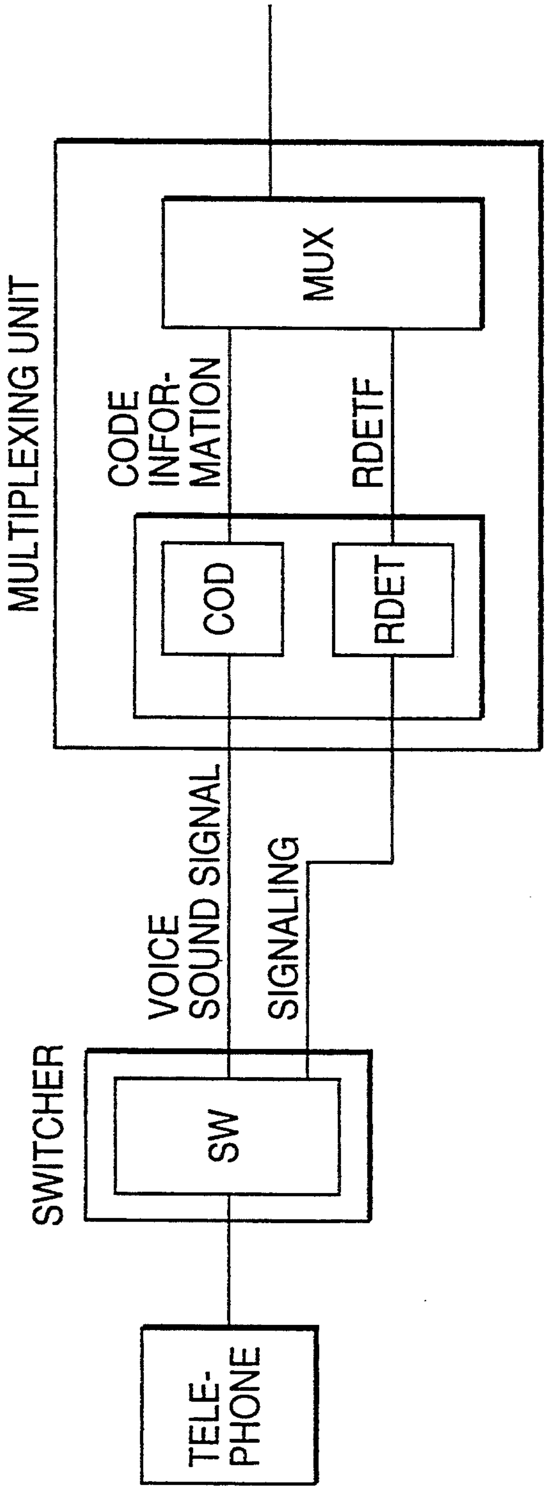
FIG. 47 is a block diagram showing an embodiment of a multiplexer containing a holding mode detector.

FIG. 47 shows an embodiment of a holding mode detector R-DET contained in a multiplexer. In FIG. 47, the holding mode detector R-DET receives a signaling signal from the exchanger and detects the holding mode by a method similar to that shown in FIG. 46B.

Figure 48:
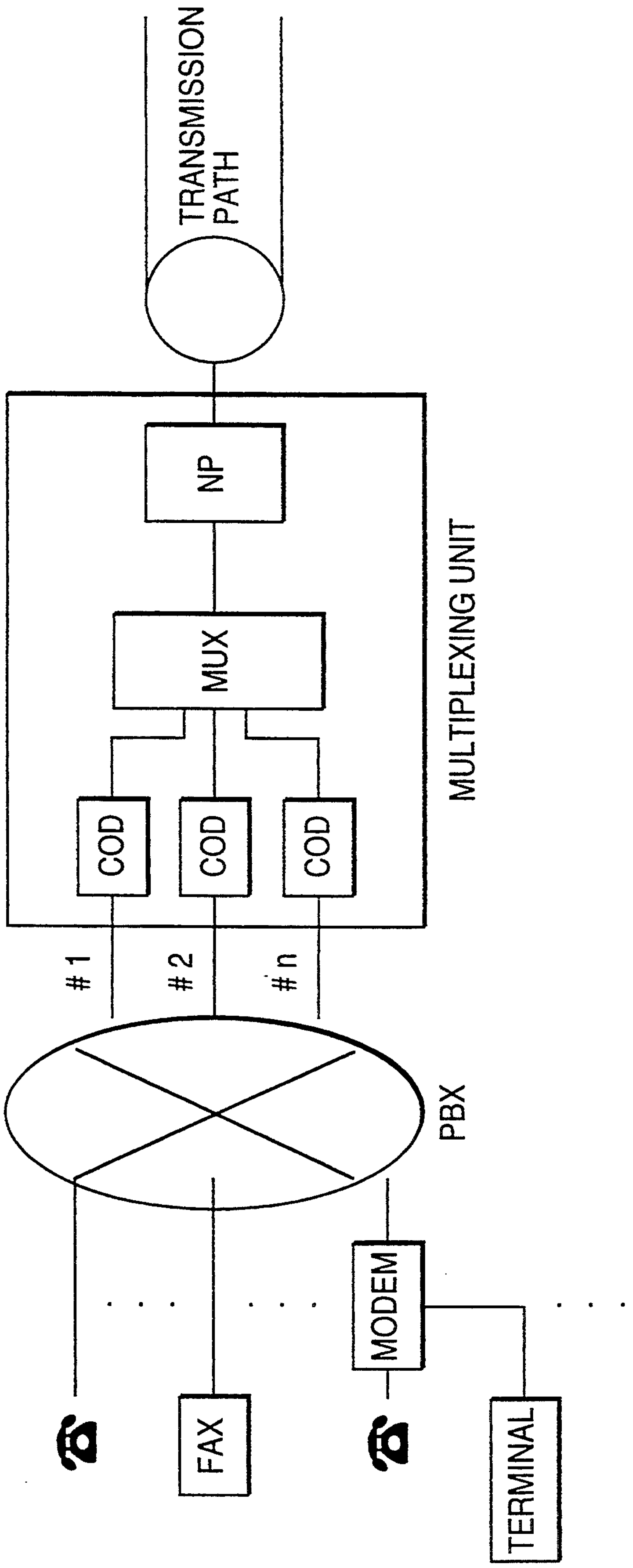
FIG. 48 is a block diagram showing a schematic configuration of a system in which the multiplexer accommodates various transmission media.

FIG. 48 is a block diagram of the schematic configuration of the system in which multiplexers accommodate various transmission media. In FIG. 48, the modem connected to a terminal in addition to a telephone, a telephone and a fax machine are connected to a PBX. The multiplexer (MUX) in a multiplexing device comprising coders (COD), a multiplexer (MUX) and a network port (NP)] transmits its output to the transmission path through the network port (NP). In this case, it is not possible to ascertain which fax machine prohibited from discarding information is connected to which coder through the PBX.

That is, in FIG. 48, since some transmission media set all information equivalent to the core information and do not have any supplementary information, the coder for coding the information sent from such media need to code the requested band of the transmission media without discarding any of them. Therefore, there is a need to detect e.g. the fax protocol, thereby enabling the coder receiving the detection signal to code input information without discarding it.

Figure 49A:
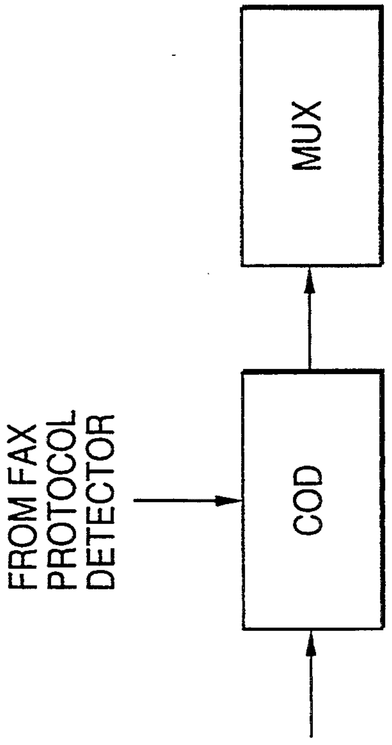
FIGS. 49A, 49B and 49C are block diagrams showing an embodiment of a coder for coding according to the result of FAX protocol detection.
Figure 49B:
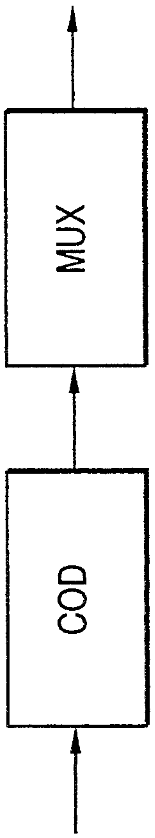
Figure 49C:
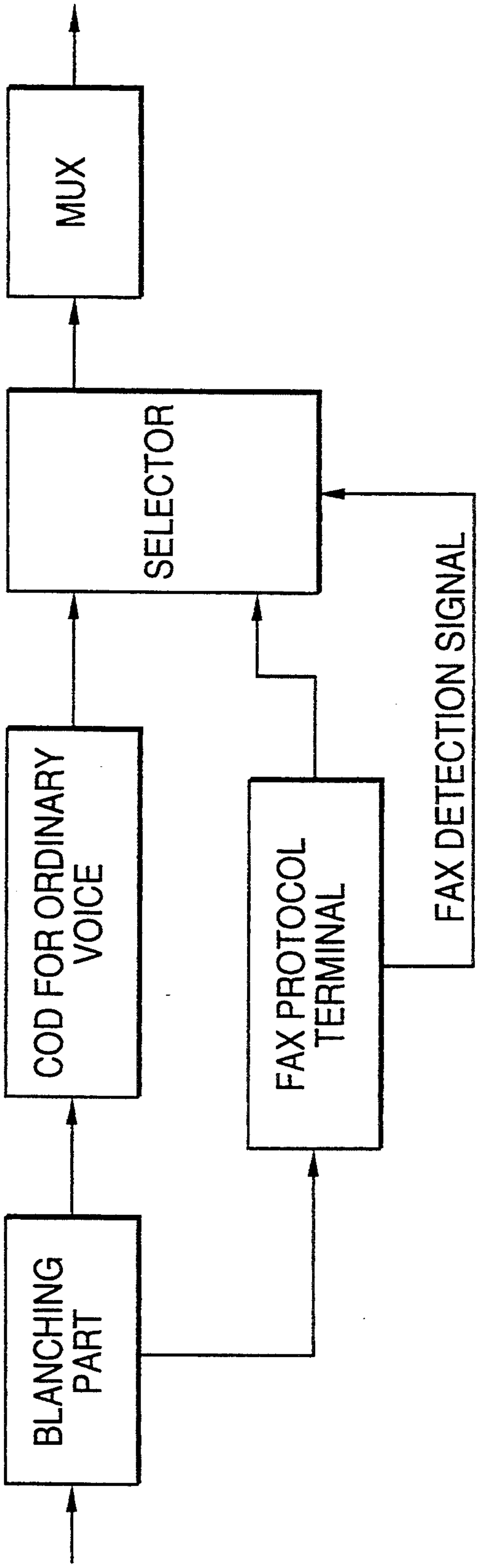

FIGS. 49A, 49B and 49C are block diagrams showing an embodiment of the coder coding per the fax protocol detection result. FIG. 49A is an example of a coder sending a coded signal to a multiplexer without discarding any requested band, on receipt of a detection signal from a FAX protocol detector not shown in the drawings.

FIG. 49B shows an embodiment of a coding when the coder itself detects a FAX protocol, where input information is coded without discarding the requested band when the input signal is a fax protocol, and where the input information is coded according to the earlier described discarding method when the input signal is a voice. FIG. 49C shows an example in which both an ordinary voice coder and a fax protocol terminator receive input signals split at a junction and the multiplexer receives the output from the fax protocol terminator through the selector when a fax protocol is detected or the output from the ordinary voice coder when a fax protocol is not detected.

FIG. 49B shows a method for a coder to detect fax protocols. The detection method is explained by using the outline of transmission sequence of G3-FAX shown in FIG. 50. In FIG. 49B, a coder judges fax data when it detects a transmission of a CNG tone or a CED tone at phase A.

Although FIG. 48 illustrates a system for accommodating various transmission media, it is conceivable to change the coding method used by the coder per the medium characteristics. For instance, in FIG. 49B, the coder can detect a fax protocol as described earlier thereby selecting a band in correspondence with a fax signal. In this case, a coder using a fax protocol terminator in combination, as shown in FIG. 49C, need not be used.

For a touch-tone telephone, if a coding such as for sending only a tone code when a tone signal is detected, transmissions can be made at a very low rate such as below 1 kbps. Furthermore, signals such as those in personal computer communications can be coded in bands different from those for ordinary voice conversation, and MODEMs using different modulation methods can differentiate their necessary coding speeds.

A system such as that shown in FIG. 48 needs to limit the number of channels not allowing discarding any parts of the requested bands and to prevent at least such channels not allowing discarding from actually discarding channels. A method based on number programming, for example, is used to limit the number of channels. In FIG. 48, when the input port on the multiplexing complex side for accommodating a fax is limited to #1, the fax dial numbers are programmed to be e.g. 7xxx, and ordinary phone numbers are programmed to be e.g. 8xxx. By registering such a numbering system in the PBX, connecting the-call to port #1 when the dial numbers are 7xxx and to ports #2 through #n when the dial numbers are 8xxx, even if two fax lines are to be extended, since port #1 is busy, the second call is blocked and the number of channels not allowing discarding is limited.

When channels not allowing discarding exist, the channels allowing discarding need to further increase the number of discardable bits. For instance, in FIG. 12, although core bits are transmitted for bands B1, B2 and B3 at level 5, it is necessary to allow discarding until level 6 at which no core bits are transmitted, i.e. a silent mode.

Figure 51:
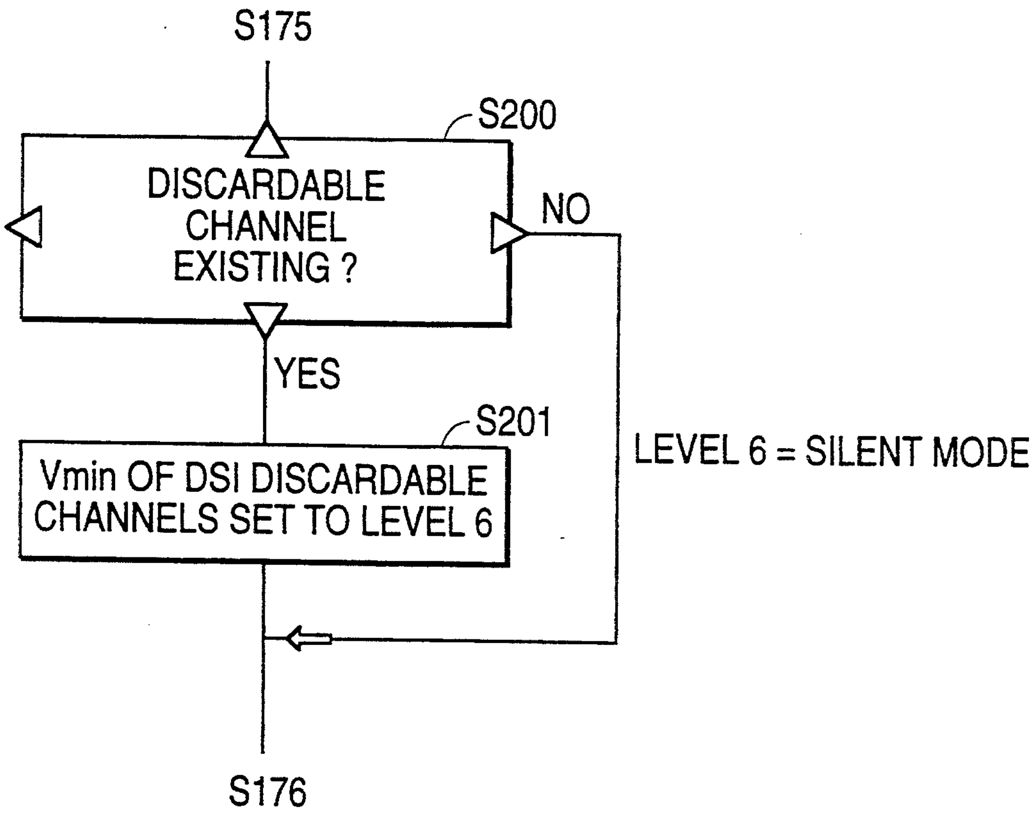
FIG. 51 shows an embodiment of the additional steps to the flowchart shown in FIG. 41 for enabling a discarding before a silent mode.

FIG. 51 shows an embodiment of the processes added to the flowchart shown as FIG. 41. More specifically the processes shown in FIG. 51 are to be inserted between S175 and S176 in FIG. 41. After the minimum bands for the respective channels are set at level 5, it is judged whether or not there is any discardable channel in S200. When there is no discardable channel, the minimum band for the channel allowing discarding like DSI until a silent mode is set at level 6 in S201 before the process goes on to S176. It goes without saying that the process in S176 is performed, skipping processes in S200 and S201, when there is a channel allowing discarding in S174 in FIG. 41.

Figure 52:
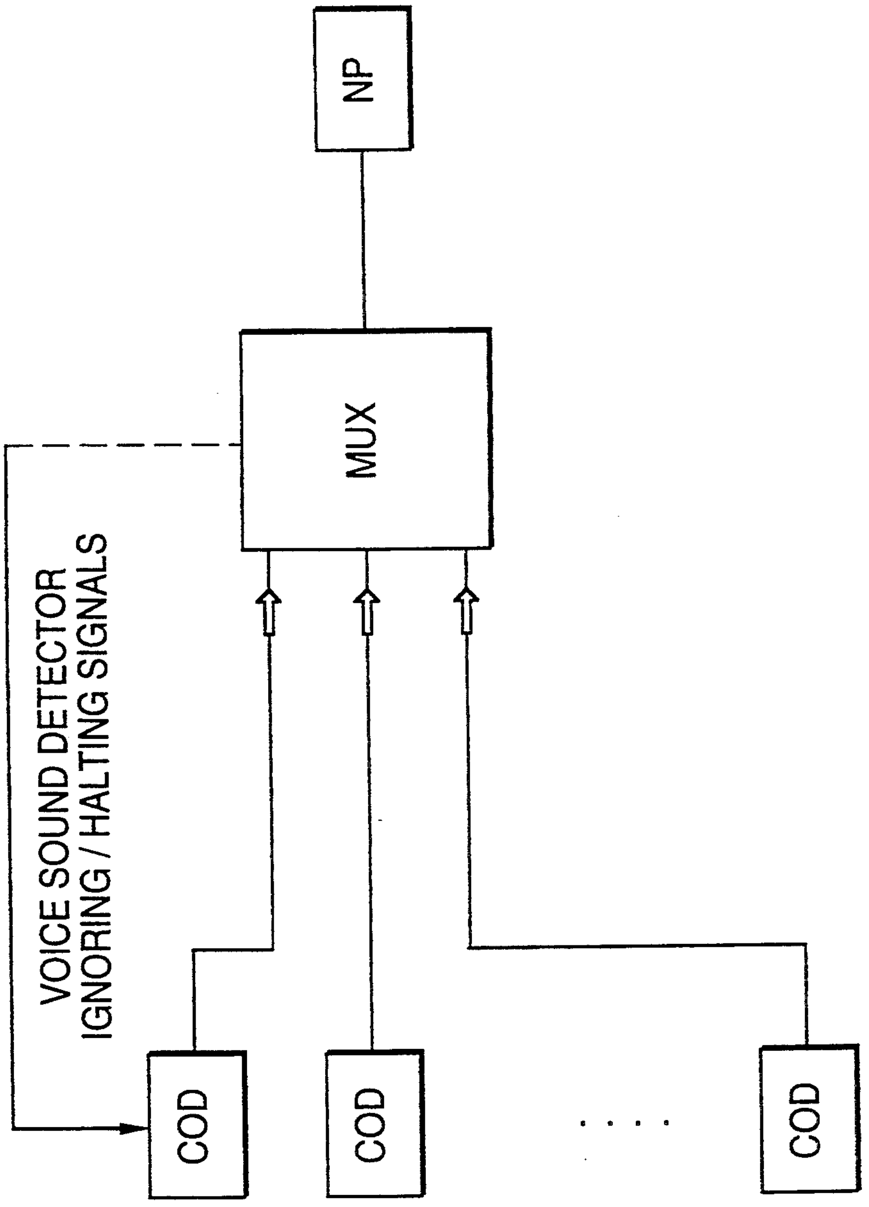
FIG. 52 is a block diagram showing the configuration of a system capable of ignoring the result of detection or halting the operation of a silent mode detector.

FIG. 52 is a block diagram of the system for halting the operation of the voice detector or ignoring the detection result, when the number of voice channels to which call connections are performed are small, when there is no need to discard the supplementary information part, or when the sound deterioration caused by the discarding of the supplementary information part is less than that caused by the voice detector. In FIG. 52, e.g. the multiplexer (MUX) counts the number of calls to determine the necessity of discarding, and prevents a sound quality deterioration caused by a voice detector by outputting a voice detector ignoring/halting signals to a coder when there is no need for discarding.

In this manner, when the number of calls is small and there is no possibility of discarding information, halting voice detector operations can prevent sound quality from degrading. The voice detector is used for detecting a speech or silent mode and for improving the transmission efficiency within the network by cutting unnecessary voice information, although it naturally causes a sound quality deterioration compared with the case in which a voice detector is not used. For instance, the microphone of a telephone hand-set picks up both the speaker's voice and background noise. If the voice information is cut as the silent mode when the speaker does not utter a sound, the atmosphere is not transmitted, because the background noise is not transmitted. Although the purpose will be served if the silent mode is detected by judging the content of the conversation, an ordinary silent mode detector sometimes judges even the part that should not be cut as a silent mode to be eliminated, which causes a sound quality deterioration. Since a sound quality deterioration can occur similarly even when the number of used calls is small and nothing is discarded, by mutating the operation of the voice detector, the sound quality can be improved.

When relay switching system are provided between the switching system or the multiplexer of the information originator and the switching system or the multiplexer of the information receptor, it is possible to improve the sound quality of the transmitted information, if the switching system or the multiplexer of the information originator collects data on the numbers of channels to which calls are connected in the switches of the respective relay stages by way of the communication paths for the direction opposite to the information transmitting direction and the voice detector of the information originator ceases operating or ignores the detecting result, when the supplementary information part needs not be discarded. Since the number of voice channels to be connected is selected by assuming the most congested mode in a designing ordinary line, the possibility that something actually needs to be discarded is remote, and the sound quality can be improved even when the switchings are repeated in multiple stages. In this case, it is possible to achieve the purpose by having the switching system of a relay stage, to which fewer channels are call-connected, transmit a signal to cease the operations to the voice detector of the information originator by way of the communication path for the direction opposite to that in which the information is transmitted, instead of having the switching system or the multiplexer of the information originator collect data on the numbers of channels of the switches in respective relay stages.

Next, a method for judging whether or not the sound quality deterioration caused by discarding the code information is less than that caused by the operation of the voice detector is explained by referring to FIG. 52, which is judged simply by the relations among the line capacity, the degree of multiplexation, and the number of channels actually carrying calls. For instance, assuming that an evaluation was already made for the coder having the characteristics shown in FIG. 23, the sound quality is better if the silent mode detector is mutated for up to 5 channels when a 64 kbps line is multiplexed. This means that a result is known that the deterioration caused by coding is less than that caused by the transmission of a silent mode in which no code information is sent, even if some bands like 11 kbps are discarded in a stage-by-stage discarding when all channels carry sounds.

This case is equivalent to a case where, because of an overhead of the headers in multiplexed frames, no supplementary information part is discarded e.g. for at least up to three channels and the sound quality deterioration caused by discarding code information is less than that caused by the operation of the voice detector in a multiplexation of 4 or 5 channels.

Figure 53:
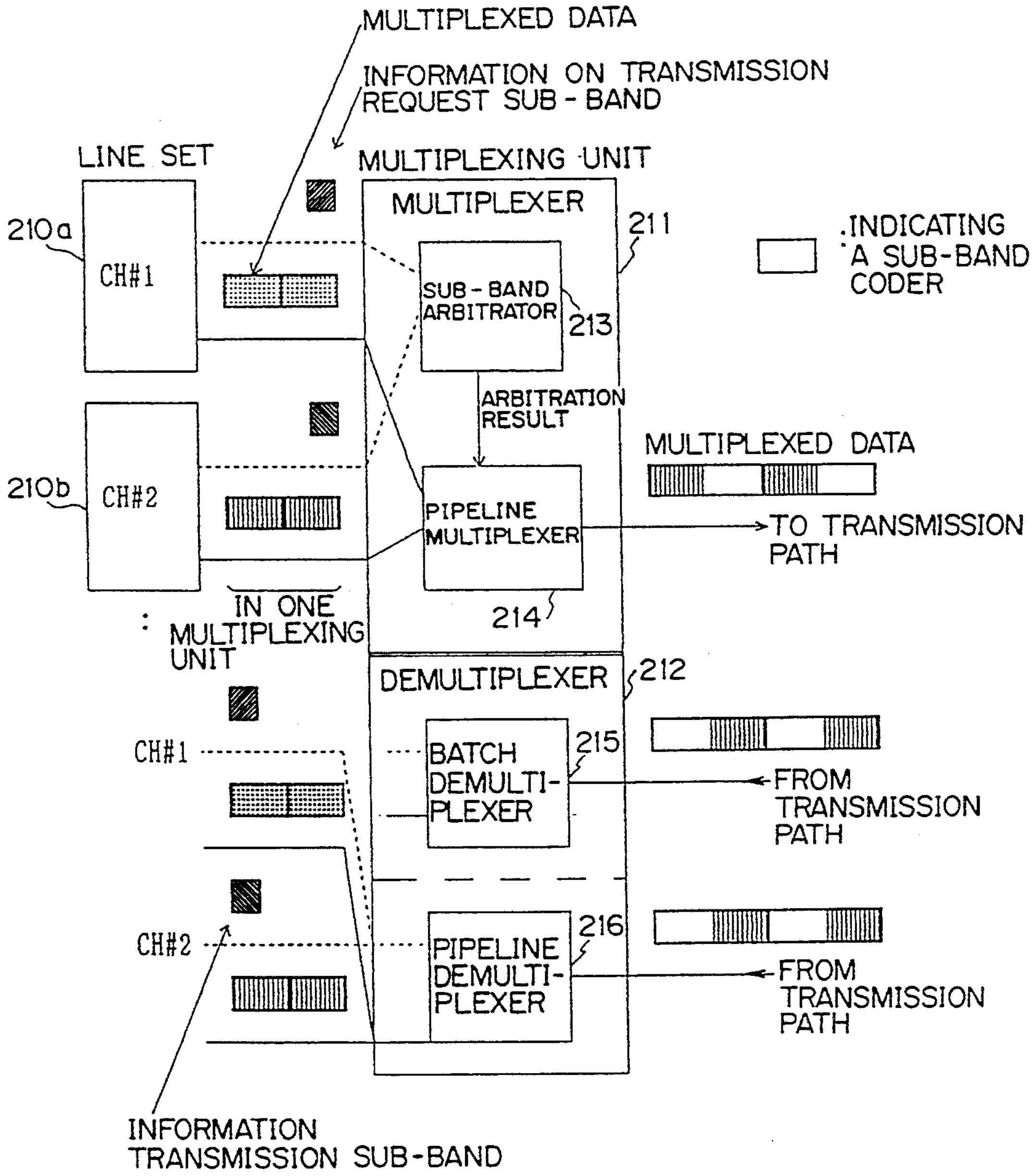
FIG. 53 is a block diagram showing a basic configuration of pipeline multiplexation in one multiplexing unit.

FIG. 53 is a block diagram showing the basic configuration of a pipeline multiplexing method for multiplexed transmissions of a plurality of multiplexed data split from the multiplexed data in one multiplexing unit in line sets. If a multiplexer (MUX) performs a multiplexation after receiving all data in one multiplexing unit from the line sets, the lag before the multiplexed data are outputted to a transmission path becomes large. Also, since the demultiplexer (DMUX) demultiplexes the multiplexed data in one multiplexing unit, the delay is further exacerbated.

Ordinarily, about 10 ms is appropriate for one multiplexing unit, but the effects of the delays become larger when relays are performed in multiple stages.

Therefore, a pipeline multiplexation method is devised for reducing the delays by further splitting the data in one multiplexing unit. This method is illustrated in FIG. 53.

In FIG. 53, the split number for further splitting one multiplexing unit in line sets 210*a*, 210*b*, . . . is assumed to be n in explaining the pipeline multiplexing method.

In FIG. 53, line sets 210*a*, 210*b*, . . . output data in one multiplexing unit in a form that can be split into n, according to the split number n. A multiplexer 211 in a multiplexing unit receives information indicating the transmission request band (or information indicating the existence of a need for transmission) in the data in one multiplexing unit prior to the target multiplexed information or contemporaneously with its head end.

The multiplexer 211 in the multiplexing unit comprises a band arbitrator 213 for arbitrating the bands during a discarding for congestion and a pipeline multiplexer 214 for pipeline multiplexing data in one multiplexing unit from line sets 210*a*, 210*b*, . . . per the arbitration result. The multiplexation and the output to the transmission paths for the respective spit data are consummated in 1/n of the processing times required for data in one multiplexing unit from line sets 210*a*, 210*b*, . . . When the multiplexed data in the first split are received, bands are arbitrated per the information on the transmission request band already or contemporaneously received, so that all pipeline multiplexations are consummated in 1/n of the time required for the multiplexation of data in one multiplexing unit.

Next, the demultiplexer 212 in the multiplexing unit comprises a batch demultiplexer 215 for demultiplexing the respective channel data in one multiplexing unit and outputting them to line sets 210*a*, 210*b*, . . . and a split demultiplexer 216 for sequentially demultiplexing the multiplexed data starting from the first split and for outputting to line sets 210*a*, 210*b*, . . . immediately after the demultiplexation.

Per the pipeline multiplexation method illustrated in FIG. 53, of the multiplexing information arriving from the transmission path only that necessary for restoring the information indicating the transmission bands of respective channels are first received. Per the restored information the pipeline multiplexed data are split demultiplexed and outputted to line sets 210*a*, 210*b*, . . .

That is, in FIG. 53, the multiplexer 211 sequentially multiplexes data upon receiving 1/n of the data of one multiplexing unit and outputs them to the transmission path. Therefore, delays caused by multiplexation are less than when data are multiplexed after all in one multiplexing unit are received. Also, since the demultiplexer 212 sequentially demultiplexes data in one multiplexing unit through split demultiplexation, the delays caused by demultiplexation are less than when data are demultiplexed in a batch.

Figure 54A:
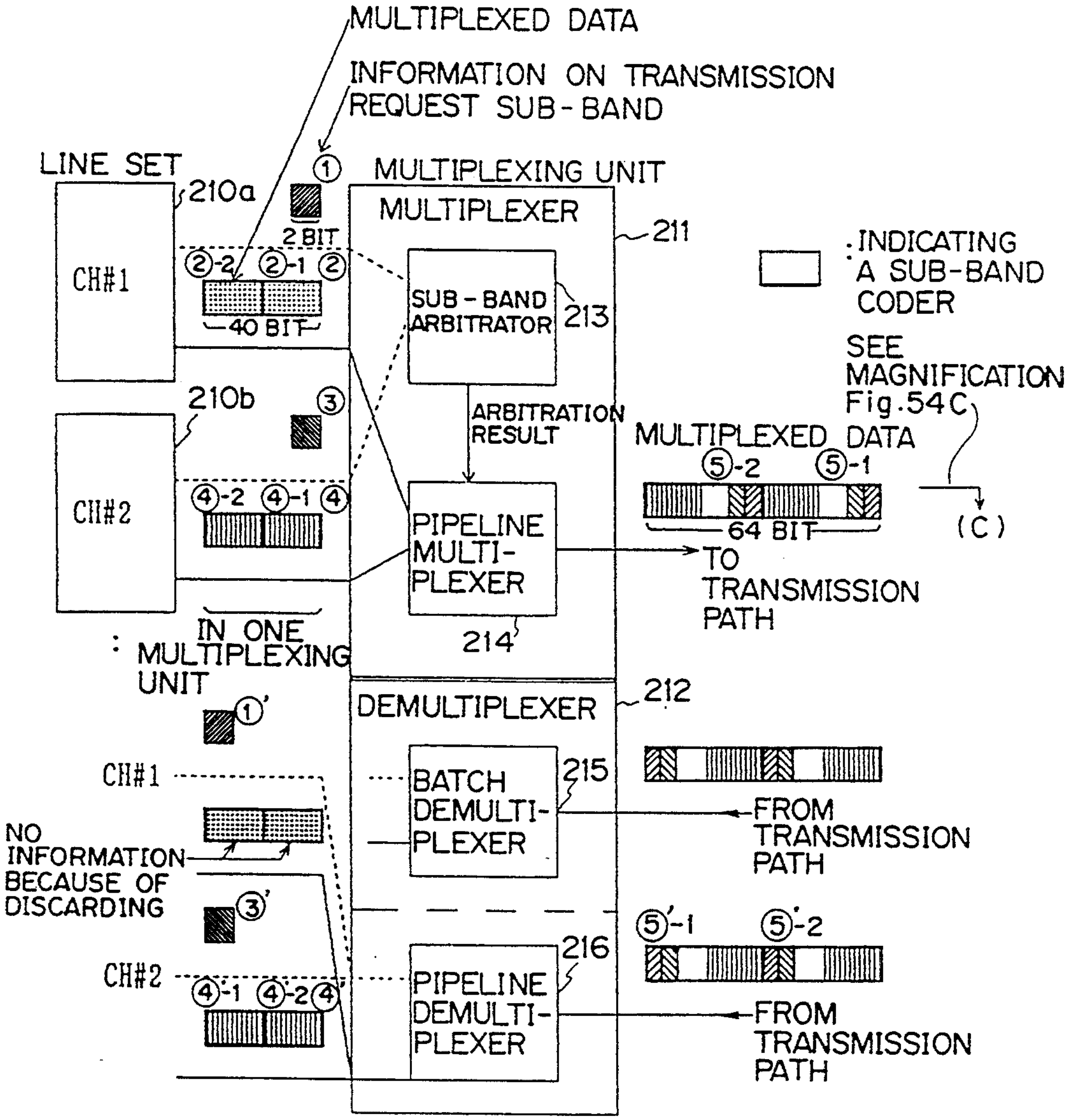

FIG. 54 shows an embodiment of the pipeline multiplexing method. FIG. 54 illustrates a case where n=2 for two channels, i.e. where the data in one multiplexing unit for two channels are are split into two.

Data [2] and [4] in one multiplexing unit (10 ms) for both channels are respectively set at 40 bits. Data [1] and [3] indicating the transmission request bands for both channels are respectively set at 2 bits. The transmission capacity of the transmission path, i.e. the length of the fixed length frame [5] is set at 64 bits.

First, the multiplexer 211 receives data [1] and [3] indicating the transmission request bands for arbitrating the bands. Since the sum of data [1] through [4] is 84 bits, and a band of 20 bits is deficient, the bands are arbitrated. The results of this sarbitration are as shown in FIG. 54B.

Second, the multiplexer 211 receives first split data [2]-1 and [4]-1 and multiplexes the first split data for channel 2 per arbitration results [a] and [b]. For notifying the receiving side of the occurrence of discarding at multiplexations, transmission band data [c] and [d] are split and attached. As a result, the first pipeline multiplexation data, shown in detail as [5]-1 in FIG. 49C, are sent to the transmission path.

Figure 54C:
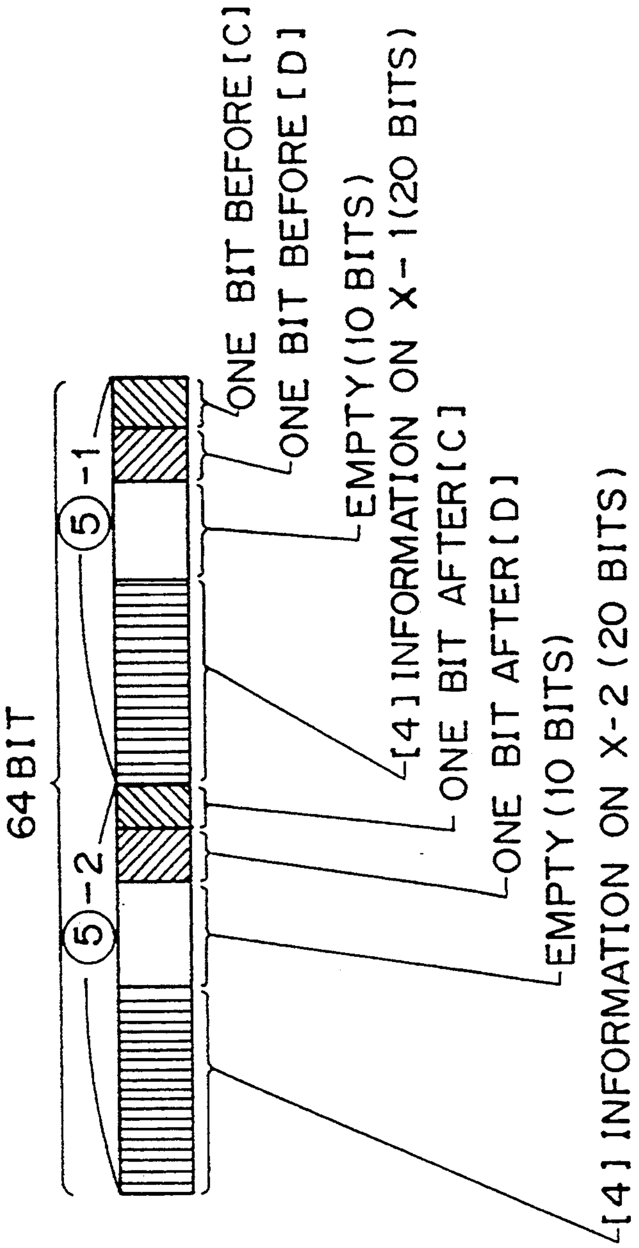

Third, the multiplexer 211 receives the second split data [2]-2 and [4]-2 to perform similar multiplexations per the arbitration results. The multiplexed data, shown in detail as [5]-2 in FIG. 54C, are sent to the transmission path.

The split demultiplexation by the demultiplexer 212 is explained next by referring to FIG. 54. The demultiplexer 212 receives two split demultiplexed data over a time period for one multiplexing unit, from which data indicating transmission bands are restored, which identify which of the received multiplexed data are to be assigned to which channels by how much.

Per transmission band data [c] and [d], 0 bits and 20 bits are demultiplexed from first pipeline multiplexed [5]'-1 respectively for channels 1 and 2. They are sent to the line sets of respective channels together with the restored transmission band data. Then, 0 bits and 20 bits are demultiplexed from second pipeline multiplexed [5]'-2 for channels 1 and 2, respectively. These bits are then sent to the line sets of the respective channels.

Figure 55A:
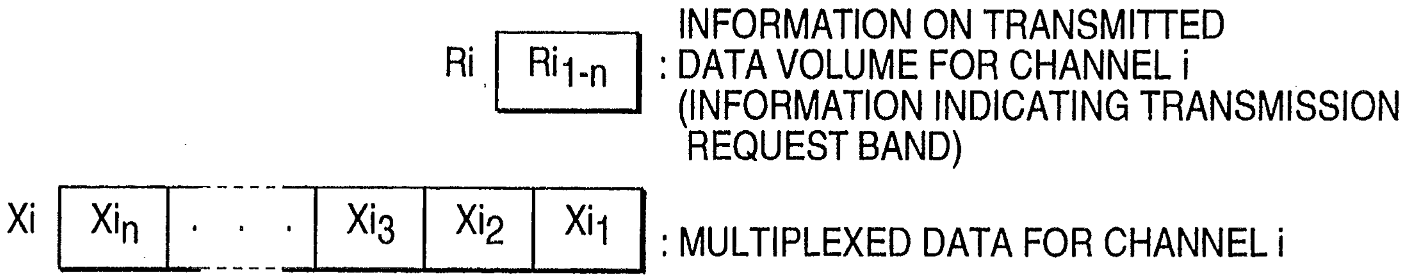
FIGS. 55A and 55B are flowcharts of an embodiment of pipeline multiplexations in one multiplexing unit.
Figure 55B:
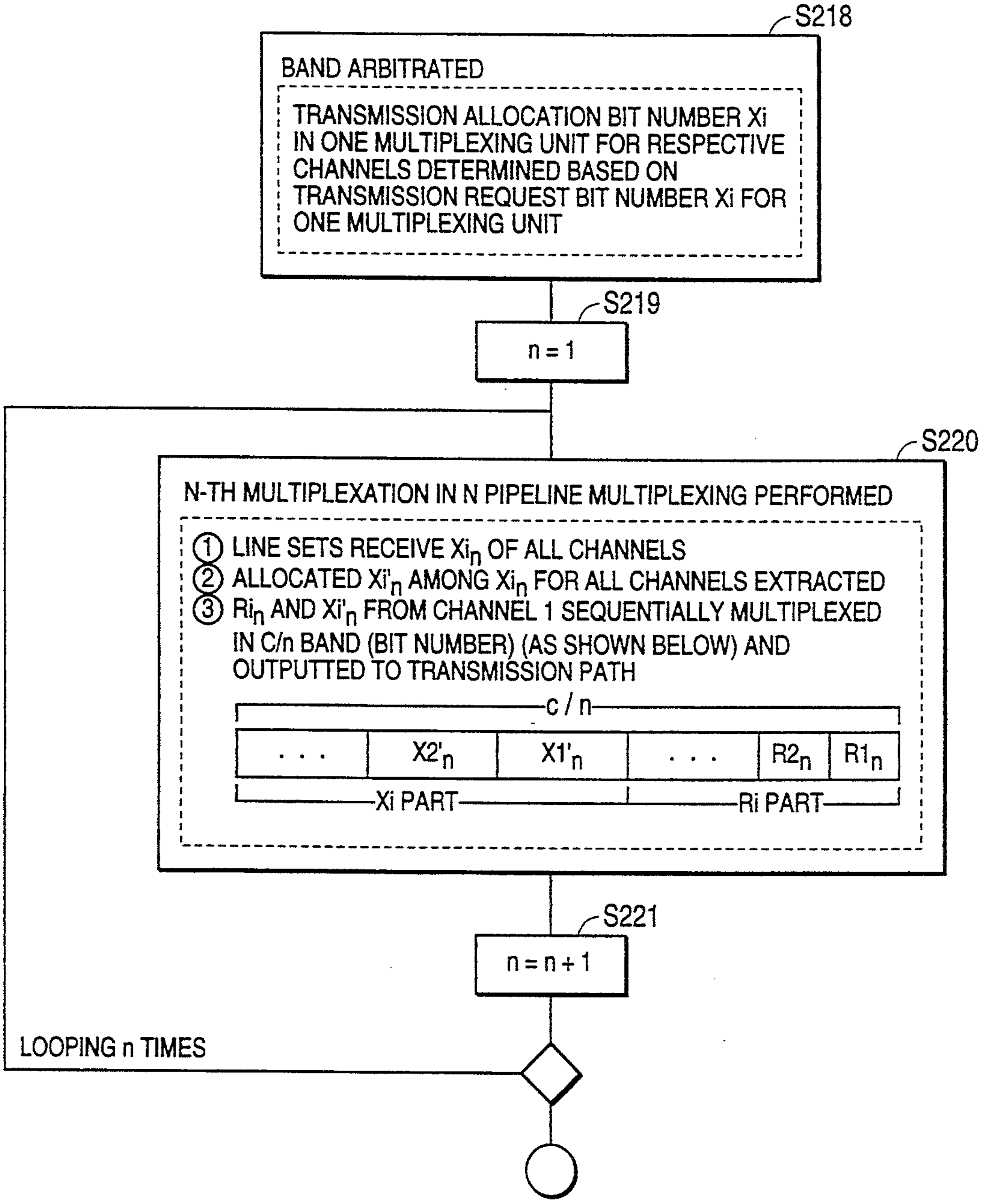

FIGS. 55A and 55B show an embodiment of the pipeline multiplexation in one multiplexing unit.

FIG. 55A shows multiplexed data Xi in one multiplexing unit for channel i and transmission request band data Ri therefor. Data in one multiplexing unit are split equally into 1/n, and the split data are named Xi1, Xi2, . . . and Xin corresponding to their arrival sequences. Transmission request band data Ri are also equally split by n to be named Ri1, Ri2, . . . and Rin. Since some parts of these split data are discarded as a result of the band arbitration, the data actually transmitted become Xi1', Xi2', . . . and Xin'.

FIG. 55B is a flowchart of the pipeline multiplexation. In FIG. 55B, a band arbitration is performed in 8218 by any one of the earlier described arbitration methods. Then, the numbers of bits Xi' allocated for transmission are determined for the respective split data to be actually transmitted to the respective channels.

Then, in S219, n is set to 1. In S220, the first split data for n pipeline multiplexations are multiplexed. Here, the first split data for all channels are received, and the split data allocated for transmission are extracted. Transmission band data Rin and allocation data Xin' are multiplexed over the regions having 1/n of the transmission capacity C of the transmission path to be outputted to the transmission path, starting from channel 1. In S221, the n value is incremented, and the process in S220 is repeated until the n-th one of the split data.

Figure 56:
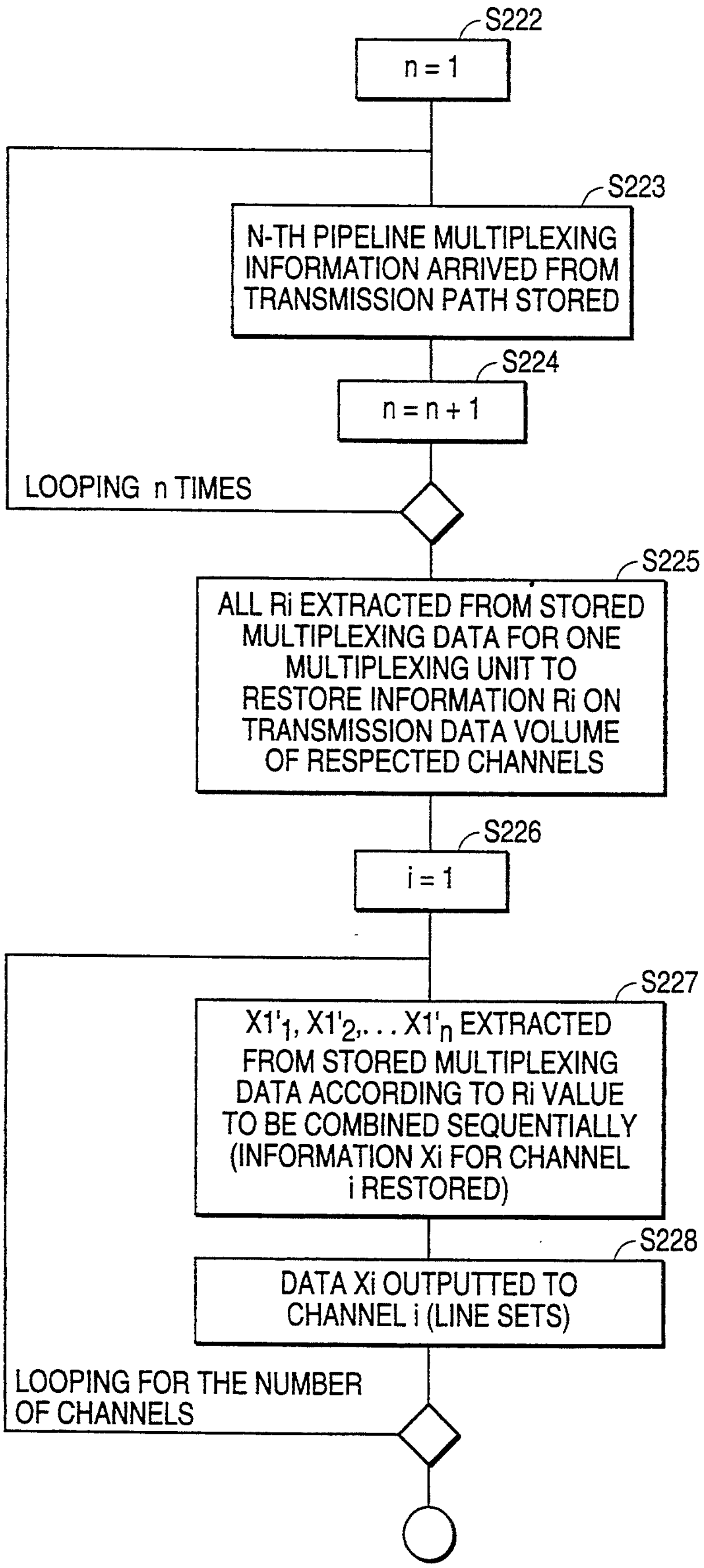
FIG. 56 is a flowchart of batch demultiplexations.

FIG. 56 is a flowchart of the batch demultiplexation performed by the demultiplexer 212 shown in FIG. 54. In S222, n indicating the sequence of the split data is set to 1. In S223, the first split data are stored. In S224, the n value is incremented. The process in S223 is repeated until the n pipeline multiplexed data are stored.

After N split data are stored, transmission band data Ri for respective channels are restored from data for one multiplexing unit stored in S225. In S226, i indicating the channel number is set to 1. In S227, split data transmitted to the channel i per the value of transmission band data Ri are extracted to be combined in accordance with the sequence. In S228, data Xi are sent to the line sets for channels i. The processes in S227 and S228 are repeated by the number of channels until the batch demultiplexation is completed.

Figure 57:
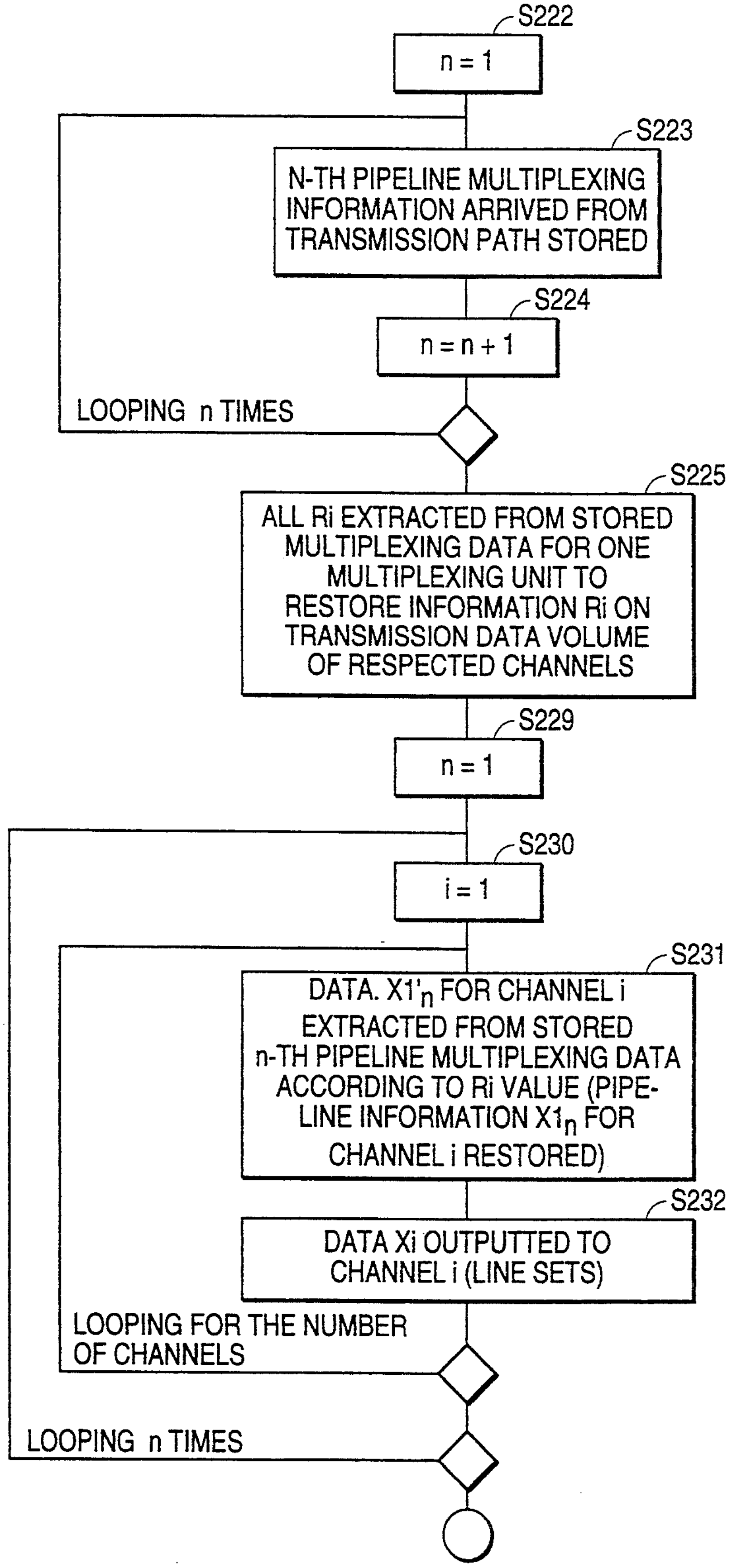
FIG. 57 is a flowchart of split demultiplexations.

FIG. 57 is a flowchart of an embodiment of split demultiplexation. In FIG. 57, the processes up to S225 are exactly the same as those of the batch demultiplexation shown in FIG. 56.

In S229, n, indicating the sequence of split data, is set to 1. In S230, i, indicating the channel number, is set to 1. In S231, transmission data Xin' for channel i are extracted from the stored n-th multiplexed data per the value of transmission band data Ri. In S232, the data are outputted to line sets for channels i. After repeating the processes in S231 and S232 for the number of channels, the processes in S230, S231 and S232 are repeated for the number of split data n, and the split demultiplexation is completed.

Figure 58A:
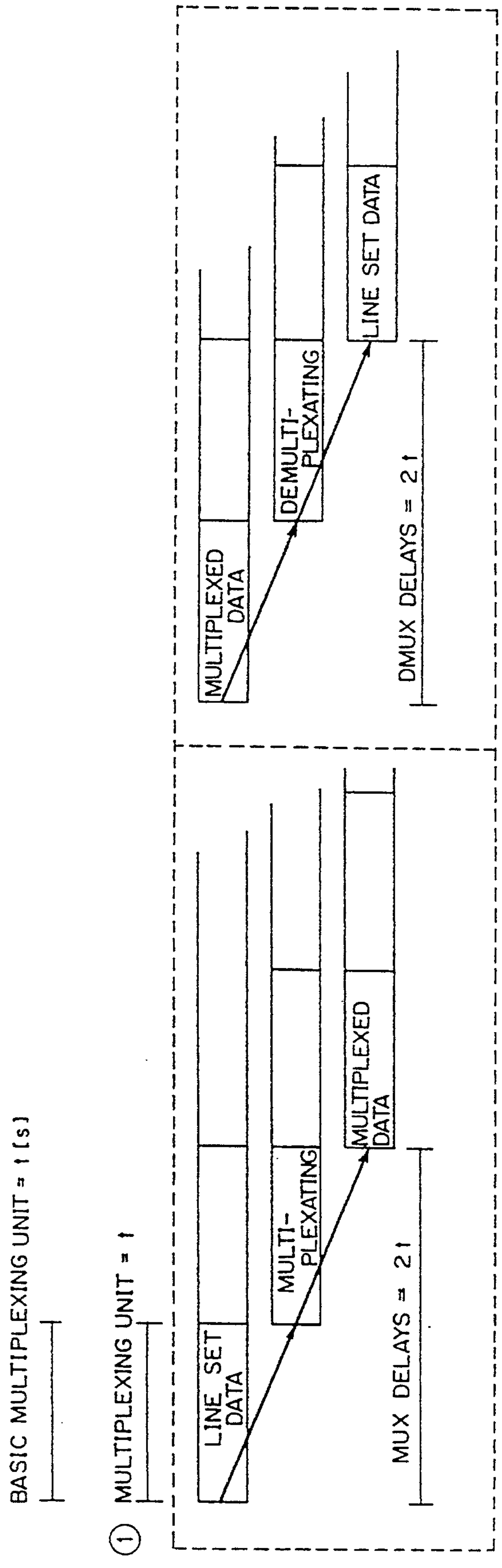
FIGS. 58A, 58B & 58C illustrate the delay reductions according to the pipeline multiplexation method.
Figure 58B:
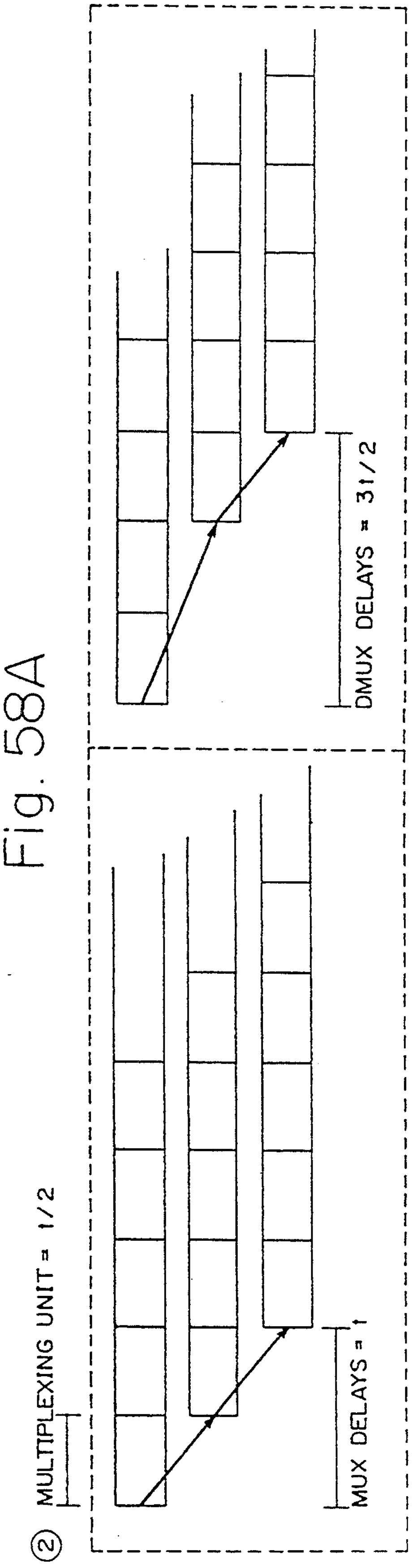
Figure 58C:
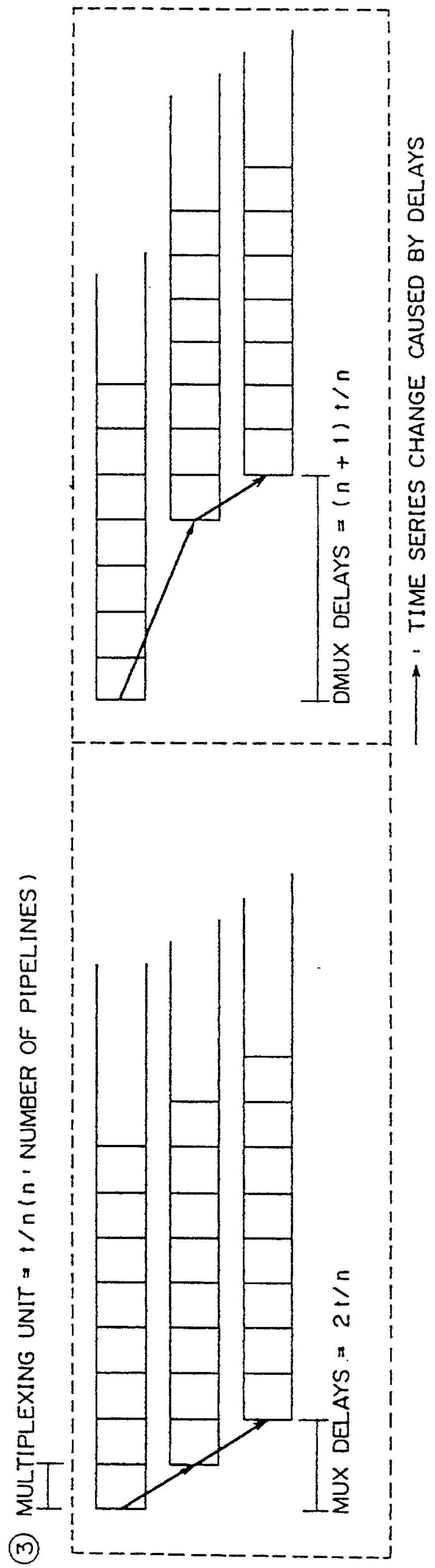

FIG. 58 illustrate the delay reduction through the pipeline multiplexation method. In FIG. 58, the time equivalent to one multiplexing unit in line sets (basic multiplexing unit) is set to t, and is compared with the lag time in n pipeline multiplexation. Through n pipeline multiplexations, the multiplexer causes only 1/n lags in receiving line set data, 1/n delays in multiplexing and 1/n delays in outputting multiplexed data to the transmission path. Therefore, the processing time for one multiplexing unit becomes virtually t/n, and the multiplexing lags are effectively reduced. The n pipeline multiplexations cause the lag time to be reduced from 2t to (n+1)t/n.

Consequently, since the total delay time reduction T is expressed as:

$$T = (\text{lags by non-pipeline multiplexers} + \text{lags by non-pipeline demultiplexers}) - (\text{lags by n pipeline multiplexers} + \text{lags by n pipeline demultiplexers}) = = (2t+2t) - (2t/n + t + t/n) = 3t - 3t/n$$

Where n is large, lags equivalent to three times those for one multiplexing unit are reduced.

Figure 59A:
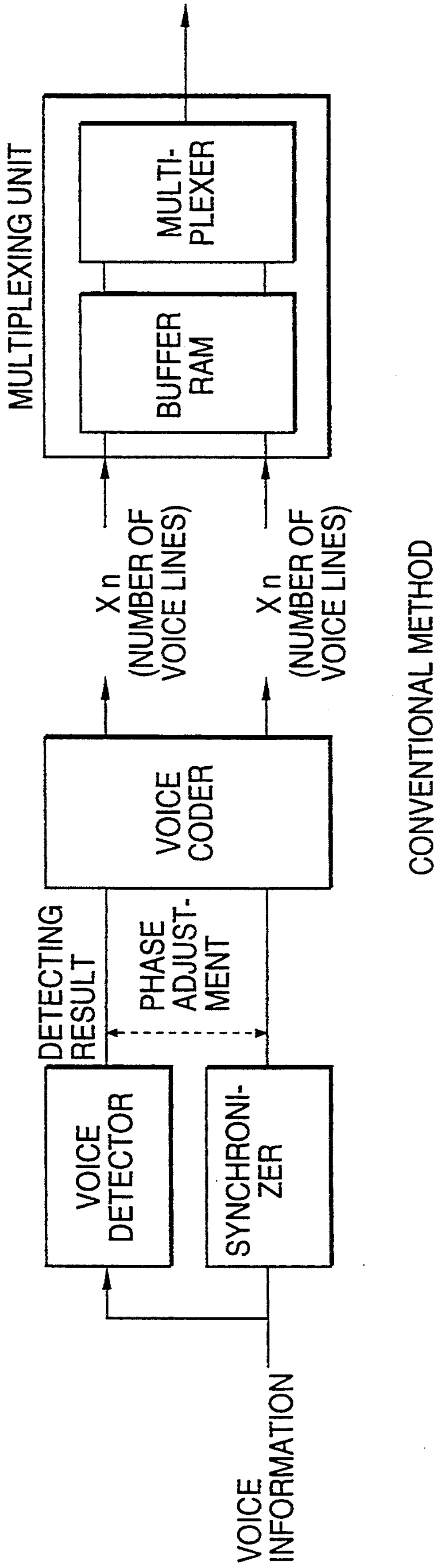
FIGS. 59A and 59B illustrate an embodiment of a voice quality protection method by simultaneously notifying a multiplexing device and a coder of voice detection in formation.
Figure 59B:
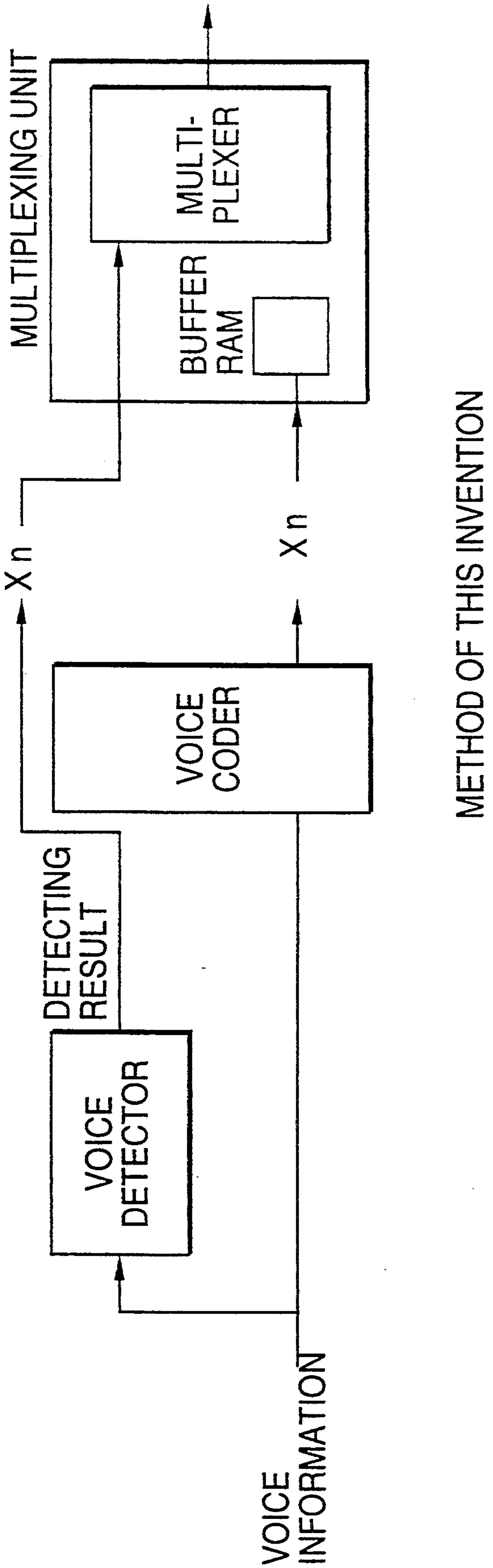

FIGS. 59A and 59B show methods for protecting the voice quality by simultaneously notifying the coder and the multiplexer of the voice detection information.

FIG. 59A shows a conventional method for protecting voice quality by simultaneously notifying the coder and the multiplexer of the information on voice detection. A voice detector outputs information on voice detection regarding whether or not there is a sound during a predetermined time period. Naturally, the output of the judging result lags behind the output of the voice data by the predetermined time period. Therefore, the information on voice detection is sent to the multiplexer after its phase is matched with that of the code information processed by the voice coder.

The problem in detecting a voice lies in the change point from a silent mode to a speech mode such as at the beginning of a sentence or at the beginning of a word. Although various methods can be considered for the detecting such change points, a guard time method for protecting the speech mode by outputting the information on the voice detection essentially at an earlier point for producing more naturally reproduced sounds becomes necessary. However, as described earlier, since the guard time method causes the information on the voice detection and the code information to be sent to a voice coder by matching their phases, voice information needs to be stored in the memory, first. This not only requires extra memory capacity but also causes larger delays in voice transmission.

FIG. 59B shows the method of this invention for protecting voice quality by simultaneously notifying the coder and the multiplexer of the detection result by the voice detector. Hence, the detection result is notified to the multiplexer in advance of the time required for the processing by the voice coder, i.e. the time required for coding. This enables the beginning of a sentence or the beginning of a word, i.e. the points where a silent mode changes to a speech mode, to be protected, thereby assuring the protection of the voice quality without causing an additional delay.

FIG. 60 shows an embodiment of the method for generating a noise on the receiving side in correspondence with the noise level of the sending side in a silent section. Generally, no voice data are transmitted from the sending side to the receiving side during a silent mode, and the receiving side reduces the users' sense of severance or strangeness at the time of switching from a silent mode to a speech mode by inserting noises to the silent mode. Usually, the noise level inserted on the receiving side is set at a constant level, irrespective of the noise levels on the sending side. This causes a problem that a sense of awarkwardness is aroused when the noise level on the sending side differs greatly from that on the receiving side.

Figure 60A:
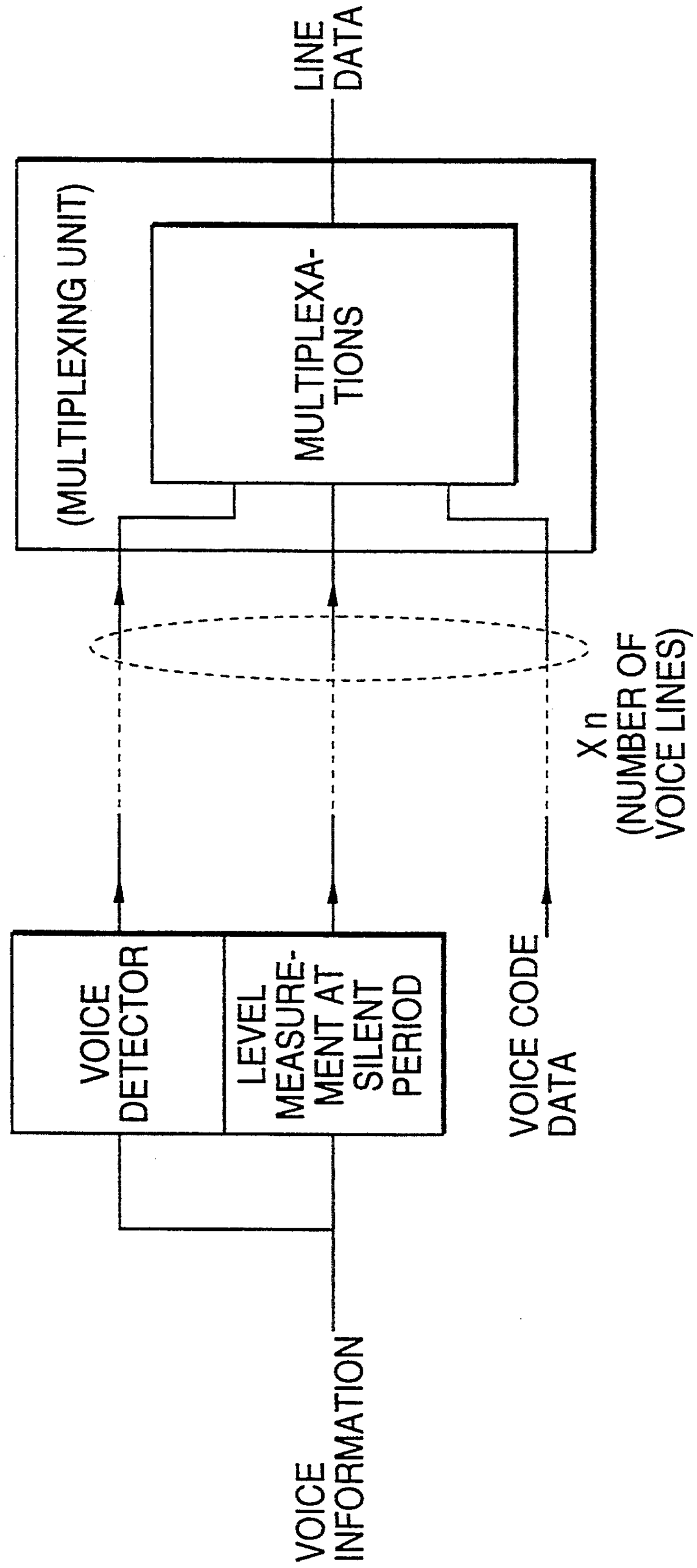
FIG. 60A and 60B illustrate a method of generating noises on the receiving side according to the noise level on the sending side for silent periods.
Figure 60B:
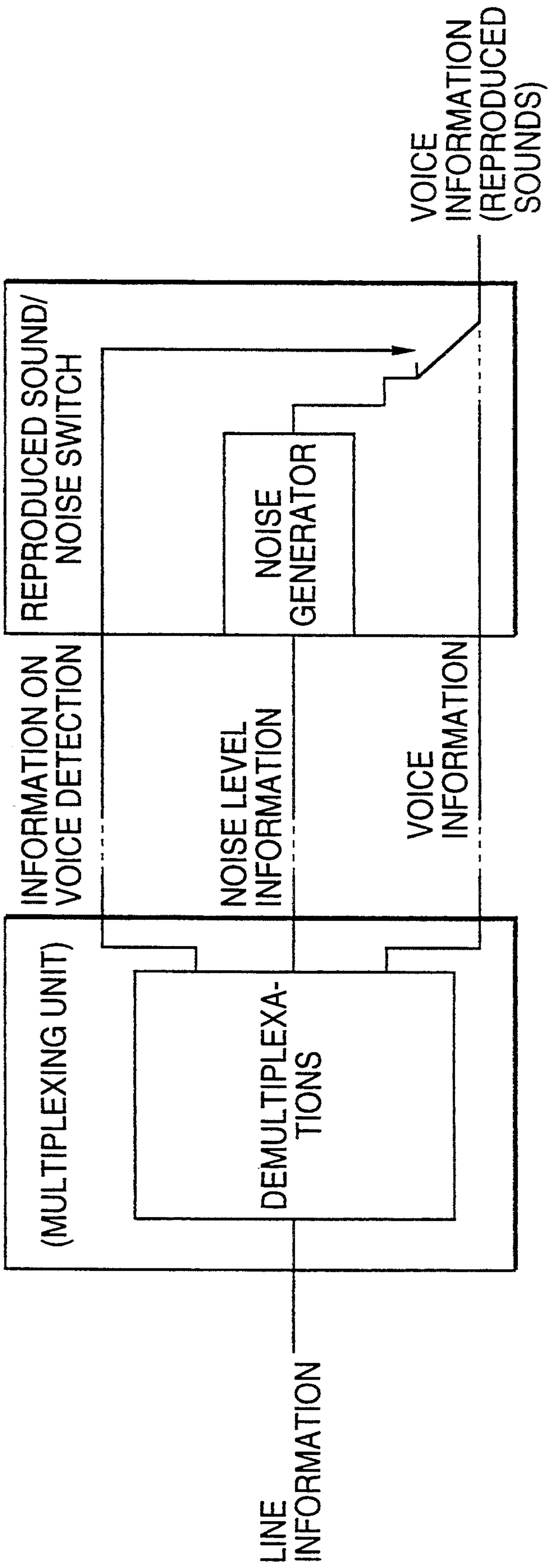

To overcome such problems, this invention causes the noise level to be measured simultaneously, when a voice detector on the sending side detects a silent mode, and the information indicating the level to be sent to the receiving side, as shown in FIG. 60A. Also, this invention causes the receiving side to create noises for the silent section based on the noise level information, as shown in FIG. 60B.

As described earlier, when signals for signaling voice channels are transmitted by signal-sent (SS) signals and signal-received (SR) signals, if the logical sum of SS and SR signals remain "0" for a predetermined period of time, a call connection mode is judged to exist. If their logical products remain "1" for a predetermined period of time, a call severance mode is judged to exist.

Either the coder or the multiplexer can detect the calls, because signaling (SS and SR) signals are transmitted through the voice coder and the multiplexing unit. When a call detection is performed through a software processing, only the algorithm shown in FIG. 9C needs to be used. This algorithm is executed by a processor 77 in the multiplexing unit shown in FIG. 26. When a call detection is performed through a hardware processing, only call detection circuits described later need to be provided in the respective voice coders, or alternatively in the multiplexing unit for the number of voice channels.

Figure 61:
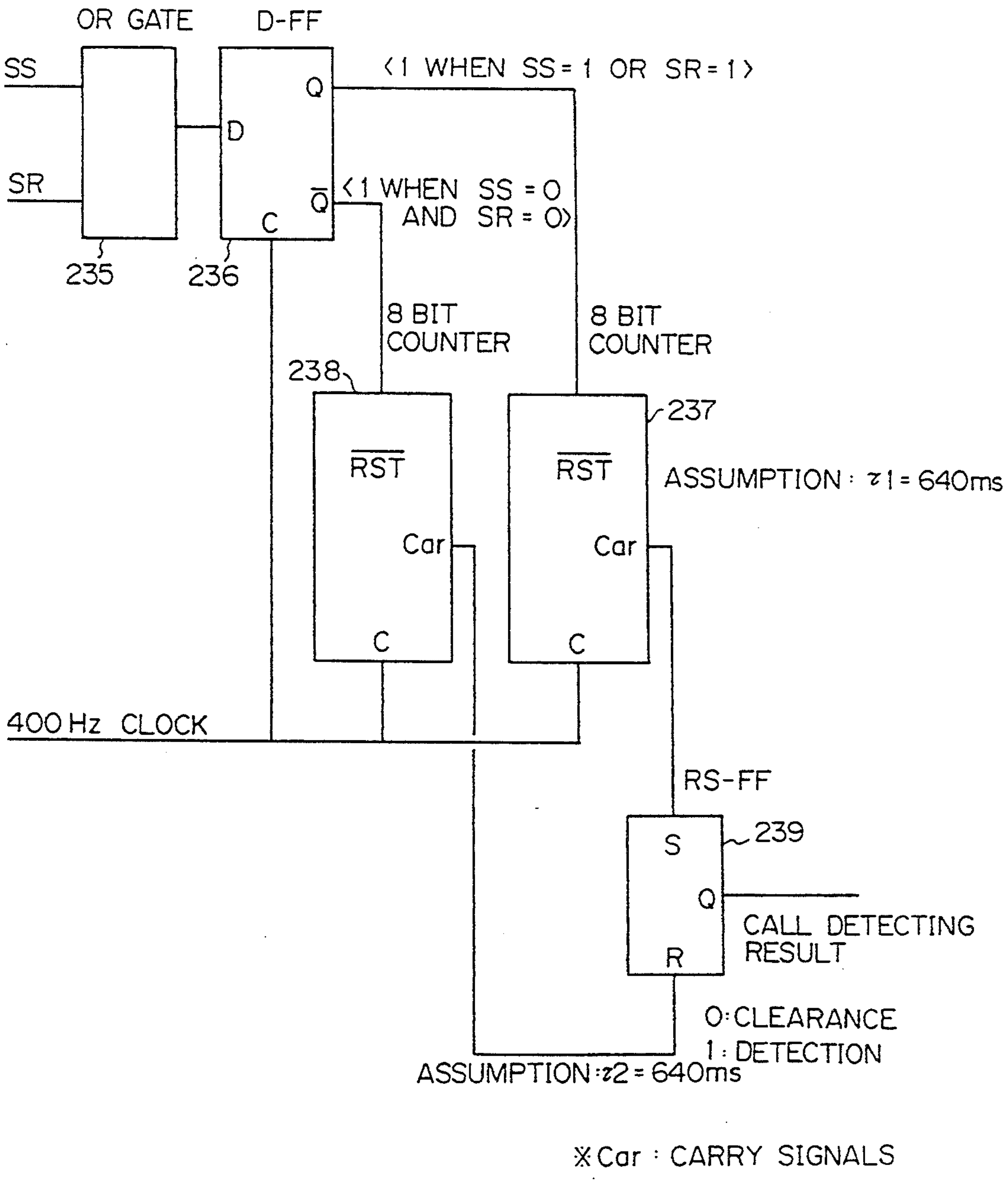
FIG. 61 is a block diagram showing the configuration of an embodiment of a call detection circuit.

FIG. 61 is a block diagram of an embodiment of a call detection circuit. The call detection circuit shown in FIG. 61 comprises an OR gate 235 for receiving both SS and SR signals, a delayed type flip-flop 236 for receiving at its delayed input terminal the outputs from the OR gate 235, a counter 237 for receiving at its reset terminal the output Q from the delayed type flip-flop 236, a counter 238 for receiving at its reset terminal the output Q from the delayed type flip-flop 236, and an RS flip-flop 239 for receiving respectively at its set terminal and reset terminal the carry outputs from the two counters 237 and 238.

In FIG. 61, when both SS and SR signals are 0, the output Q from the delayed type flip-flop 236 is 0 and the output Q from the delayed type flip-flop 236 is 1. Then, the counter 238 is reset, and the counter 237 is counted up at each receipt of a clock pulse and outputs a carry signal after a predetermined time, which is $TAU_1=640$ ms in this case. The RS flip-flop 239 outputs $Q=1$ as the detection result of the call connection mode.

On the other hand, when both SS and SR signals are 1, the counter 237 is reset, the counter 238 counts the clock pulses until $TAU_2=640$ ms at which time it outputs a carry signal, the RS flip-flop 239 outputs 0 as the output Q indicating a call severance.

Figure 62:
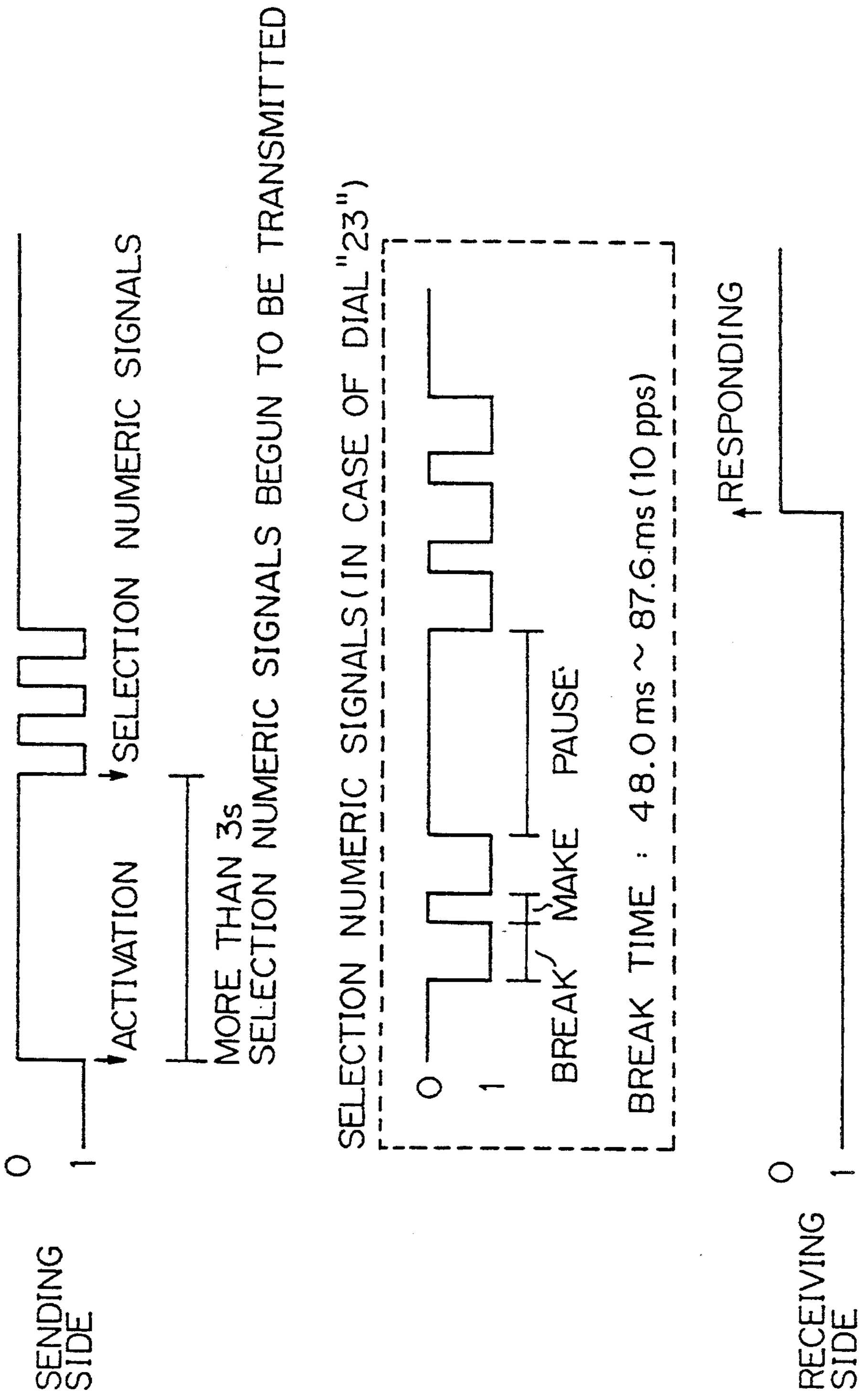
FIG. 62 shows an example of signaling information.

A system transmitted signaling information as SS and SR signals utilizes the character that signaling signals hardly change except for the period when the call origination is processed so as to reduce the necessary bands when signaling is transmitted per the out-band method. FIG. 62 shows an example of signaling signals. In FIG. 62, after it is activated, the calling side keeps the constant value of 0 until the start of the selection numeric signal transmission, has a value of either 0 or 1 when a selection numeric signal is being transmitted, and has a constant value of 0 again thereafter. The receiving side has the value of 1 until it responds, but has the unchanged value of 0 after responding.

This invention invokes a transmission compression only when the signaling bits, e.g. 4 bits, of the frames transmitted immediately before are all 0 or all 1, and the signaling bits of the frames currently transmitted do not change at all. The reason why the condition of all 0 or all 1 is added is to ensure the tolerance for the line random error.

That is, the receiving side processes elongation at a compression based on the all-0-or-all-1 rule before proceeding on the transmission compression, and corrects an error arising on the transmission path by the majority logic, when it actually happens. In addition, media other than voices, such as remote signaling (RS) signals for data channels, i.e. level signals for fixing the mode between terminals, can use an entirely similar transmission compression method.

Figure 63A:
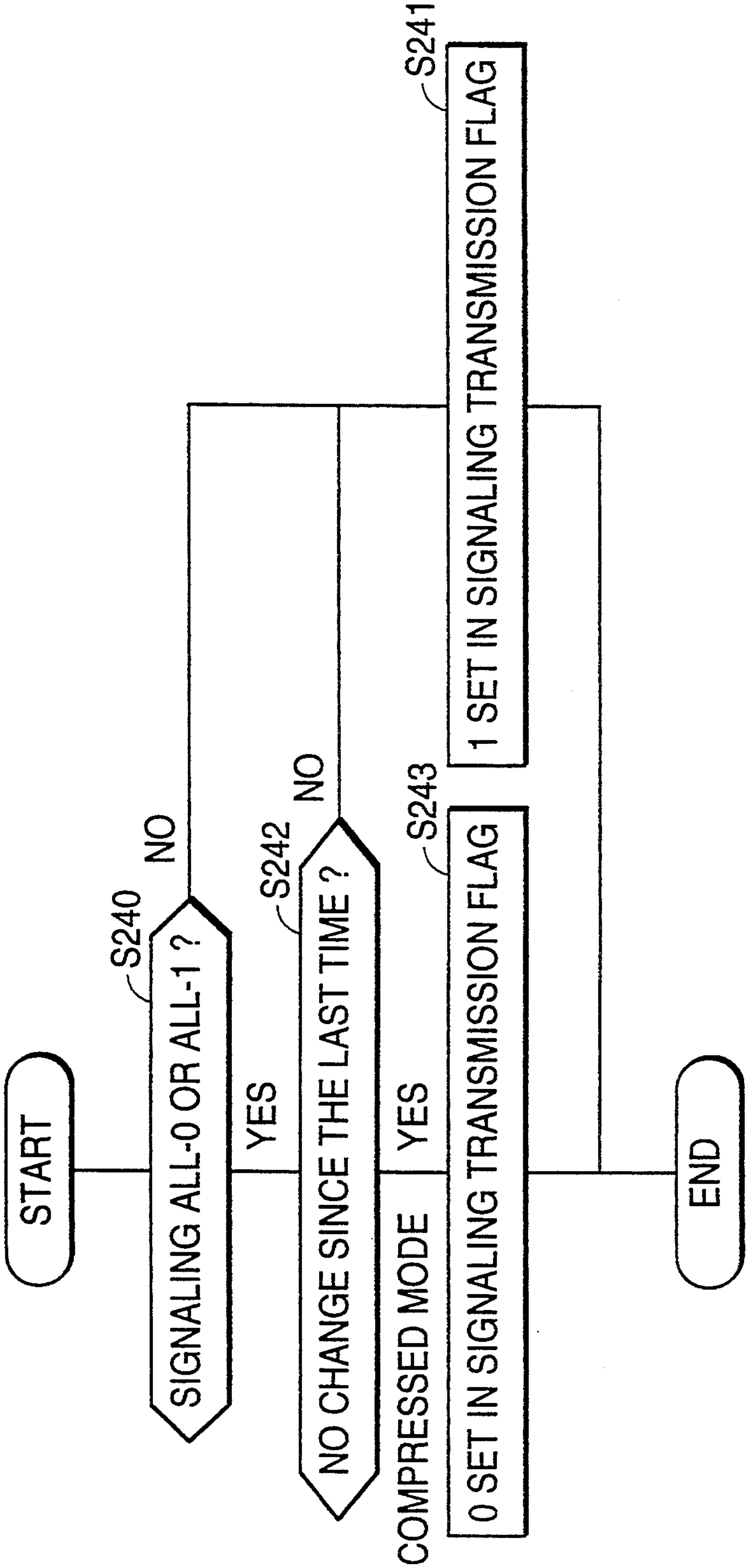
FIGS. 63A and 63B are flowcharts of an embodiment of a signaling transmission compression.
Figure 63B:
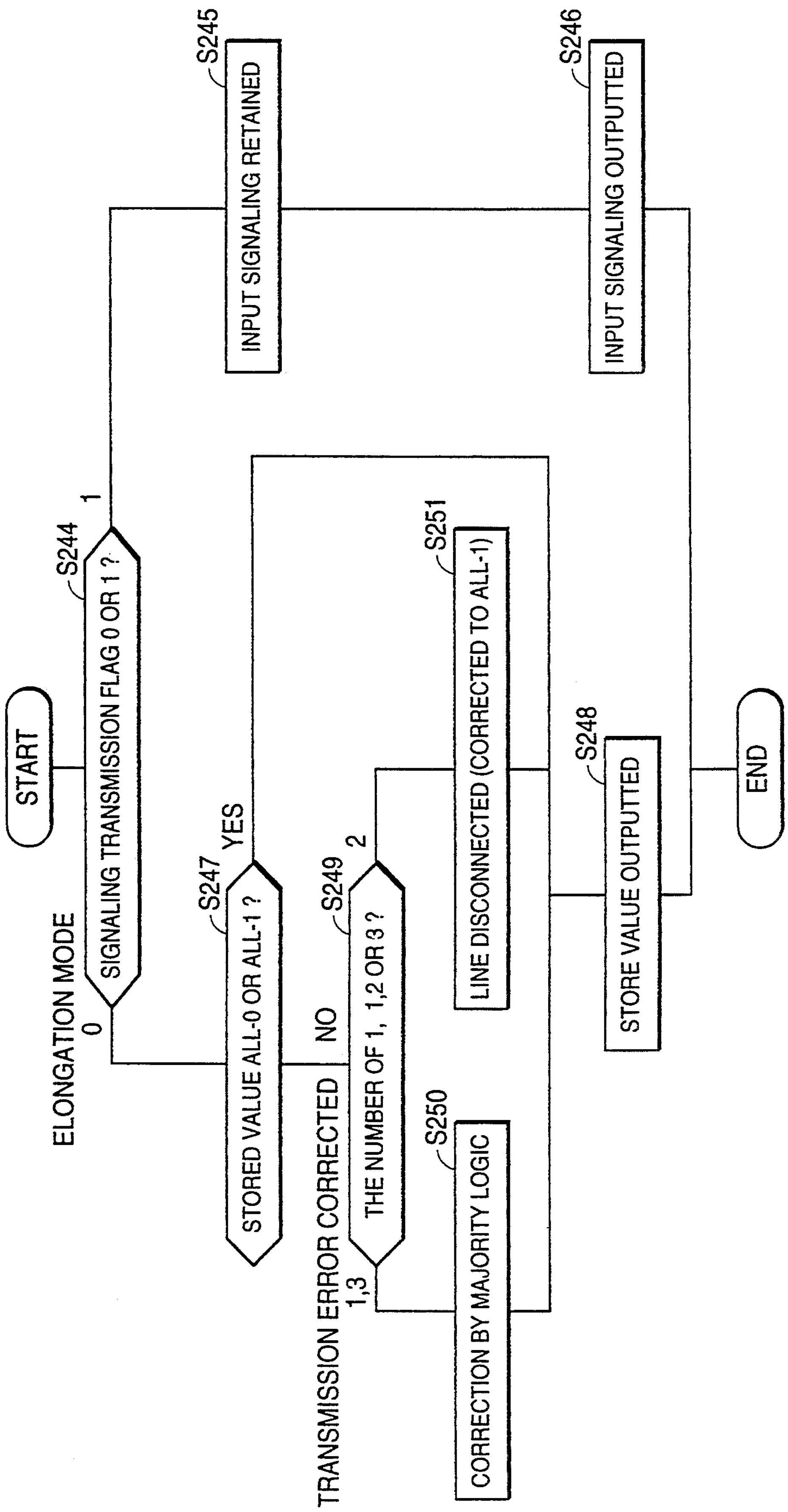

FIGS. 63A and 63B are flowcharts of an embodiment of the signaling compression. FIG. 63A shows the processing flow on the sending side in the embodiment. After the process begins, it is judged whether the signaling data are all 0 or all 1 in S240. If they are neither all 0 nor all 1, a signaling transmission flag is provided with 1 indicating a transmission of signaling information in S241 before terminating the process.

When the signaling data are either all 0 or all 1 in S240, it is judged in S242 whether or not the signaling data are changed from those for the preceding frames. When the signaling data, are changed, since signaling data need to be sent, 1 is provided in the signaling transmission flag in S241 before terminating the process. When the signaling data are not changed from those in the preceding frames, as a compression mode, a signaling transmission flag of 0 is set in S243 and the process is terminated.

FIG. 63B shows an embodiment of the signaling compression on the receiving side. When the process begins, it is judged whether the signaling transmission flag received in S244 is 0 or 1. When the transmission flag is 1, since it means that the signaling data are transmitted, the received signaling data are retained in S245, and they are outputted in S246 to terminate the processing.

When the signaling transmission flag is 0 in S244, it is judged whether or not the signaling data currently retained as an elongation mode, i.e. the last received signaling data are all 0 or all 1 in S247. When they are either all 0 or all 1, their retained values are outputted in S248, and the process is terminated.

Since there is a transmission error when they are neither all 0 nor all 1, it is judged in S249 whether the number of 1 is 1, 2 or 3. When it is either 1 or 3, the error is corrected based on the majority logic. When it is 2, it is considered as a line severance mode in S251 so that they are corrected to all 1, and the corrected retaining value is outputted in S248 and the process is consummated.

As explained so far, this invention causes the core information part for assuring the minimum acceptable sound quality for the voice channels to be necessarily multiplexed sequentially from the parts with the highest priority among the supplementary information part necessary for obtaining the desirable sound quality, thereby minimizing the deterioration in communication quality even when some bands need to be discarded during a congestion time. Media capable of waiting, such as packet switching system multiplexe voice channels after the necessary bands are secured for the packet data of the minimum packet switch throughput, thereby multiplexing the voices in the voice channels in the remaining bands and multiplexing packets in the residual bands. This enables efficient formation of multiplexed frames. Thus, this invention enables the concurrent pursuit of both communication quality improvement in statistical multiplexations and efficiency improvements in multiplexations.

This invention realizes a highly efficient digitally multiplexing system for use as a multiplexing device using a plurality of voice communication lines over future digital communication lines such as broad-band ISDN, current ISDN, digital private line services such as "high bit link" international service, voice communication switching networks such as PBXs and public networks, and multimedia switching networks.

So far we have explored the possibility of applying this invention to efficient data transmission. However, the application of this invention is by no means limited to sound transmission only. It is applicable, for example, to image data transmission.

Figure 64:
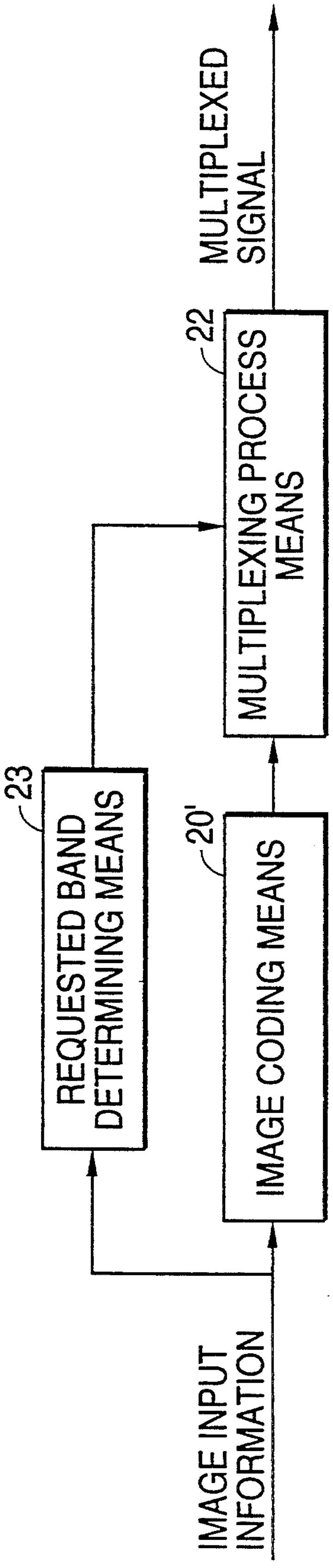
FIG. 64 is a block diagram showing an embodiment of an image processing system to which this invention is applied.

FIG. 64 is a block diagram showing an embodiment of an image processing system to which this invention is applied. This embodiment is similar to the embodiment illustrated in FIG. 5B. The same parts have the same numbers, and their detailed explanations are omitted here. The only difference is that an image coding means 20' is used in lieu of the voice coding means 20.

Figure 65:
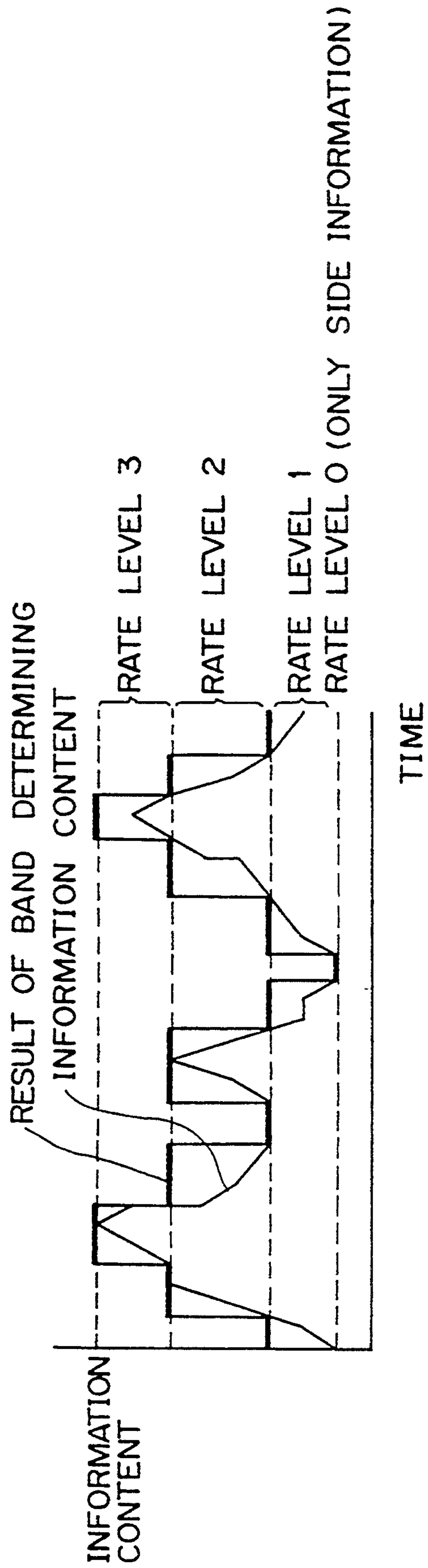
FIG. 65 shows an example of determining the request band.

FIG. 65 shows an example of determining the request band. At rate level 0 with transmission rate of 8 kbps, only side information is transmitted. At rate levels 1, 2 and 3, the transmission rates are 256 kbps, 1024 kbps and 2048 kbps, respectively. Based on rate levels, band arbitration is performed.

What is claimed is:

1. A high performance digitally multiplexed transmission system for use in a multiplexing device for transmitting multiplexed signals on a digital line, said high performance digitally multiplexed transmission system comprising:

voice coding means, having a plurality of voice coders wherein the voice coders are associated with a plurality of voice channels, for separating voice input information into a core information part for ensuring minimum acceptable sound quality, and into a supplementary information part for sending supplementary information to be sent with said core information part to obtain desirable sound quality, said supplementary information part being divided into parts, wherein each part has a priority, the parts of said supplementary information part being discardable in sequence according to the priority of each part, said voice coding means coding said core information part and said supplementary information part;

detecting means for detecting a silent section in said voice input information to determine whether the transmission of voice input information is necessary;

a plurality of request band determining means for determining a transmission request band of respective input voice information corresponding to a plurality of voice channels to be multiplexed on the digital line based on the value of a segmental signal noise ratio obtained by dividing the difference between a power of an input voice signal and a power of a reproduced signal of the input voice signal by the power of the input voice signal; and multiplexing process means for multiplexing, among the plurality of voice channels to be multiplexed, only information for each voice channel where said silent section detecting means detects a silent section, for multiplexing said core information part for a fixed length digital slot repeated at a predetermined cycle for each voice channel where said silent section detecting means detects no silent sections, for multiplexing said supplementary information part of each voice channel in the order of higher priority where no silent sections are detected for the remaining part of said fixed length digital slot, and for discarding a supplementary information part which cannot be multiplexed due to insufficient band.

2. A high performance digitally multiplexed transmission system for use in a multiplexing device for transmitting multiplexed signals on a digital line, said high performance digitally multiplexed transmission system comprising:

voice coding means, having a plurality of voice coders wherein the voice coders are associated with a plurality of voice channels, for separating voice input information into a core information part for ensuring minimum acceptable sound quality, and into a supplementary information part for sending supplementary information to be sent with said core information part to obtain desirable sound quality, said supplementary information part being divided into parts, wherein each part has a priority, the parts of said supplementary information part being discardable in sequence according to the priority of each part, said voice coding means coding said core information part and said supplementary information part;

detecting means for detecting a silent section in said voice input information;

multiplexing process means for multiplexing, among the plurality of voice channels to be multiplexed, only information for each voice channel where said silent section detecting means detects a silent section, for multiplexing said core information part for a fixed length digital slot repeated at a predetermined cycle for each voice channel where said silent section detecting means detects no silent sections, for multiplexing said supplementary information part of each voice channel in the order of higher priority where no silent sections are detected for the remaining part of said fixed length digital slot, and for discarding a supplementary information part which cannot be multiplexed due to insufficient band; and call detecting means for detecting a call in each of a plurality of said voice channels to be multiplexed, wherein said multiplexing process means does not transmit any information where said call detecting means detects a non-calling mode.

3. A high performance digitally multiplexed transmission system according to claim 1, comprising a packet assembling means for assembling a packet using a multiplexed frame provided by said multiplexing process means "as is" or in a divided form, wherein:

said multiplexing device applies said packet to the label multiplexing network connected to users' devices.

4. A high performance digitally multiplexed transmission system according to claim 1, comprising a node control part, in said multiplexing device, for providing a multiplexing parameter based on the nature of sound quality deterioration due to the discard of said supplementary information part which depends on the characteristics of each voice coder for the plurality of voice channels to be multiplexed in said digital line, and for setting said multiplexing parameter in said multiplexing process means, wherein:

said multiplexing process means determines the method of discarding a supplementary information part in the current transmission frame according to said multiplexing parameter and the discard history of the supplementary information in the preceding transmission frame.

5. A high performance multiplexing transmission system according to claim 1, in said multiplexing device that multiplexes transmission information of data channels, being other media, including data terminals in addition to a plurality of voice channels and transmits said multiplexing signals in a digital line, said system comprising:

a significant information detecting part for detecting the necessity of information transmission for each of said data channels, wherein:

said multiplexing process means multiplexes for a plurality of said voice channels after multiplexing transmission information of data channels which said significant information detecting part considers necessary to be transmitted.

6. A high performance digital multiplexing system according to claim 1, in said multiplexing device that multiplexes transmission information of data channels including data terminals and packet data from a packet switching system in addition to a plurality of voice channels and transmits said multiplexing signals in a digital line, said system comprising:

a significant information detecting part for detecting the necessity for information transmission for each of said data channels, wherein:

said multiplexing process means reserves a minimum throughput guarantee value of said packet switching system, multiplexes transmission information of data channels which said significant information detecting part considers necessary to be transmitted and packet data of the minimum throughput in said packet switching system, multiplexes for a plurality of said voice channels, and multiplexes packet data in the remaining part of said fixed length digital slot.

7. A high performance digitally multiplexed transmission system according to claim 1, wherein:

said multiplexing process means comprises a multiplexing part, which selectively discards the core information part corresponding to a selected frequency characteristic when said multiplexing part cannot transmit all of the core information parts for each of said voice channels where no silent sections are detected.

8. A high performance digitally multiplexed transmission system according to claim 7, wherein:

said voice coding means comprises a sub-band coder, wherein a multiplexing part forming said sub-band coder or said multiplexing process means detects the voice frequency characteristics of each of said voice channels;

said multiplexing part performs a multiplexing process including selective discard of said core information part based on the discard mode corresponding to the detected frequency characteristics.

9. A high performance digital multiplexing system according to claim 1, wherein:

said multiplexing process means reserves a code table for coding a transmission information band for each channel obtained as a result of its discarding and multiplexing processes, and codes the transmission information band for each channel in a transmission frame.

10. A high performance digital multiplexing system for use in a multiplexing device for transmitting multiplexed signals on a digital line, said high performance digitally multiplexed transmission system comprising:

voice coding means, having a plurality of voice coders wherein the voice coders are associated with a plurality of voice channels, for separating voice input information into a core information part for ensuring minimum acceptable sound quality, and into a supplementary information part for sending supplementary information to be sent with said core information part to obtain desirable sound quality, said supplementary information part being divided into parts, wherein each part has a priority, the parts of said supplementary information part being discardable in sequence according to the priority of each part, said voice coding means coding said core information part and said supplementary information part;

detecting means for detecting a silent section in said voice input information;

multiplexing process means for multiplexing, among the plurality of voice channels to be multiplexed, only information for each voice channel where said silent section detecting means detects a silent section, for multiplexing said core information part for a fixed length digital slot repeated at a predetermined cycle for each voice channel where said silent section detecting means detects no silent sections, for multiplexing said supplementary information part of each voice channel in the order of higher priority where no silent sections are detected for the remaining part of said fixed length digital slot, and for discarding a supplementary information part which cannot be multiplexed due to insufficient band; and said multiplexing device which notifies a correspondent's multiplexing device of the pending mode of said channel when detecting a channel in the pending mode among a plurality of said voice channels, wherein said correspondent's multiplexing device outputs a built-in-pending-sound pattern and attempts to compress transmission when detecting the silent mode on a relay transmission line between said multiplexing devices.

11. A high performance digitally multiplexed transmission system for use in a multiplexing device for transmitting multiplexed signals on a digital line, said high performance digitally multiplexed transmission system comprising:

voice coding means, having a plurality of voice coders wherein the voice coders are associated with a plurality of voice channels, for separating voice input information into a core information part for ensuring minimum acceptable sound quality, and into a supplementary information part for sending supplementary information to be sent with said core information part to obtain desirable sound quality, said supplementary information part being divided into parts, wherein each part has a priority, the parts of said supplementary information part being discardable in sequence according to the priority of each part, said voice coding means coding said core information part and said supplementary information part;

detecting means for detecting a silent section in said voice input information;

multiplexing process means for multiplexing, among the plurality of voice channels to be multiplexed, only information for each voice channel where said silent section detecting means detects a silent section, for multiplexing said core information part for a fixed length digital slot repeated at a predetermined cycle for each voice channel where said silent section detecting means detects no silent sections, for multiplexing said supplementary information part of each voice channel in the order of higher priority where no silent sections are detected for the remaining part of said fixed length digital slot, and for discarding a supplementary information part which cannot be multiplexed due to insufficient band;

said multiplexing device Which comprises various transmission media for transmitting voice, for example, wherein a coder forming said voice coding means encodes after arbitrating the number of bits in a core information part, for assuring information quality necessary for respective transmission media, where a coding method or discarding may not be admitted depending on the nature of each medium; and a multiplexing part forming said multiplexing process part performs a multiplexing process corresponding to each of transmission media according to a request from each of said encoders.

12. A high performance digitally multiplexed transmission system for use in a multiplexing device for transmitting multiplexed signals on a digital line, said high performance digitally multiplexed transmission system comprising:

voice coding means, having a plurality of voice coders wherein the voice coders are associated with a plurality of voice channels, for separating voice input information into a core information part for ensuring minimum acceptable sound quality, and into a supplementary information part for sending supplementary information to be sent with said core information part to obtain desirable sound quality, said supplementary information part being divided into parts, wherein each part has a priority, the parts of said supplementary information part being discardable in sequence according to the priority of each part, said voice coding means coding said core information part and said supplementary information part;

detecting means for detecting a silent section in said voice input information;

multiplexing process means for multiplexing, among the plurality of voice channels to be multiplexed, only information for each voice channel where said silent section detecting means detects a silent section, for multiplexing said core information part for a fixed length digital slot repeated at a predetermined cycle for each voice channel where said silent section detecting means detects no silent sections, for multiplexing said supplementary information part of each voice channel in the order of higher priority where no silent sections are detected for the remaining part of said fixed length digital slot, and for discarding a supplementary information part which cannot be multiplexed due to insufficient band; and means for stopping the operation of a voice detector or for ignoring the detecting result of said voice detector when said multiplexing device detects the number of channels where calls are connected among a plurality of voice channels and it is not necessary to discard said supplementary information part or when the sound quality deterioration due to the discard of said supplementary information part is less than that due to the operation of the voice detector forming said silent section detecting means.

13. A high performance digitally multiplexed transmission system for use in a multiplexing device for transmitting multiplexed signals on a digital line, said high performance digitally multiplexed transmission system comprising:

voice coding means, having a plurality of voice coders wherein the voice coders are associated with a plurality of voice channels, for separating voice input information into a core information part for ensuring minimum acceptable sound quality, and into a supplementary information part for sending supplementary information to be sent with said core information part to obtain desirable sound quality, said supplementary information part being divided into parts, wherein each part has a priority, the parts of said supplementary information part being discardable in sequence according to the priority of each part, said voice coding means coding said core information part and said supplementary information part;

detecting means for detecting a silent section in said voice input information;

multiplexing process means for multiplexing, among the plurality of voice channels to be multiplexed, only information for each voice channel where said silent section detecting means detects a silent section, for multiplexing said core information part for a fixed length digital slot repeated at a predetermined cycle for each voice channel where said silent section detecting means detects no silent sections, for multiplexing said supplementary information part of each voice channel in the order of higher priority where no silent sections are detected for the remaining part of said fixed length digital slot, and for discarding a supplementary information part which cannot be multiplexed due to insufficient band;

said multiplexing device or a switching system originating information, transmitting information in a direction in a label multiplexed network and collecting data on the number of channels connected to calls in switching systems via communication paths for the direction opposite to the direction for transmitting information; and means for stopping the operation of a voice detector forming said silent section detecting means when a discard of said supplementary information part is not required or for ignoring the detection result of said voice detector.

14. A high performance digitally multiplexed transmission system according to claim 1, wherein:

line sets forming said voice coding means and silent section detecting means outputs one multiplexed unit of multiplexed data in said line sets and information indicating the necessity of transmission of said data or indicating a transmission request band; and said multiplexing process means first takes the information indicating the necessity of transmission of said data or indicating a transmission request band, and comprises a band arbitrating part for determining a transmission band for each channel according to said information and a pipeline multiplexing part for obtaining data after dividing one multiplexed unit of multiplexed data from said line sets into a plurality of split data groups according to the result provided by said band arbitrating part and for multiplexing and transmitting said divided data groups every time information is obtained.

15. A high performance digitally multiplexed transmission system according to claim 14, for greatly reducing lags associated with demultiplexations, wherein said multiplexing process means first restores the information indicating the transmission band of each channel from one multiplexed unit of multiplexed data in said line sets received through the transmission line, and wherein said high performance digitally multiplexed transmission system further comprises a pipeline demultiplexing part for demultiplexing data into groups in the order of their multiplexations according to said restored information and outputting them to said line sets.

16. A high performance digitally multiplexed transmission system according to claim 14, wherein:

said line sets comprises line sets for a data channel in addition to line sets forming said voice coding means and silent section detecting means.

17. A high performance digitally multiplexed transmission system for use in a multiplexing device for transmitting multiplexed signals on a digital line, said high performance digitally multiplexed transmission system, wherein voice coding means, having a plurality of voice coders wherein the voice coders are associated with a plurality of voice channels, for separating voice input information into a core information part for ensuring minimum acceptable sound quality, and into a supplementary information part for sending supplementary information to be sent with said core information part to obtain desirable sound quality, said supplementary information part being divided into parts, wherein each part has a priority, the parts of said supplementary information part being discardable in sequence according to the priority of each part, said voice coding means coding said core information part and said supplementary information part;

detecting means for detecting a silent section in said voice input information;

multiplexing process means for multiplexing, among the plurality of voice channels to be multiplexed, only information for each voice channel where said silent section detecting means detects a silent section, for multiplexing said core information part for a fixed length digital slot repeated at a predetermined cycle for each voice channel where said silent section detecting means detects no silent sections, for multiplexing said supplementary information part of each voice channel in the order of higher priority where no silent sections are detected for the remaining part of said fixed length digital slot, and for discarding a supplementary information part which cannot be multiplexed due to insufficient band;

call detecting means for detecting a call in each of a plurality of said voice channels to be multiplexed, wherein said multiplexing process means does not transmit any subordinate information where said call detecting means detects a non-calling mode; and the determination result of detecting speech/silent sections by a voice detector forming said silent section detecting means is sent simultaneously to a coder forming said voice coding means and a multiplexing part forming said multiplexing process means.

18. A high performance digitally multiplexed transmission system according to claim 1, wherein:

a voice detector forming said silent section detecting means measures the noise level on the sending side for the voice channel where a silent section is detected;

said multiplexing process means multiplexes, in addition to the information required for synchronization with a correspondent's coder, the information indicating said noise level for said fixed length digital slot for said channel; and noise is generated for a silent section on the receiving side according to the information indicating said noise level.

19. A call detecting system for in a voice multiplexing device, a multi-media multiplexing device, and a switching system that transmits signaling information of a voice channel as a signal-send (SS) signal and a signal-receive (SR) signal, wherein said call detecting system detects the calling mode or non-calling-mode of said voice channel based on the time period showing a certain value of logical OR or logical product while monitoring said SS and SR signals and after obtaining the logical OR and logical product of said SS and SR signals.

20. A high performance digitally multiplexed transmission system for use in a multiplexing device for transmitting multiplexed signals on a digital line, said high performance digitally multiplexed transmission system comprising:

voice coding means, having a plurality of voice coders wherein the voice coders are associated with a plurality of voice channels, for separating voice input information into a core information part for ensuring minimum acceptable sound quality, and into a supplementary information part for sending supplementary information to be sent with said core information part to obtain desirable sound quality, said supplementary information part being divided into parts, wherein each part has a priority, the parts of said supplementary information part being discardable in sequence according to the priority of each part, said voice coding means coding said core information part and said supplementary information part;

detecting means for detecting a silent section in said voice input information; and multiplexing process means for multiplexing said core information part for a fixed length digital slot repeated at a predetermined cycle for each voice channel where said silent section detecting means detects no silent sections, for multiplexing said supplementary information part of each voice channel in the order of higher priority where no silent sections are detected for the remaining part of said fixed length digital slot, and for discarding a supplementary information part which cannot be multiplexed due to insufficient band.

21. A high performance digitally multiplexed transmission system for use in a switching system for transmitting multiplexed signals on a digital line, said high performance digitally multiplexed transmission system comprising:

voice coding means, having a plurality of voice coders wherein the voice coders are associated with a plurality of voice channels, for separating voice input information into a core information part for ensuring minimum acceptable sound quality, and into a supplementary information part for sending supplementary information to be sent with said core information part to obtain desirable sound quality, said supplementary information part being divided into parts, wherein each part has a priority, the parts of said supplementary information part being discardable in sequence according to the priority of each part, said voice coding means coding said core information part and said supplementary information part;

detecting means for detecting a silent section in said voice input information; and multiplexing process means for multiplexing, among the plurality of voice channels to be multiplexed, only information coder for a voice channel where said silent section detecting means detects a silent section, for multiplexing said core information part for a fixed length digital slot repeated at a predetermined cycle for each voice channel where said silent section detecting means detects no silent sections, for multiplexing said supplementary information part of each voice channel in the order of higher priority where no silent sections are detected for the remaining part of said fixed length digital slot, and for discarding a supplementary information part which cannot be multiplexed due to insufficient band.

22. A high performance digitally multiplexed transmission system for use in a multiplexing device for transmitting multiplexed signals on a digital line, said high performance digitally multiplexed transmission system comprising:

image coding means for separating image input information into a core information part for ensuring minimum acceptable image quality, into a supplementary information part for sending supplementary information to be sent with said core information part to obtain desirable image quality, said supplementary information being divided into parts, wherein each part has a priority, the parts of said supplementary information part being discardable in sequence according the priority of each part, said image coding means coding said core information part and said supplementary information part;

request band determining means for determining a transmission band of said image input information for determining the band necessary for transmitting image information;

multiplexing process means for multiplexing, among the plurality of image channels to be multiplexed, only information for an image channel where said request band determining means determines it is necessary to transmit images, for multiplexing said core information part for a fixed length digital slot repeated at a predetermined cycle for each voice channel where said request band determining means determines it is necessary to transmit images, for multiplexing said supplementary information part of each image channel in the order of higher priority where it is determined necessary to transmit images for the remaining part of said fixed length digital slot, and for discarding a supplementary information part which cannot be multiplexed due to insufficient band.

23. A high performance multiplexing transmission system according to claim 2, in said multiplexing device that multiplexes transmission information of data channels, being other media, including data terminals in addition to a plurality of voice channels and transmits said multiplexing signals in a digital line, said system comprising:

a significant information detecting part for detecting the necessity of information transmission for each of said data channels, wherein:

said multiplexing process means multiplexes for a plurality of said voice channels after multiplexing transmission information of data channels which said significant information detecting part considers necessary to be transmitted.

24. A high performance digital multiplexing system according to claim 2, in said multiplexing device that multiplexes transmission information of data channels including data terminals and packet data from a packet switching system in addition to a plurality of voice channels and transmits said multiplexing signals in a digital line, said system comprising:

a significant information detecting part for detecting the necessity for information transmission for each of said data channels, wherein:

said multiplexing process means reserves a minimum throughput guarantee value of said packet switching system, multiplexes transmission information of data channels which said significant information detecting part considers necessary to be transmitted and packet data of the minimum throughput in said packet switching system, multiplexes for a plurality of said voice channels, and multiplexes packet data in the remaining part of said fixed length digital slot.

25. A high performance digitally multiplexed transmission system according to claim 2, wherein:

said multiplexing process means comprises a multiplexing part, which selectively discards the core information part corresponding to a selected frequency characteristic when said multiplexing part cannot transmit all of the core information parts for each of said voice channels where no silent sections are detected.

26. A high performance digitally multiplexed transmission system according to claim 3, wherein:

said multiplexing process means comprises a multiplexing part, which selectively discards the core information part corresponding to a selected frequency characteristic when said multiplexing part cannot transmit all of the core information parts for each of said voice channels where no silent sections are detected.

27. A high performance digitally multiplexed transmission system according to claim 4, wherein:

said multiplexing process means comprises a multiplexing part, which selectively discards the core information part corresponding to a selected frequency characteristic when said multiplexing part cannot transmit all of the core information parts for each of said voice channels where no silent sections are detected.

28. A high performance digitally multiplexed transmission system according to claim 7, wherein:

said voice coding means comprises a sub-band coder, wherein a multiplexing part forming said sub-band coder for said multiplexing process means detects the voice frequency characteristics of each of said voice channels;

said multiplexing part performs a multiplexing process including selective discard of said core information part based on the discard mode corresponding to the detected frequency characteristics.

29. A high performance digital multiplexing system according to claim 2, wherein:

said multiplexing process means reserves a code table for coding a transmission information band for each channel obtained as a result of its discarding and multiplexing processes, and codes the transmission information band for each channel in a transmission frame.

30. A high performance digital multiplexing system according to claim 3, wherein:

said-multiplexing process means reserves a code table for coding a transmission information band for each channel obtained as a result of its discarding and multiplexing processes, and codes the transmission information band for each channel in a transmission frame.

31. A high performance digital multiplexing system according to claim 4, wherein:

said multiplexing process means reserves a code table for coding a transmission information band for each channel obtained as a result of its discarding and multiplexing processes, and codes the transmission information band for each channel in a transmission frame.

32. A high performance digital multiplexing system according to claim 5, wherein:

said multiplexing process means reserves a code table for coding a transmission information band for each channel obtained as a result of its discarding and multiplexing processes, and codes the transmission information band for each channel in a transmission frame.

33. A high performance digitally multiplexed transmission system according to claim 8, for greatly reducing lags associated with demultiplexations, wherein said multiplexing process means first restores the information indicating the transmission band of each channel from one multiplexed unit of multiplexed data in said line sets received through the transmission line, and wherein said high performance digitally multiplexed transmission system further comprises a pipeline demultiplexing part for demultiplexing data into groups in the order of their multiplexations according to said restored information and outputting them to said line sets.

34. A high performance digitally multiplexed transmission system according to claim 8, wherein:

said line sets comprises line sets for a data channel in addition to line sets forming said voice coding-means and silent section detecting means.

35. A high performance digitally multiplexed transmission system according to claim 9, wherein:

said line sets comprises line sets for a data channel in addition to line sets forming said voice coding means and silent section detecting means.

36. A high performance digitally multiplexed transmission system according to claim 13, wherein the label multiplexed network comprises a packet network.

37. A high performance digitally multiplexed transmission system according to claim 13, wherein the label multiplexed network comprises an ATM network.

38. A method for transmitting compressed information in a switching system for transmitting a level signal for accommodated data channels to confirm the mode between a correspondent as a remote signaling (RS) signal, wherein:

said method for transmitting compressed information is used to transmit a transmission frame with a flag indicating whether or not said RS signal is to be transmitted for a certain transmission cycle unit, and to compress the transmission of remote signaling information where said RS signal does not change.

* * * * *

UNITED STATES PATENT AND TRADEMARK OFFICE

CERTIFICATE OF CORRECTION

PATENT NO. : 5,436,899 Page 1 of 2

DATED : July 25, 1995

INVENTOR(S) : Fujino et al

It is certified that error appears in the above-indentified patent and that said Letters Patent is hereby corrected as shown below:

Col. 1, line 27, delete "," after "7"

Col. 1, line 62, delete "bonds" and insert --bands--

Col. 2, line 6, delete "0" before "or"

Col. 8, line 18, delete "10"

Col. 8, lines 28 and 32, delete "$V_i$is" and insert --$V_i$ is-- and --$V_i'$ is--.

Col. 9, line 25, delete "$V_i$is and insert --$V_i$ is--

Col. 12, line 45 delete "$V_i$" and insert --$V_i'$--

Col. 13, line 34, delete "silent" and insert --silence--

Col. 13, line 60, delete "-in-" and insert --in- --

Col. 15, line 23, delete "process ," and insert --process,--

Col. 20, line 66, delete "8101" and insert --S101--

Col. 20, line 67, delete "Judged" and insert --judged--

Col. 22, line 32, delete "made" and insert --mode--

UNITED STATES PATENT AND TRADEMARK OFFICE

CERTIFICATE OF CORRECTION

PATENT NO. : 5,436,899

DATED : July 25, 1995

INVENTOR(S) : Fujino et al

It is certified that error appears in the above-indentified patent and that said Letters Patent is hereby corrected as shown below:

Col. 28, line 2, delete "Judging" and insert --judging--

Col. 28, line 13, delete "ts" and insert --is--

Col. 28, line 25, delete "i s" and insert --is--

Col. 30, line 29, delete "the-call" and insert --the call--

Col. 34, line 1, delete "8218" and insert --S218--

Col. 42, line 10, delete "Which" and insert --which--

Col. 48, line 17, delete "said-multiplexing" and insert --said multiplexing--

Col. 48, line 56, delete "coding-" and insert --coding--

Signed and Sealed this

Sixteenth Day of January, 1996

Attest:

BRUCE LEHMAN

*Attesting Officer* *Commissioner of Patents and Trademarks*